US012686363B2

(12) United States Patent
Tufts et al.

(10) Patent No.: US 12,686,363 B2
(45) Date of Patent: Jul. 21, 2026

(54) WINDSHIELD WIPER ARM ADAPTER, COUPLER AND ASSEMBLY

(71) Applicant: TRICO PRODUCTS CORPORATION, Rochester Hills, MI (US)

(72) Inventors: Lindsey Tufts, Cleveland, OH (US); David Boll, Cleveland, OH (US); Nicholas E. Stanca, Cleveland, OH (US); Robert Soreo, Cleveland, OH (US); R. Kenneth Thorstenson, Rochester Hills, MI (US); James Croston, Rochester Hills, MI (US); Dan Ehde, Rochester Hills, MI (US)

(73) Assignee: PGI Northstar LLC, Memphis, TN (US)

( * ) Notice: Subject to any disclaimer, the term of this patent is extended or adjusted under 35 U.S.C. 154(b) by 381 days.

(21) Appl. No.: 16/724,120

(22) Filed: Dec. 20, 2019

(65) Prior Publication Data

US 2020/0139937 A1 May 7, 2020

Related U.S. Application Data

(63) Continuation-in-part of application No. PCT/US2019/018462, filed on Feb. 19, 2019.

(Continued)

(51) Int. Cl.
B60S 1/40 (2006.01)
B60S 1/38 (2006.01)

(52) U.S. Cl.
CPC . B60S 1/40 (2013.01); B60S 1/38 (2013.01); B60S 1/3849 (2013.01);

(Continued)

(58) Field of Classification Search
CPC .... B60S 1/3849; B60S 1/3867; B60S 1/3865; B60S 1/3868; B60S 1/40; B60S 1/4003;

(Continued)

(56) References Cited

U.S. PATENT DOCUMENTS 3,659,309 A * 5/1972 Besnard ................... B60S 1/40
                                                      15/250.32
4,094,038 A     6/1978 Hancu
(Continued)

FOREIGN PATENT DOCUMENTS

BR      112012011686 A2   3/2016
CH          635544 A5     4/1983
(Continued)

OTHER PUBLICATIONS

Machine language translation of description portion of German publication 2331324, published Jan. 1974. (Year: 1974).*

(Continued)

*Primary Examiner* — C. A. Rivera

(74) *Attorney, Agent, or Firm* — The Brickell IP Group, PLLC

(57) ABSTRACT

An adapter that connects with a coupler for a wiper element is configured to connect with a plurality of different wiper arms each having a different wiper arm style. The adapter can be a one-piece body or a multi-piece body having a cavity and openings for receiving distal ends or distal end features of each of the plurality of different wiper arms. The adapter can also include different tabs for engaging with openings, notches or other components on distal ends of each of the plurality of different wiper arms.

17 Claims, 90 Drawing Sheets

Related U.S. Application Data

(60) Provisional application No. 62/713,712, filed on Aug. 2, 2018, provisional application No. 62/632,199, filed on Feb. 19, 2018.

(52) U.S. Cl.
CPC ........... B60S 1/3858 (2013.01); B60S 1/4003 (2013.01); B60S 1/4016 (2013.01); B60S 1/4019 (2013.01); *B60S 2001/4029* (2013.01); *B60S 2001/4032* (2013.01)

(58) Field of Classification Search
CPC .... B60S 1/4009; B60S 1/4045; B60S 1/4077; B60S 2001/409
USPC ............................ 15/250.32, 250.43, 250.44
See application file for complete search history.

(56) References Cited

U.S. PATENT DOCUMENTS

| | | | |
|---|---|---|---|
| 4,337,547 A | 7/1982 | Hancou | |
| 4,343,062 A | 8/1982 | van den Berg | |
| 4,370,775 A * | 2/1983 | van den Berg | B60S 1/4087 |
| | | | 15/250.32 |
| 4,951,343 A | 8/1990 | Scorsiroli | |
| 5,084,933 A | 2/1992 | Buechele | |
| 5,289,608 A | 3/1994 | Kim | |
| 5,392,487 A | 2/1995 | Yang | |
| 5,611,103 A | 3/1997 | Lee | |
| 6,499,181 B1 * | 12/2002 | Kotlarski | B60S 1/40 |
| | | | 15/250.43 |
| 6,640,380 B2 | 11/2003 | Rosenstein et al. | |
| 6,658,690 B1 | 12/2003 | Westermann et al. | |
| 6,779,223 B1 | 8/2004 | Roekens | |
| 7,055,207 B2 | 6/2006 | Coughlin | |
| 7,299,520 B2 | 11/2007 | Huang | |
| 8,261,403 B2 | 9/2012 | Ehde | |
| 8,850,653 B2 | 10/2014 | Depondt | |
| 8,938,847 B2 | 1/2015 | Avasiloaie et al. | |
| 8,959,701 B2 | 2/2015 | Kim et al. | |
| 8,973,209 B2 | 3/2015 | Depondt | |
| 9,073,519 B2 | 7/2015 | Depondt | |
| 9,108,595 B2 | 8/2015 | Tolentino et al. | |
| 9,174,611 B2 | 11/2015 | Tolentino et al. | |
| 9,333,948 B2 | 5/2016 | Depondt | |
| 9,381,893 B2 | 7/2016 | Tolentino et al. | |
| 9,387,829 B2 | 7/2016 | Wang | |
| 9,387,830 B2 | 7/2016 | Depondt | |
| 9,511,748 B2 | 12/2016 | Piotrowski et al. | |
| 9,555,775 B2 | 1/2017 | Fournier et al. | |
| 9,744,946 B2 | 8/2017 | Young, III et al. | |
| 9,889,822 B2 | 2/2018 | Tolentino et al. | |
| 10,005,431 B2 | 6/2018 | Tolentino et al. | |
| 10,023,154 B2 | 7/2018 | Piotrowski et al. | |
| 10,029,652 B2 * | 7/2018 | Herinckx | B60S 1/387 |
| 10,077,026 B2 | 9/2018 | Tolentino et al. | |
| 10,118,596 B2 | 11/2018 | Fournier et al. | |
| 10,166,951 B2 | 1/2019 | Kawashima et al. | |
| 10,189,445 B2 | 1/2019 | Tolentino et al. | |
| 10,363,905 B2 | 7/2019 | Tolentino | |
| 10,457,252 B2 | 10/2019 | Tolentino | |
| 10,464,533 B2 | 11/2019 | Tolentino et al. | |
| 11,208,077 B2 * | 12/2021 | Goh | B60S 1/381 |
| 2005/0028312 A1 | 2/2005 | Coughlin | |
| 2008/0289133 A1 | 11/2008 | Kim | |
| 2009/0044365 A1 * | 2/2009 | Koppen | B60S 1/3879 |
| | | | 15/250.31 |
| 2009/0151110 A1 | 6/2009 | Ku | |
| 2009/0199357 A1 | 8/2009 | Thienard | |
| 2009/0307862 A1 | 12/2009 | Boland et al. | |
| 2010/0205763 A1 | 8/2010 | Ku | |
| 2011/0005020 A1 | 1/2011 | Koppen et al. | |
| 2011/0247166 A1 | 10/2011 | Depondt et al. | |
| 2011/0277264 A1 | 11/2011 | Ehde | |
| 2012/0060315 A1 | 3/2012 | Avasiloaie et al. | |
| 2014/0000056 A1 * | 1/2014 | Bratec | B60S 1/4041 |
| | | | 15/250.32 |
| 2014/0259504 A1 | 9/2014 | Piotrowski et al. | |
| 2014/0317875 A1 | 10/2014 | Tolentino et al. | |
| 2014/0366302 A1 * | 12/2014 | Song | B60S 1/4067 |
| | | | 15/250.32 |
| 2015/0258967 A1 | 9/2015 | Lepper et al. | |
| 2015/0353054 A1 | 12/2015 | Tolentino et al. | |
| 2017/0305391 A1 * | 10/2017 | Jomard | B60S 1/4077 |
| 2017/0334403 A1 | 11/2017 | Kawashima | |

FOREIGN PATENT DOCUMENTS

| | | | |
|---|---|---|---|
| CN | 101311043 A | 5/2007 | |
| CN | 101674962 A | 5/2007 | |
| CN | 104349952 A | 6/2012 | |
| CN | 106573599 A | 7/2014 | |
| CN | 102596659 B | 5/2015 | |
| CN | 103687758 B | 12/2016 | |
| DE | 2331324 | * | 1/1974 |
| DE | 202005021307 U1 | 12/2004 | |
| DE | 102005016486 A1 | 4/2005 | |
| DE | 202008011314 U1 | 8/2008 | |
| DE | 102009000483 A1 | 9/2008 | |
| DE | 102009043695 A1 | 10/2009 | |
| DE | 20091046788 | 11/2009 | |
| DE | 202011001119 U1 | 3/2011 | |
| DE | 102010041152 A1 | 5/2011 | |
| DE | 102012110738 A1 | 11/2011 | |
| DE | 102011079783 A1 | 1/2013 | |
| DE | 102015215709 A1 | 8/2015 | |
| EP | 0231129 B1 | 5/1987 | |
| EP | 0255352 B1 | 3/1988 | |
| EP | 1849666 A1 | 4/2006 | |
| EP | 25535231 A1 | 6/2011 | |
| EP | 2546115 A2 | 7/2011 | |
| EP | 2861467 B1 | 6/2012 | |
| EP | 2501591 B1 | 8/2013 | |
| EP | 3164303 B1 | 7/2014 | |
| EP | 2360070 | 9/2014 | |
| EP | 2736775 B1 | 10/2015 | |
| ES | 2428821 T3 | 11/2013 | |
| ES | 2552997 T3 | 12/2015 | |
| FR | 2031697 | * | 11/1970 |
| FR | 219078 A5 * | 1/1974 | |
| FR | 2195956 A6 | 3/1974 | |
| FR | 2254959 A6 | 11/1975 | |
| IN | 2066DEN2012 | 8/2015 | |
| JP | 5362118 B2 | 12/2013 | |
| KR | 100891195 B1 | 4/2008 | |
| KR | 100903374 B1 | 7/2008 | |
| KR | 101381152 B1 | 4/2014 | |
| PL | 2501591 T3 | 1/2014 | |
| RU | 2381120 C2 | 10/2003 | |
| RU | 2686270 C1 | 6/2012 | |
| RU | 2014106909 A | 8/2017 | |
| WO | 2004069618 A1 | 2/2003 | |
| WO | 2006106006 A1 | 4/2005 | |
| WO | 2006128763 A1 | 6/2005 | |
| WO | 2009071372 A1 | 12/2007 | |
| WO | 2011040743 | 9/2009 | |
| WO | 2011060979 A1 | 5/2011 | |
| WO | 2013186111 A1 | 6/2012 | |
| WO | 2013013958 A1 | 1/2013 | |
| WO | 2016000785 A1 | 7/2014 | |
| WO | 2017080783 A1 | 11/2015 | |
| WO | 2017115880 | * | 7/2017 |

OTHER PUBLICATIONS

Reflex Platinum Wiper Blades, Installation Instructions (2 pages).
Reflex Platinum Wiper Blade, Canadian Tire, Canada; retrieved from the Internet Feb. 11, 2020; <https://www.canadiantire.ca/en/pdp/reflex-platinum-wiper-blade-0211866p.html> (5 pages).
Rain X Silicone AdvantEdge; retrieved from the Internet Feb. 19, 2020; <https://www.rainx.com/silicone-advantedge/> (5 pages).

(56)  References Cited

OTHER PUBLICATIONS

How to Install Rain-X Silicone AdvantEdge Wiper Blades; retrieved from the Internet Feb. 19, 2020; <https://www.rainx.com/installation-instructions/how-to-install-rain-x-silicone-advantedge-wiper-blades/> (2 pages).

Wiper Blade Removal Instructions; retrieved from the Internet Feb. 19, 2020; <https://www.rainx.com/instructions/wiper-blade-removal-instructions/> (1 page).

Rain X Silicone AdvantEdge Premium Wiper Blade; retrieved from the Internet Feb. 19, 2020; <https://shop.advanceautoparts.com/p/rain-x-silicone-advantedge-premium-beam-wiper-blade-22-inch-830022/11920347-P> (2 pages).

* cited by examiner

68

2050

2082

2050

66

62

2094

2050

52

3576

3050

52

3576

3050

58

3576

3050

69

3576

3050

54

3050

3050

62

60

4676

4050

69

4676

4050

4050

4582

64

WINDSHIELD WIPER ARM ADAPTER, COUPLER AND ASSEMBLY

CROSS-REFERENCE TO RELATED APPLICATIONS

This application is a continuation-in-part of, and claims priority to, International Patent Application No. PCT/US2019/018462 filed on Feb. 19, 2019 (published as WO 2019/161348), which claims the benefit of U.S. Provisional Patent Application No. 62/713,712 filed on Aug. 2, 2018 and U.S. Provisional Patent Application No. 62/632,199 filed on Feb. 19, 2018. The contents of the aforementioned applications are herein incorporated by reference in their entireties.

BACKGROUND

Vehicle manufacturers utilize a variety of windshield wiper arms and wiping elements. As will be appreciated, the wiping element wears over time and requires replacement. However, due to the variety of wiper arms, the end user is faced with an overwhelming number of choices to ensure that the proper wiping element is selected that is compatible with the wiper arm of their vehicle. As such, there is a need for an adapter and coupler that allows the end user to utilize a variety of wiping elements independent of the type of wiper arm that is present on their vehicle.

In particular, vehicles can be outfitted with different styles of wiper arms, which tend to vary across vehicle manufacturers. Traditionally, a wiper blade which includes a wiping or wiper element can be connected to a wiper arm only if a coupler or adapter attached to or included in the wiper arm is compatible with the specific style of the wiper arm. Thus, a wiper blade that includes a coupler configured to engage one particular wiper arm style typically is not compatible with other wiper arm styles, and cannot be used on vehicles that utilize such other wiper arm styles.

An adapter may be designed to allow a wiper blade to engage different wiper arm styles. However, existing adapters are inadequate and/or fail to account for various challenges. One problem with existing adapters is their lack of versatility in terms of accommodating various wiper arm styles. Currently, the vast majority of wiper arms utilized in vehicles can be grouped into a few primary wiper arm styles. These include hook style, push button style, pin style, and/or pinch tab style wiper arms. However, many traditional adapters typically are capable of connecting a wiper blade to wiper arms having a very limited number of wiper arm styles or configurations. As such, these adapters do not provide a single adapter solution that can connect a wiper blade to different wiper arm styles commonly used across major vehicle manufacturers.

This lack of versatility also extends to accommodating varying dimensions of wiper arm styles. That is, a style of a wiper arm may be available in different configurations having different dimensions (e.g., diameter lengths, member widths, or other size measurements), while still utilizing the same or a very similar connection scheme for connecting to a wiper blade. Traditional adapters not only fail to accommodate the various wiper arm styles, they also fail to accommodate for varying configurations and dimensions of wiper arms that fall within the same category of wiper arm style.

The lack of versatility associated with traditional adapters can be attributed, at least in part, to engineering or design constraints. In particular, it is desirable for such adapters to be appropriately sized and have small form factors, while being able to accommodate differing wiper arm styles and configurations that are outfitted on vehicles. As the number of variations in wiper arms increase due to varying styles and dimensions, the size of the adapters and/or the number of parts they require may increase to a point where the adapter is too large and/or cumbersome to be used in wiper assemblies. Thus, many existing adapters are able to accommodate a very limited number of wiper arm styles and/or configurations.

Additional engineering considerations concern ensuring that connections with the wiper elements and wiper arms are secure and robust. For example, while a single adapter may provide an appropriate connection to a wiper arm having a particular style, it is challenging to design an adapter that can provide robust connections for each of a plurality of wiper arm styles and dimensions, especially in light of the aforementioned size constraints. Certain styles of wiper arm, such as hook style wiper arms, are particularly difficult to integrate into adapters that accommodate multiple wiper arm styles. This can be attributed, at least in part, to the manner in which they are typically attached to the adapters (e.g., by hooking or latching to the external housing of the adapters), which in turn can prevent the same adapters from accommodating many other types of wiper arm styles such as push button or pinch tab style wiper arms.

Other deficiencies associated with traditional adapters lie in difficulties faced when installing and uninstalling the adapters. In many cases, the installation or uninstallation process may require an end user (including an automotive professional or other individual) to expend significant amounts of time connecting or disconnecting the adapter and wiper blade to/from the wiper arm. In scenarios in which a traditional adapter can accommodate more than one wiper arm style, such an adapter often must be manipulated or modified before connecting to particular wiper arm styles. This may require additional hardware (e.g., shims, nuts, screws, connection components) to be attached and/or removed from the adapter, and/or several actions to be taken such as pulling locking tabs, locating and properly orienting certain components, and/or engaging or pushing them, each time an end user tries to connect the adapter to a wiper arm having a particular wiper arm style. In addition to the difficulty associated with modifying the adapter depending on the wiper arm style, end users are often unable to locate or track down the hardware necessary for transitioning the adapter, especially given the often lengthy time intervals that separate an initial installation of the adapter and a subsequent re-installation.

Accordingly, there is a need for an adapter and coupler that overcome the various challenges and deficiencies discussed herein, and enable end users to conveniently connect and disconnect wiper blades to/from a variety of wiper arm styles.

SUMMARY

In view of the foregoing, an adapter connects with a coupler that is connected with a wiper element. The adapter includes a body having a cavity and openings for receiving distal ends or distal end features of each of a plurality of different wiper arms each having a different wiper arm style.

According to another aspect, a coupler connects a wiper element with an adapter; the coupler includes a post that pivotally connects the coupler and the associated adapter together so as to define a pivot axis about which the associated adapter pivots. The post defines an obround cross-section in a plane orthogonal to the pivot axis. The coupler also includes a back wall that includes an adapter facing surface that faces the associated adapter and is generally orthogonal to the pivot axis of the post.

According to another aspect, a wiper set includes an adapter configured to receive at least one wiper arm. The adapter includes an adapter attachment mount having an entry passage defined by generally parallel entry passage sidewalls that define an entry passage width extending between the entry passage sidewalls and a pivot passage defined by a pivot passage sidewall having a major arc that terminates into the entry passage sidewalls so as to be in fluid communication with the entry passage sidewalls. The wiper set also includes a coupler that pivotally receives the adapter. The coupler includes a post that defines a pivot axis about which the adapter pivots and a back wall including an adapter facing surface that faces the adapter.

DETAILED DESCRIPTION

Figure 1:
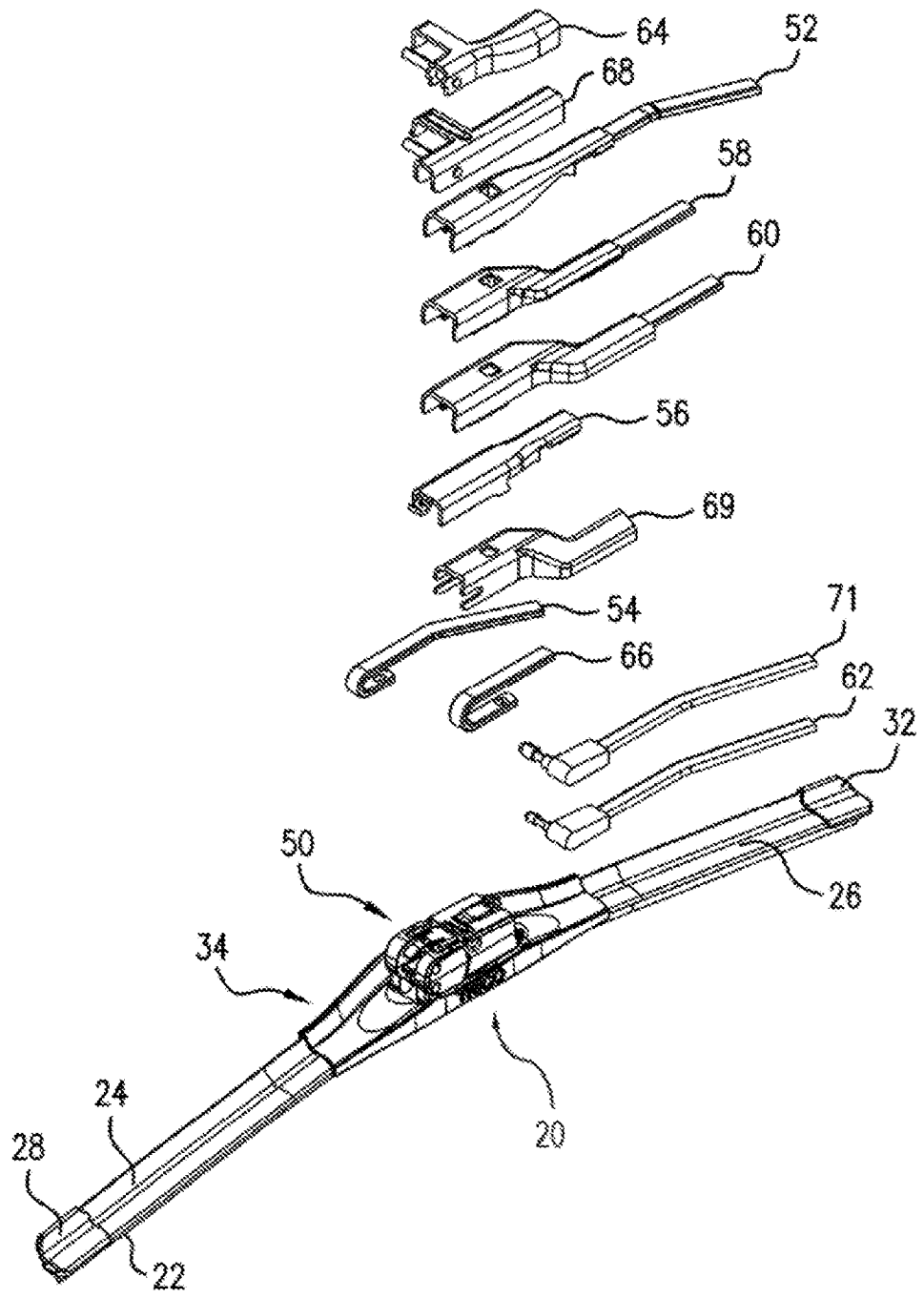
FIG. 1 is a perspective view of a windshield wiper assembly with a plurality of wiper arms and a coupler.

This disclosure describes exemplary embodiments of adapters, wiper elements, couplers, and wiper assemblies and sets, as well as related systems, methods, and apparatuses. The embodiments described in this disclosure can be combined in various ways. Any aspect, feature, or advantage that is described in relation to one embodiment can be incorporated into any other embodiment referenced in this disclosure. Similarly, certain aspects, features, or advantages that are described in relation to an embodiment are not necessary for inclusion in that embodiment, and may be omitted or excluded from that embodiment in some cases.

As discussed herein, the exemplary embodiments described in this disclosure can provide numerous advantages and improvements that overcome one or more of the above-described problems and deficiencies, as well as other problems and deficiencies not explicitly mentioned herein.

In certain embodiments, a versatile adapter is provided which can accommodate connections between wiper blades (and in particular, the coupler disposed on such blades and attached to the wiping or wiper element) and a plurality of different wiper arm styles. For example, in some embodiments, a single adapter can facilitate connections with wiper arms that utilize hook style, push button style, pin style, and/or pinch tab style wiper arms. Additionally, the adapter can be configured to accommodate multiple configurations (e.g., sizes or dimensions) for some or all of these wiper arm styles. In accommodating these varying styles and configurations of wiper arms, the adapter provides an all-in-one solution that allows the end user to utilize a variety of wiper blades with many makes and models of vehicles regardless of the wiper arm style on the vehicle.

In certain embodiments, the adapters incorporate a compact design that is able to accommodate a wide variety of wiper arm styles and configurations, while maintaining a small profile that is non-obtrusive and appropriate for use in a wiping assembly. While the design and dimensions of the adapter can vary, the solutions described herein enable the adapter to be sized appropriately for both functional and aesthetic considerations and purposes.

In certain embodiments, various features on the adapters are strategically designed, positioned and sized so as to enable those features to serve multiple purposes and/or for connection/release of multiple wiper arm styles. In one example, an interior cavity of the adapter may receive multiple wiper arm styles (e.g., hook, push button, and pinch tab arms). In another example, an upper proximal tab can be integrated on a portion of the adapter that enables it to serve as an engagement and disengagement mechanism for multiple wiper arm styles. The disclosure herein discusses these and other features that can be utilized for multiples purposes and/or for connection of multiple wiper arm styles, thus contributing to the compact size, versatility and ease of use of the adapters.

In certain embodiments, another aspect that contributes to these advantages of the adapters relates to configurations of the interior cavities defined by the adapters. For example, in some cases, the interior cavity can receive portions from multiple wiper arm styles (e.g., including hook, push button, and/or pinch tab arms) to facilitate connections with various wiper arm styles and/or configurations. Additionally, the interior cavity of an adapter can include flexible structures (e.g., such as a flexible inner body walls) that expand and contract to permit engagement and locking of wiper arms to the adapter, and to accommodate connections of different wiper arm styles and/or different wiper arm configurations.

In certain embodiments, the manner in which the adapter is connected to various wiper arms, as well as the manner in which the adapter is connected to the coupler, help ensure that the connections between wiper blades and wiper arms are robust and secure. For example, by receiving various wiper arms (e.g., hook, pinch tab, and/or push button styles) within the interior cavity of the adapter, the wiper arm is more robustly and durably attached in comparison to connection schemes that attempt to fasten the wiper arms to an external portion of an adapter. Such robust connections help ensure that the wiper blades function properly and prevent them from becoming dislodged during operation, which can be particularly dangerous when a vehicle is operating in inclement weather and/or with reduced visibility conditions.

In certain embodiments, the adapters and couplers can also include corresponding connection portions that facilitate secure and robust connections among each other, while still enabling the wiper elements to be easily attached and detached. For example, a coupler can be outfitted with a pair of obround-shaped posts that can engage and connect to corresponding entry passages included on an attachment mount of an adapter. In addition to securely connecting the adapter to the coupler, this connection scheme allows the adapter to pivot or rotate while accommodating motions of different wiper arms during operation of the wiper assembly.

Moreover, the designs of various embodiments of the adapter make these adapters easy to manufacture. In certain embodiments, the manner in which the adapter is designed and/or assembled also contributes to providing robust connections between the wiper blades and wiper arms. For example, in certain embodiments, an adapter may be comprised of three separate portions or bodies including an upper body, lower body, and inner body. These bodies may be connected together (e.g., using ultrasonic welding and/or other techniques) to provide a single, unitary component. This way, the adapter, and in particular, its interior portions can be outfitted with detailed features that interact and/or engage with various features of different wiper arm styles and configurations to strengthen the connection between the adapter and the wiper arm.

Additional advantages associated with various embodiments described herein can be attributed to the ease by which the adapters can be installed and uninstalled on both wiper arms and wiper elements. For example, in certain embodiments, the adapters can be easily installed and uninstalled on a wiper arm in a matter of seconds without requiring assistance from an automotive professional. In particular, as discussed in more detail below, wiper arms may be connected to the adapter by fitting portions of the wiper arms into an interior cavity of the adapter, inserting pins to side openings in the adapter, and/or allowing the various adapter features to engage those of the wiper arm depending on the type of wiper arm outfitted on the vehicle. Preferably, the same cavity is designed to receive several wiper arms having different configurations and dimensions (e.g., different types/sizes of arms having push button, pinch tab, hook, styles) thereby further making it easy and simple for the end-user who need not be concerned with how/where to configure the adapter in order to install these different wiper arms. Moreover, installation is made simple by virtue of not requiring additional hardware (e.g., shims, nuts, screws, connection components) to be attached and/or removed from the adapter, or other actions to be taken, such as pulling locking tabs, closing or snapping caps. Preferably, the various wiper arms may lock into the adapter merely by sliding them in and allowing the appropriate tab, or other barb, protrusion or feature(s) to automatically engage corresponding features disposed on the wiper arm as a result of the force exerted to insert the arm. The wiper arm can then be disconnected using one or more release tabs that allow for disengagement of the adapter. Similarly, the adapters can be easily attached and detached from the wiper blades. For example, a connection between obround posts included on the coupler attached to the wiper element and an attachment mount included on the adapter permits easy engagement and/or disengagement of the adapter from a wiper blade.

The adapter discussed herein in accordance with various embodiments may be a single, unitary piece of equipment that is easy to manufacture and assemble, and is outfitted with features that accommodate a plurality of different wiper arm styles and configurations, and does not require modification, meaningful manipulation, or any additional hardware to or install/uninstall the adapter, or to switch the adapter for use with different wiper arm styles and/or dimensions.

FIG. 1 depicts a windshield wiper assembly 20 useful to clean the glass windshield of a vehicle (not shown). The windshield wiper assembly 20 generally includes a wiping element 22 mounted to an airfoil, which can include a distal airfoil 24 and a proximal airfoil 26. The proximal airfoil 26 is positioned closer to a wiper motor (not shown) that drives the windshield wiper assembly 20 moving the windshield wiper assembly 20 across the windshield. A distal airfoil endcap 28 attaches to a distal end of the distal airfoil 24. A proximal airfoil end cap 32 attaches to a proximal end of the proximal airfoil 26. A wiper set 31 can include a coupler 34 and an adapter 50.

FIG. 1 also illustrates a variety of wiper arms including a push button 19 mm wiper arm 52, a standard hook wiper arm 54 (e.g., a 9×3 mm hook wiper arm), a pinch tab wiper arm 56, a push button 22 mm short wiper arm 58, a push button 22 mm wiper arm 60, side lock 188 (i.e., 3/16 inch diameter) wiper arm 62, side pin wiper arm 64, large hook wiper arm 66 (e.g., a 9×4 mm hook wiper arm), a side pin offset wiper arm 68, a fitted zone ("fz") wiper arm 69, and a side lock 250 (i.e., 1/4 inch diameter) wiper arm 71. The coupler 34 is disposed along an intermediate position between and is connected with the distal airfoil 24 and the proximal airfoil 26. A spring (not visible) can be provided between the airfoil 24, 26 and the wiping element 22 to urge the wiping element toward the windshield.

The standard hook wiper arm 54 and large hook wiper arm 66 are examples of hook style wiper arms (e.g., which may be generally characterized as having a distal end with a shape of a hook similar to those specific arms shown in FIG. 1). The push button 19 mm wiper arm 52, push button 22 mm short wiper arm 58, push button 22 mm wiper arm 60, and fz wiper arm 69 are examples of push button—or push tab button—style wiper arms (e.g., which may be generally characterized as having a surface opening for engaging and locking into a button disposed on a wiper blade or adapter, similar to those specific arms shown in FIG. 1). The side lock 250 wiper arm 71, side lock 188 wiper arm 62, side pin wiper arm 64, and side pin offset wiper arm 68 are examples of pin style wiper arms (e.g., which may be generally characterized as having a protruding pin for insertion into a wiper blade or adapter hole, similar to those specific arms shown in FIG. 1). The pinch tab wiper arm 56 is an example of a pinch tab style wiper arm (e.g., which may be generally characterized as having a pinch tab for engaging and locking into a hook or button disposed on a wiper blade or adapter, similar to the specific one shown in FIG. 1).

In some cases, certain wiper arms may be characterized as falling within more than one wiper arm style. For example, certain wiper arms may include both a pinch tab and a push button opening and, thus, may correspond to a pinch tab style wiper arm and/or a push button style wiper arm. Additionally, each of the wiper arms styles may include additional features that assist with connecting corresponding wiper arms with a wiper blade. For example, in addition to including a surface opening that facilitates engagement with an adapter, fz wiper arm 69 also can include a lower groove that assists with connecting this wiper arm to the wiper blade. Similarly, in addition to including protruding pins that engage side openings of the adapter, the side pin wiper arm 64 and side pin offset wiper arm 68 also may include a side pin arm that can be received within certain cutouts disposed in adapters or wiper blades.

With reference to FIGS. 2A-2E, the coupler 34 includes a back wall 36 which defines an adapter-facing surface 38. The coupler 34 also includes an adapter attachment, which can be an integrally formed post 35. The post 35 allows for a pivotal connection between the coupler 34 and the adapter 50. The post defines a pivot axis 37 about which the associated adapter 50 pivots. Further, the post 35 can define an obround cross-section in a plane orthogonal to the pivot axis 37.

The back wall 36 of the coupler 34 can be generally orthogonal to the pivot axis 37. The post can include a first post portion 35a and a second post portion 35b that are disposed on the pivot axis 37 and can be laterally spaced from one another. The post 35 can also include a pair of curved surfaces 43a, 43b that are separated by a pair of flat surfaces 45a, 45b.

The coupler 34 can also include a base wall 47 with a base surface 47a that is generally orthogonal to the back wall 36. The coupler 34 can also include a limit ledge 49 that extends from the adapter facing surface 41 toward the adapter 50 for contact with a stop member 51 (see, e.g., FIG. 4) of the adapter 50 as will be described in more detail hereinafter.

The coupler 34 can define a first inclusive angle 53 that extends from the base surface 47a to the limit ledge 49 about the pivot axis 37 and a second inclusive angle 55 that extends from the base surface 47a to a line that extends through the pivot axis 37 and is parallel to the pair flat surfaces 45a, 45b of the post 35. The second inclusive angle 55 can be greater than the first inclusive angle 53 and can be equal to 90 degrees.

Figure 4:
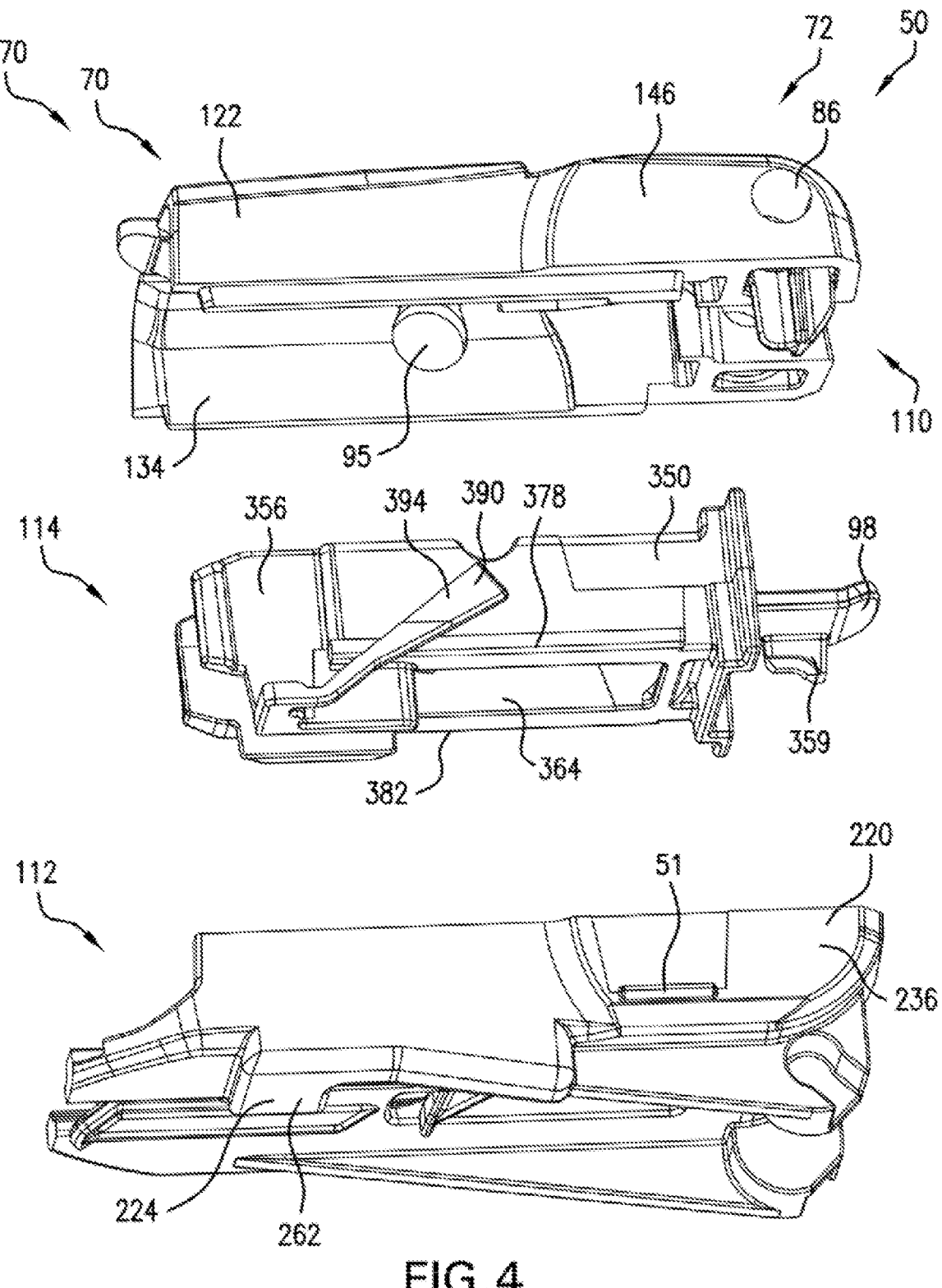
FIG. 4 is an exploded rear perspective view of the adapter of FIG. 1.

The adapter 50 can be made of a variety of materials, including for example, various blends of plastics and polymers, without departing from the scope of this disclosure. Additionally, it will be appreciated that the adapter 50 could also be made by a variety of processes, including for example, 3-D printing and injection molding. In certain embodiments, the adapter 50 can be fabricated in three separate pieces (e.g., an upper body 110, a lower body 112, and an inner body 114 as shown in FIG. 4) which are then combined together. The separate pieces can be combined using welding (e.g., ultrasonic welding) techniques in some cases. Additionally, or alternatively, the separate pieces can be combined using fusion, bonding, and/or mechanical coupling techniques (e.g., which use latches, snap connectors, and/or other physical couplers to permit assembly). In certain embodiments, some or all of the pieces may be made from a polymer or plastic (e.g., thermoplastic) that has favorable properties. Preferably, the material from which the adapter is made has sufficient flexibility, so as to permit expanding and/or contracting in order to connect to various wiper arms, and engage and/or latch onto features thereof. The type and thickness of the material/features can be chosen and designed so as to permit an end-user to conveniently insert, connect, engage, disengage, disconnect, and/or release the various wiper arms, without having to exert excessive force. The material is also sufficiently resilient and durable so as withstand continuous operation and use, and avoid breakage. The material may be a lightweight, low-friction and wear-resistant material having dimensional stability. For example, the material from which the adapter is made may be polyoxymethylene, an acetal copolymer, or similar thermoplastic polymer. It will also be appreciated that the following discussion relating to the adapter 50 is also applicable to a second adapter 1050, a third adapter 2050, a fourth adapter 3050, and a fifth adapter 4050 that will also be described in more detail hereinafter.

The adapter 50 can include an adapter attachment mount 57 having an entry passage 59 defined by generally parallel entry passage sidewalls 59a, 59b that define an entry passage width that extends between the entry passage sidewalls 59a, 59b. The adapter 50 can also include a pivot passage 61 defined by a pivot passage sidewall 61a having a major arc that terminates into the entry passage sidewalls 59a, 59b so as to be in fluid communication with the entry passage sidewalls 59a, 59b. The major arc of the pivot passage 61 defines a pivot passage diameter that is greater than the entry passage width. The entry passage 59 is configured to slidingly receive the coupler 34 and the pivot passage 61 is configured to pivotally receive the coupler 34.

Figure 2A:
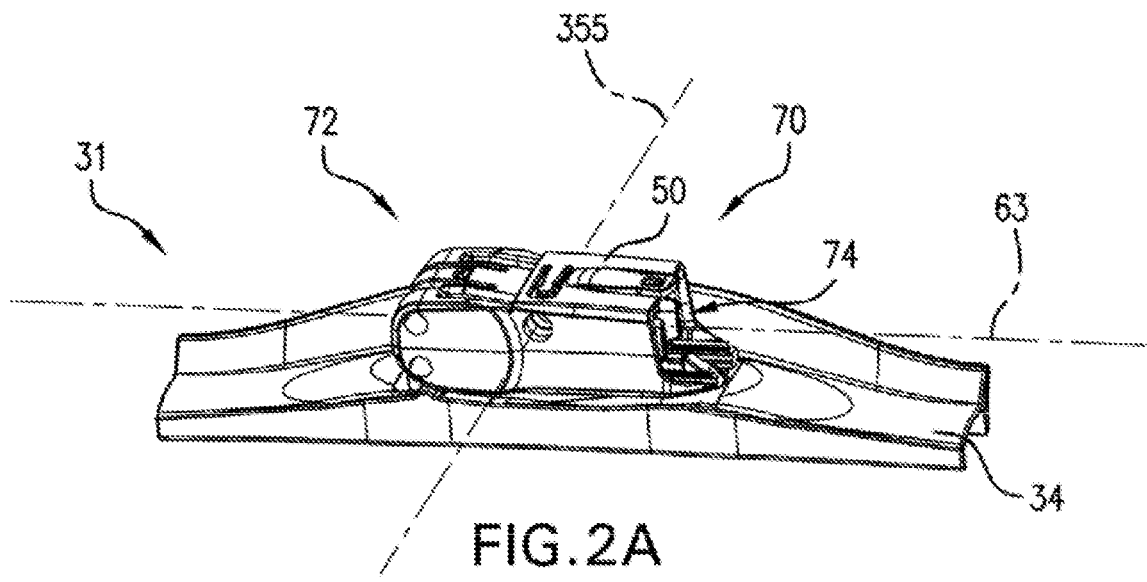
FIG. 2A is a perspective view of a wiper set in an operation mode, non-removable stage.
Figure 2B:
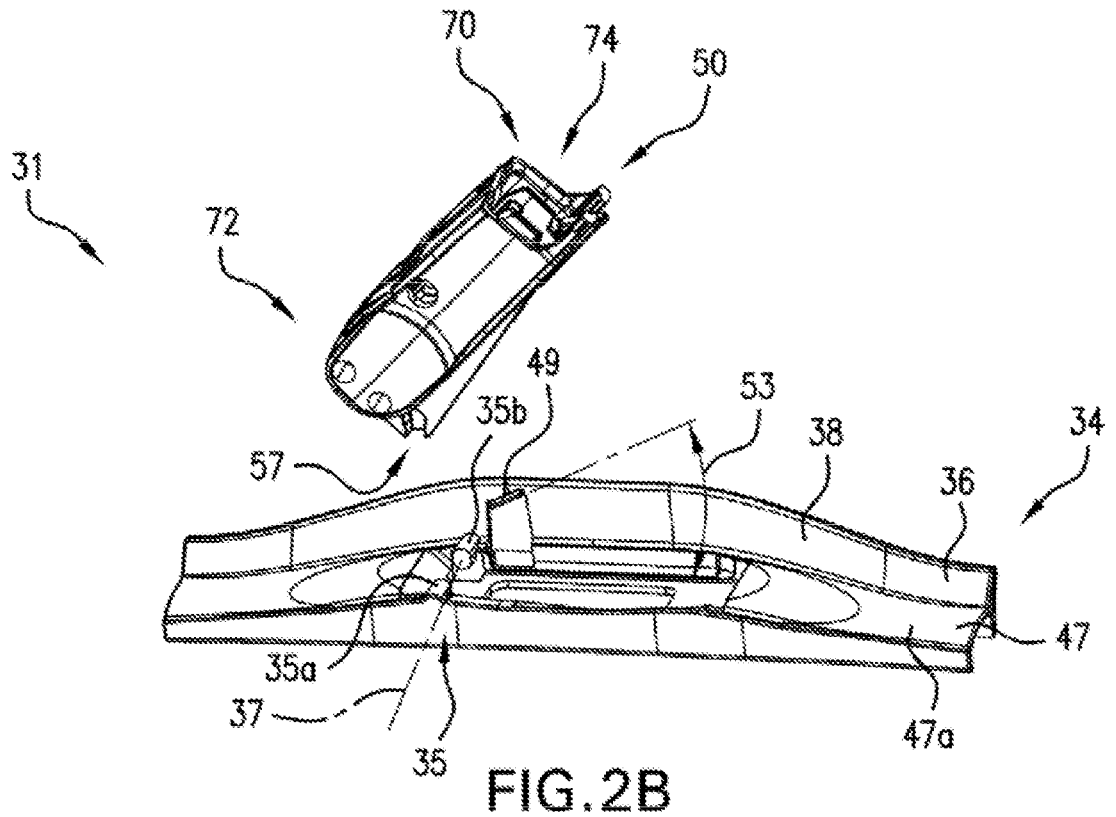
FIG. 2B is a perspective view of the coupler and adapter separated from one another showing a first inclusive angle.
Figures 2C, 2D, 2E:
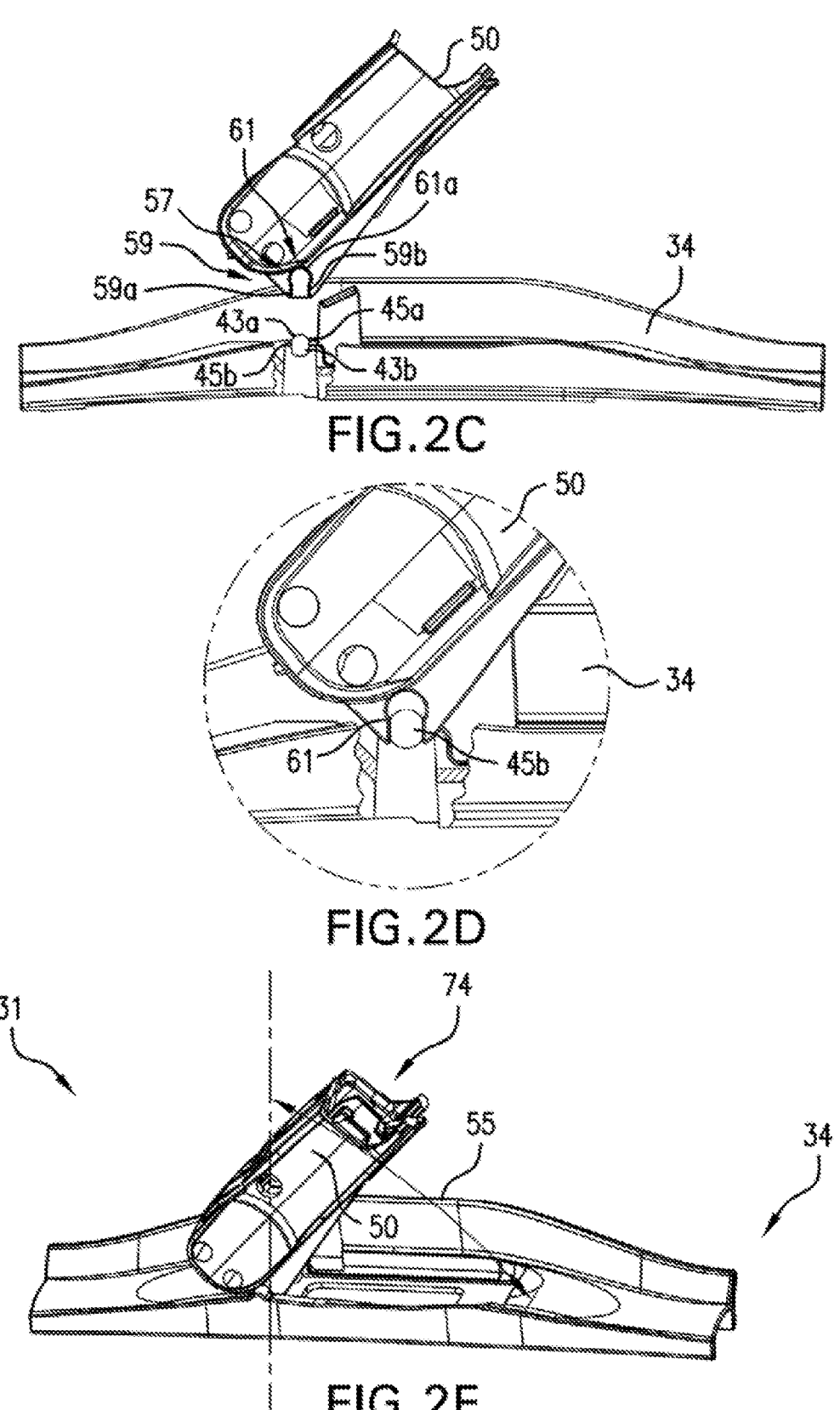
FIG. 2C is a perspective view of the wiper set.
FIG. 2D is a partial perspective view of the wiper set in an installation mode.
FIG. 2E is a perspective view of the wiper set in an operation mode, removable stage.

As shown in FIG. 2D, the wiper set 31 defines an installation mode when the post 35 is received in the entry passage 59 and adapter 50 is not pivotable. The wiper set also defines an operation mode when the post 35 is received in the pivot passage 61 and the adapter 50 is pivotable as illustrated in FIGS. 2A and 2E.

The limit ledge 49 of the coupler 34 and the stop member 51 of the adapter 50 interact with one another so as to divide the operation mode into a separable stage in which the adapter 50 and the coupler 34 are separable from one another as shown in FIG. 2E and a non-removable stage in which the adapter 50 and the coupler 34 are not separable from one another as illustrated in FIG. 2A.

The coupler 34 can alternatively include a limiter (not shown) that is disposed between, and spaced from, the first post portion 35a and the second post portion 35b. This limiter can upwardly extend from the interior surface of the coupler floor to a height that is below pivot axis 37. The limiter's upper surface may be in the shape of a square or rectangular box and defines a length that extends in a lateral direction of the coupler 34 (i.e., parallel to the pivot axis 37) as well as a width that extends in a longitudinal direction of the coupler 34 (i.e., parallel to the longitudinal axis 63). This limiter can interact with the adapter attachment mount 57 and serves to limit transverse movement of the adapter 50 during operation so as to primarily minimize chatter resulting from unwanted fishtailing of the blade as the wiper assembly moves across the windshield.

The adapter 50 can be a one-piece body having a proximal end 70 and a distal end 72. With continued reference to FIGS. 2A-2E, the proximal end 70 of the adapter 50 is open to a cavity 74. The distal end 72 is curved and primarily closed. The adapter 50 defines a longitudinal axis 63 that extends between the proximal end 70 and the distal end 72.

The connection scheme for the adapter 50 and the coupler 34 provides various benefits which can be attributed, at least in part, to the obround-shaped posts 35 and corresponding entry passages 59. One benefit is that the connection with the posts 35 enables the adapter 50 to pivot or rotate in operation mode to accommodate the motions of various wiper arms as the blade moves across a vehicle's windshield, and ensure that wiper elements function properly during operation. For example, when configured in operation mode, the adapter 50 is permitted to pivot or rotate to the first inclusive angle 53, while the limit edge 49 and stop member 51 prevent the adapter 50 from being further rotated to a larger angle that would allow disengagement of the adapter 50.

Another benefit is that the obround shape of the posts 35, and the corresponding shapes of the entry passages 59, enable the adapter 50 to be easily attached and detached from the coupler 34. To attach or install the adapter 50 to the coupler 34, the bottom portions of the entry passages 59 can be aligned with the flat surfaces 45 of the posts 35 (e.g., as shown in FIG. 2D) and positioned into the major arc of the entry passages 59. For detaching the adapter 50 from the coupler 34, the adapter 50 may be rotated or pivoted to the second inclusive angle 55 such that the entry passages 59 of the adapter 50 are aligned with the pair of flat surfaces 45a, 45b of the post 35 to permit the adapter to slide off. This allows for easy attachment and detachment of the adapter without the need for additional hardware.

With reference to FIGS. 3-6, the adapter 50 includes a plurality of attachment elements, which will be later described, to allow each of the wiper arms 52-71 (shown in FIG. 1) to connect with the adapter 50. The adapter 50 includes an upper proximal tab 76 that cooperates with the push button 19 mm wiper arm 52, the push button 22 mm short wiper arm 58, the push button 22 mm wiper arm 60, and the fz wiper arm 69 to connect each of these wiper arms 52, 58, 60, and 69 to the adapter 50. Each of the push button style wiper arms 52, 58, 60, and 69 may be installed onto the adapter by inserting the arm into the adapter's cavity 74 and sliding it in until barb 168 (which extends downwardly from the upper proximal tab 76) engages and locks into the push button wiper arm's opening. Each of these push button wiper arms can be uninstalled or detached from the adapter 50 by depressing tab 76 and/or pushing it away from the arm such that barb 168 is no longer locked into the arm's opening, and sliding the arm out of cavity 74. FIGS. 21A-21B, 22A-22B, 23A-23B, and 24A-24B are functional drawings illustrating how these exemplary push button style wiper arms interact with the adapter 50 according to certain embodiments.

Figure 25A:
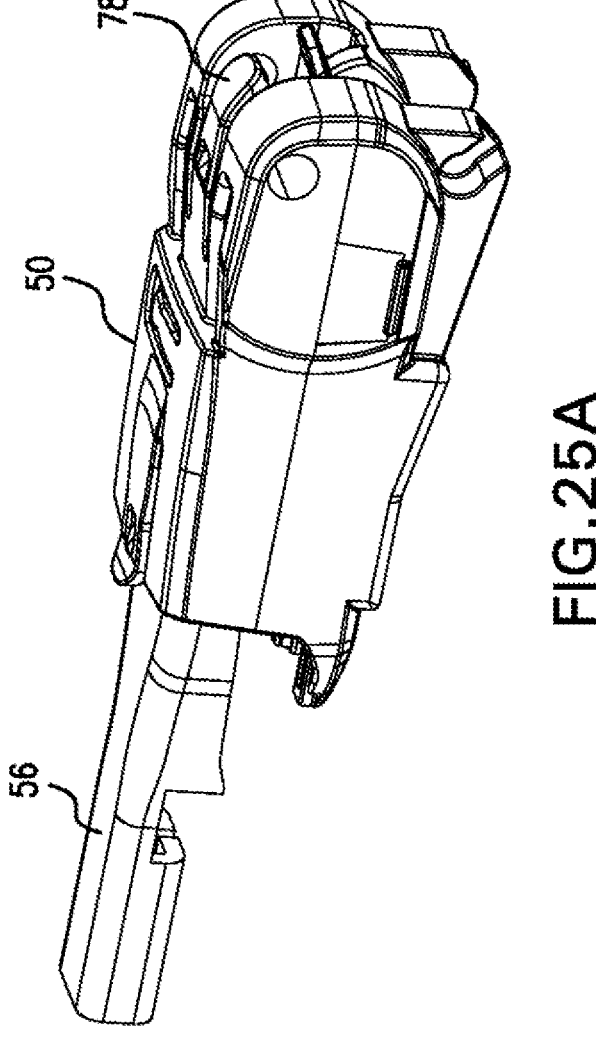
FIG. 25A is a perspective view illustrating a pinch tab wiper arm connected to an adapter.
Figure 25B:
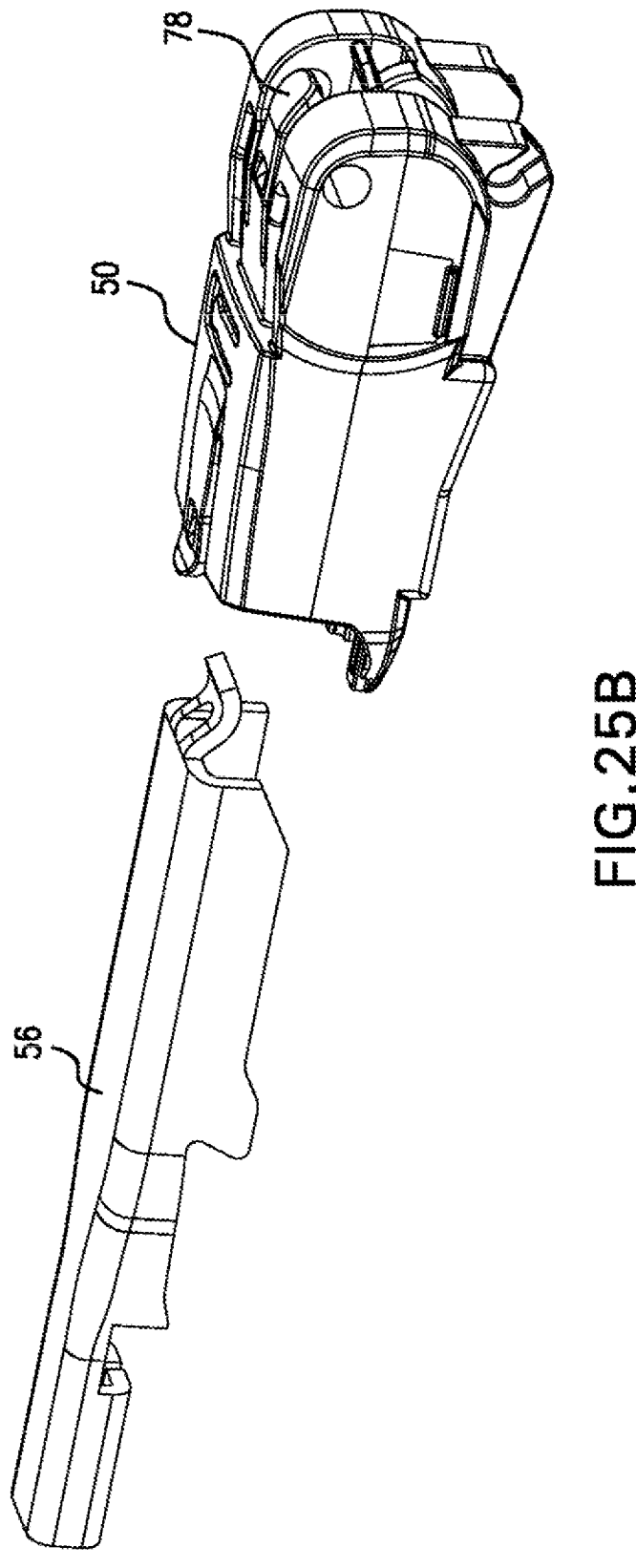
FIG. 25B is a perspective view illustrating how the pinch tab wiper arm of FIG. 25A is received by or removed from an adapter.
Figure 26A:
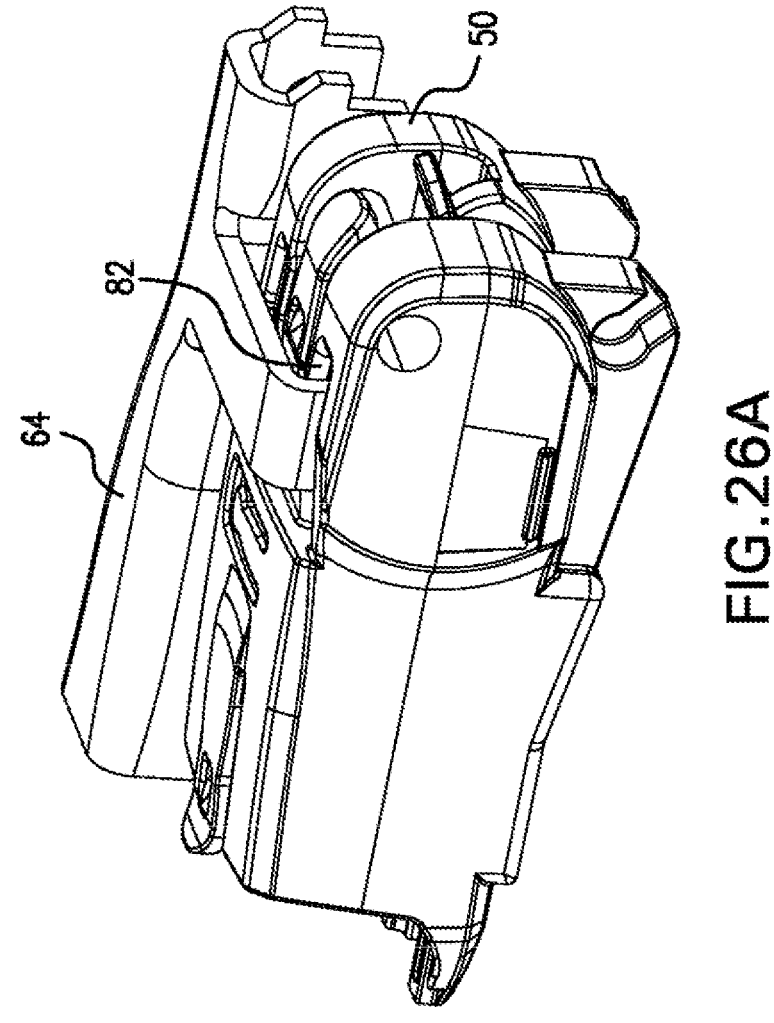
FIG. 26A is a perspective view illustrating a side pin wiper arm connected to an adapter.
Figure 26B:
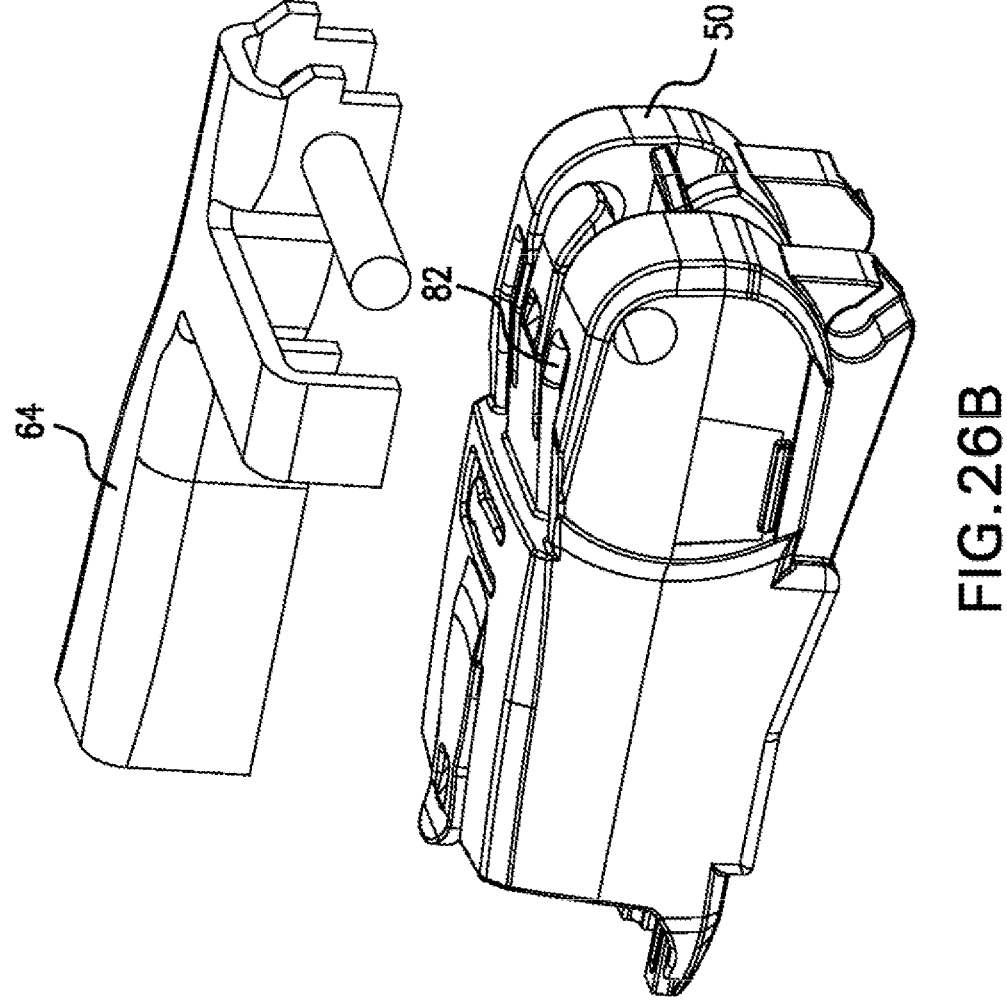
FIG. 26B is a perspective view illustrating how the side pin wiper arm of FIG. 26A is received by or removed from an adapter.
Figure 27A:
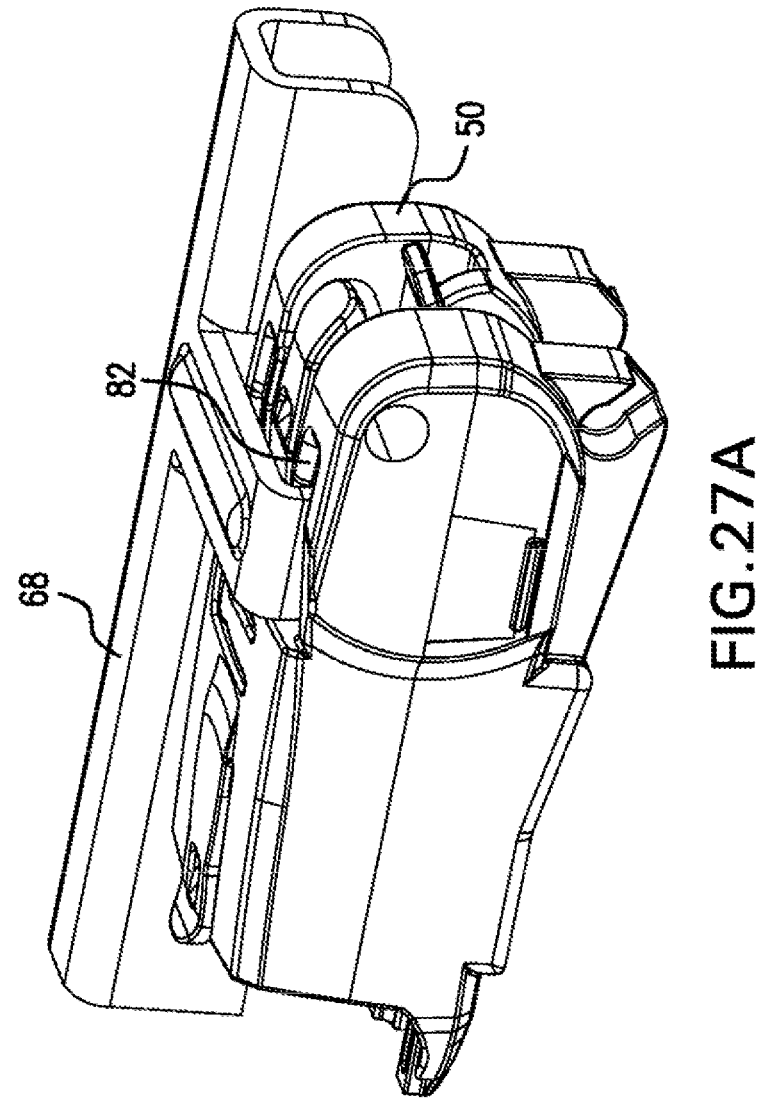
FIG. 27A is a perspective view illustrating a side pin offset wiper arm connected to an adapter.
Figure 27B:
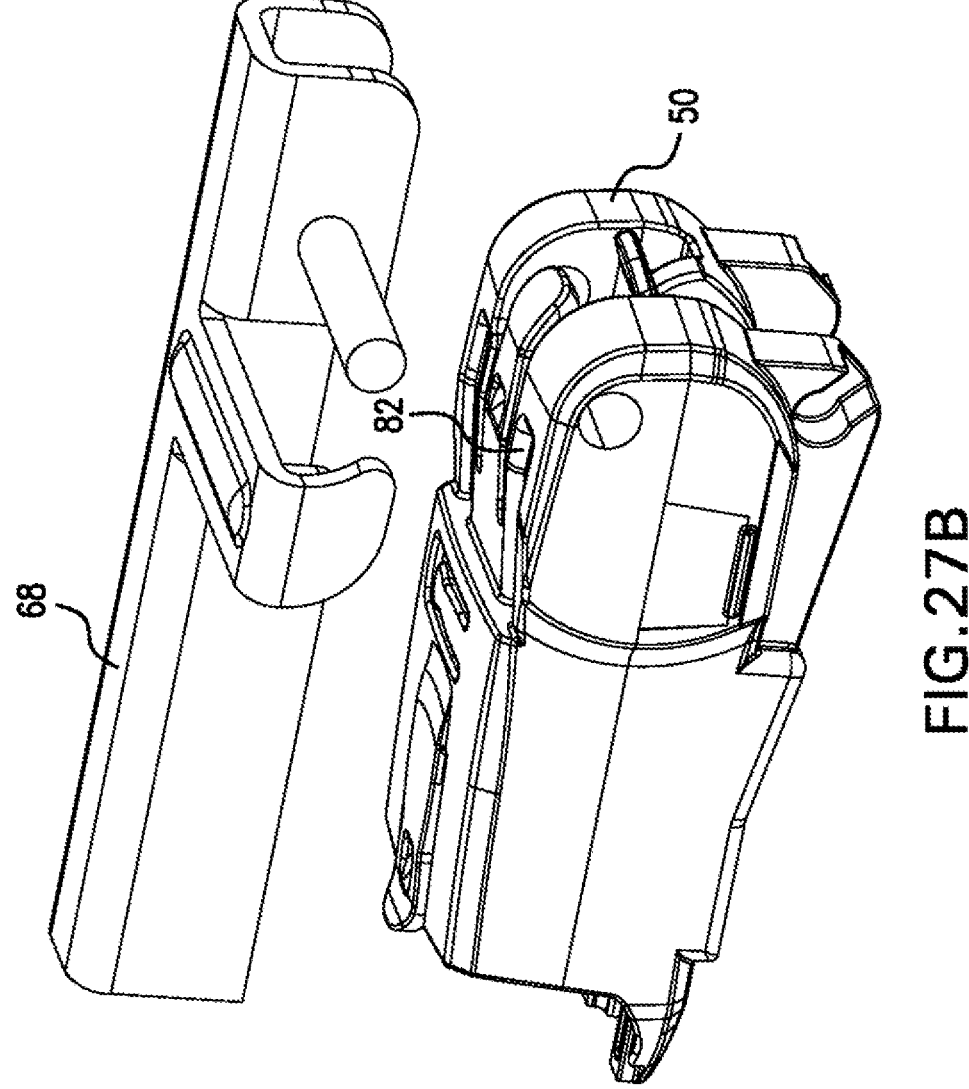
FIG. 27B is a perspective view illustrating how the side pin offset wiper arm of FIG. 27A is received by or removed from an adapter.

The adapter 50 also includes an upper distal tab 78 that cooperates with the pinch tab wiper arm 56 for connecting the pinch tab wiper arm 56 with the adapter 50. The pinch tab wiper arm 56 may be installed onto the adapter by inserting the arm into the adapter's cavity 74 and sliding it in until projection 178 (which extends downwardly from the upper distal tab 78) engages and locks into the pinch tab wiper arm's opening. This pinch tab wiper arm can be uninstalled or detached from the adapter 50 by depressing tab 78 and/or pushing it away from the arm such that projection 178 is no longer locked into the arm's opening, and sliding the arm out of cavity 74. FIGS. 25A-25B are functional drawings illustrating how this exemplary pinch tab style wiper arm interacts with the adapter 50 according to certain embodiments.

The adapter 50 also includes a cutout 82 and a pair of aligned upper transverse openings 86 that cooperate with the side pin wiper arm 64 and the side pin offset wiper arm 68 for connecting the side pin wiper arm 64 and the side pin offset wiper arm 68 to the adapter 50. In particular, the side pin wiper arm 64 and the side pin offset wiper arm 68 may be installed onto the adapter by inserting the protruding pin of these arms into opening 86 and rotating the arm so that the side pin offset in the arm is inserted into cutout 82. The side pin wiper arm 64 and the side pin offset wiper arm 68 can be uninstalled or detached from the adapter 50 by rotating the arm away in the opposite direction and slidably removing the pin from the adapter opening. FIGS. 26A-26B and 27A-27B are functional drawings illustrating how these exemplary pin style wiper arms interact with the adapter 50 according to certain embodiments.

Figure 28A:
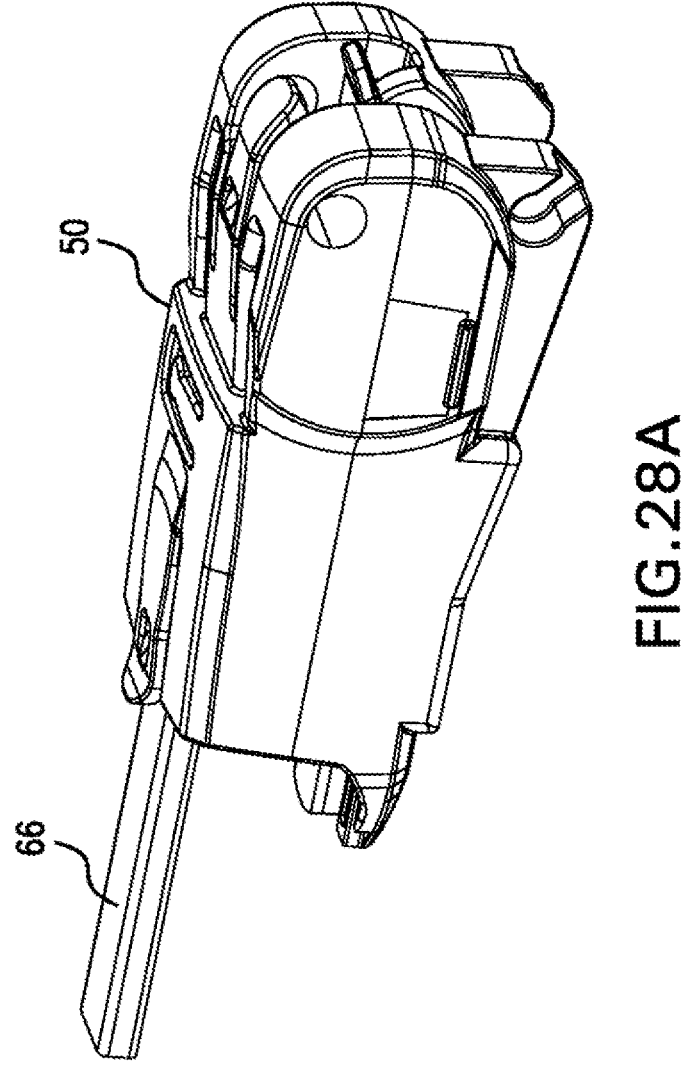
FIG. 28A is a perspective view illustrating a large hook wiper arm connected to an adapter.
Figure 28B:
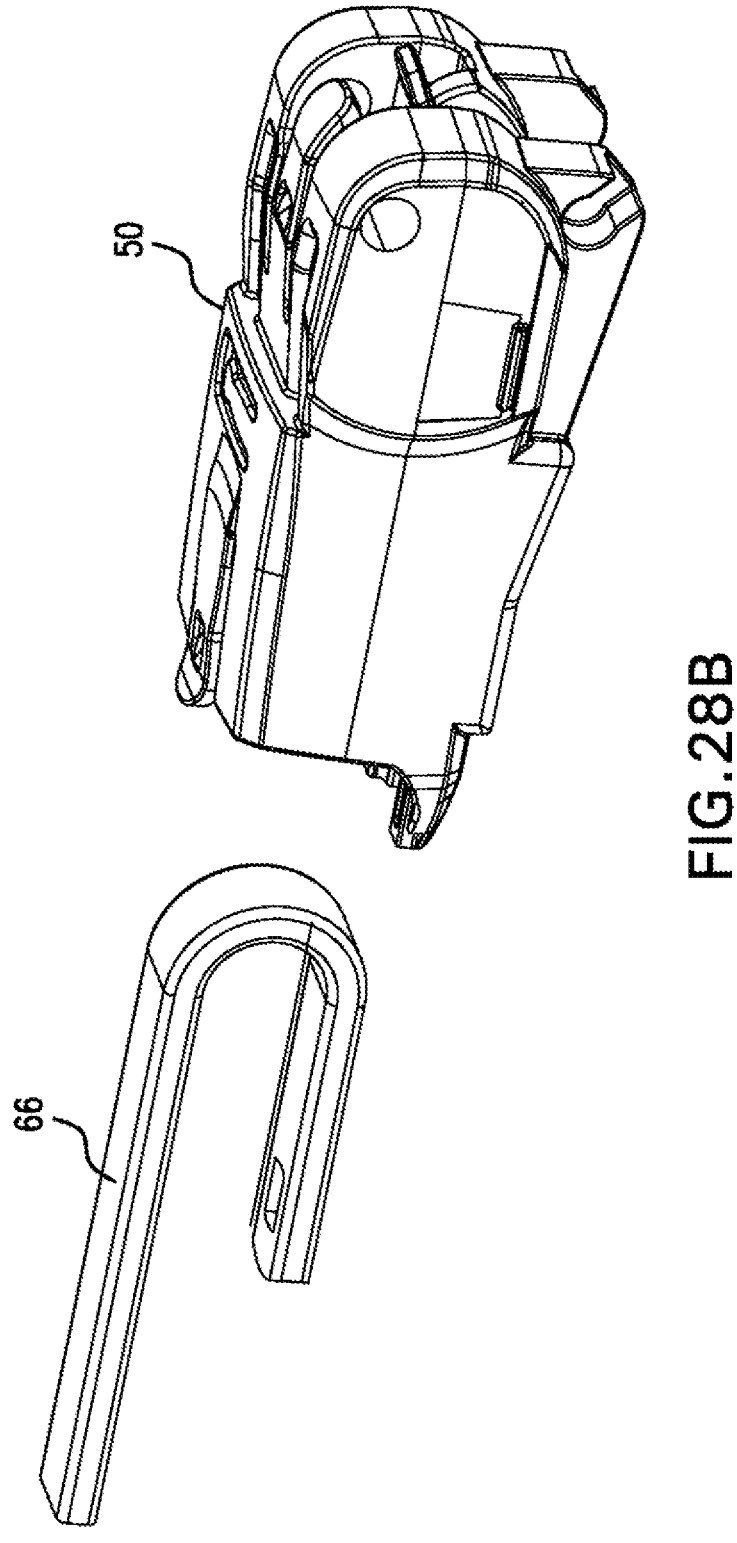
FIG. 28B is a perspective view illustrating how the large hook wiper arm of FIG. 28A is received by or removed from an adapter.

The adapter 50 includes a first lower tab 90 that cooperates with the large hook wiper arm 66 to selectively connect the large hook wiper arm 66 with the adapter 50. The large hook wiper arm 66 may be installed onto the adapter by inserting the arm into the adapter's cavity 74 and sliding it in until tab 90 engages and locks into an opening provided on the large hook wiper arm. This large hook wiper arm can be uninstalled or detached from the adapter 50 by depressing tab 90 and/or pushing it away from the arm such that it is no longer locked into the arm's opening, and sliding the arm out of cavity 74. FIGS. 28A-28B are functional drawings illustrating how this exemplary large hook style wiper arm interacts with the adapter 50 according to certain embodiments.

Figure 29A:
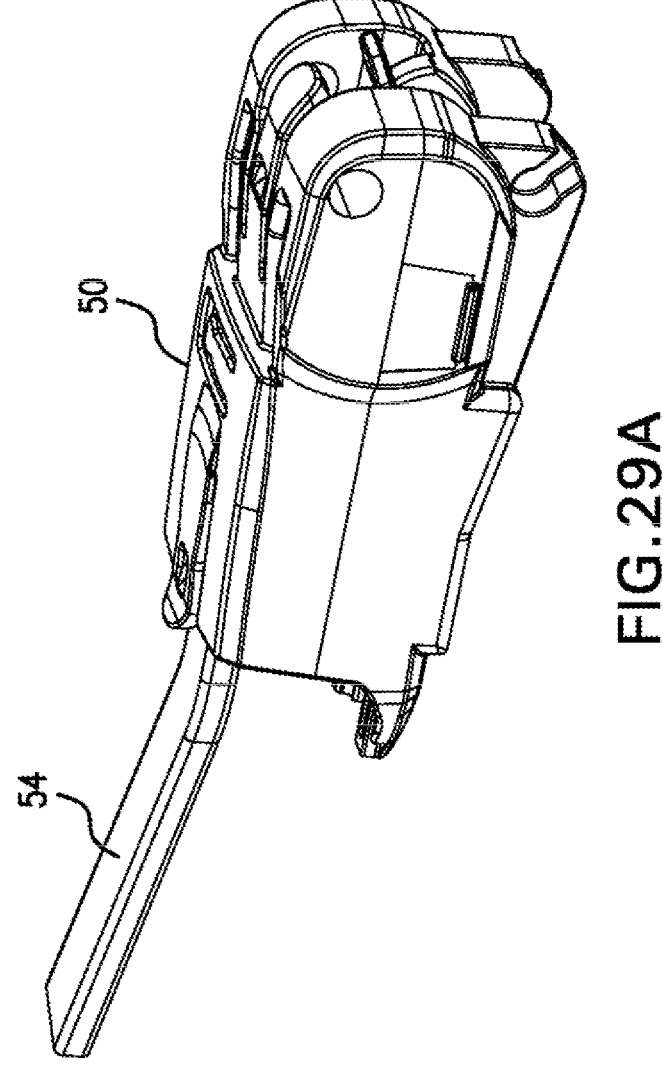
FIG. 29A is a perspective view illustrating a standard hook wiper arm connected to an adapter.
Figure 29B:
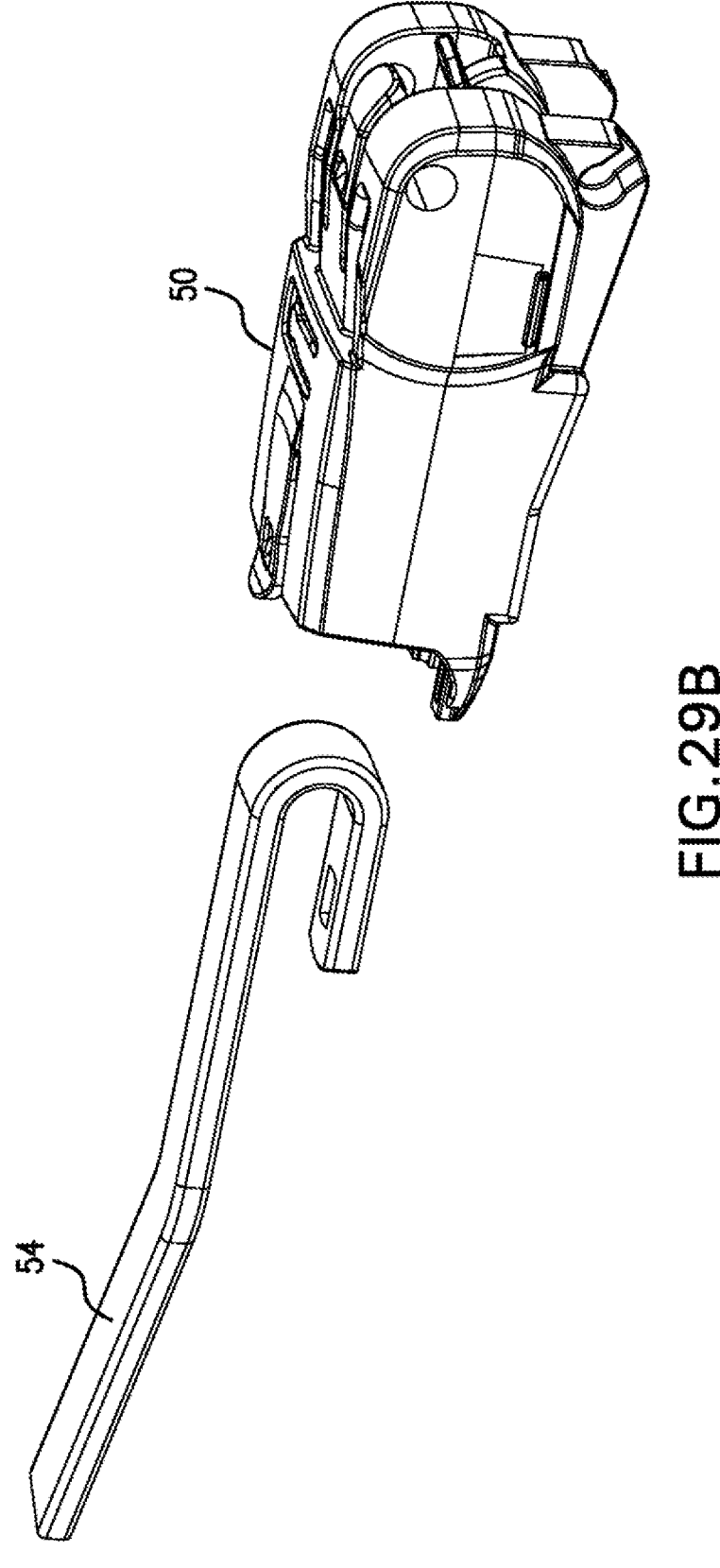
FIG. 29B is a perspective view illustrating how the standard hook wiper arm of FIG. 29A is received by or removed from an adapter.

The adapter 50 also includes a second lower tab 92 that selectively cooperates with the standard hook wiper arm 54 to connect the standard hook wiper arm 54 with the adapter 50. The standard hook wiper arm 54 may be installed onto the adapter by inserting the arm into the adapter's cavity 74 and sliding it in until tab 92 engages and locks into an opening provided on the large hook wiper arm. This standard hook wiper arm can be uninstalled or detached from the adapter 50 by depressing tab 92 and/or pushing it away from the arm such that it is no longer locked into the arm's opening, and sliding the arm out of cavity 74. FIGS. 29A-29B are functional drawings illustrating how this exemplary standard hook style arm interacts with the adapter 50 according to certain embodiments.

Figure 30A:
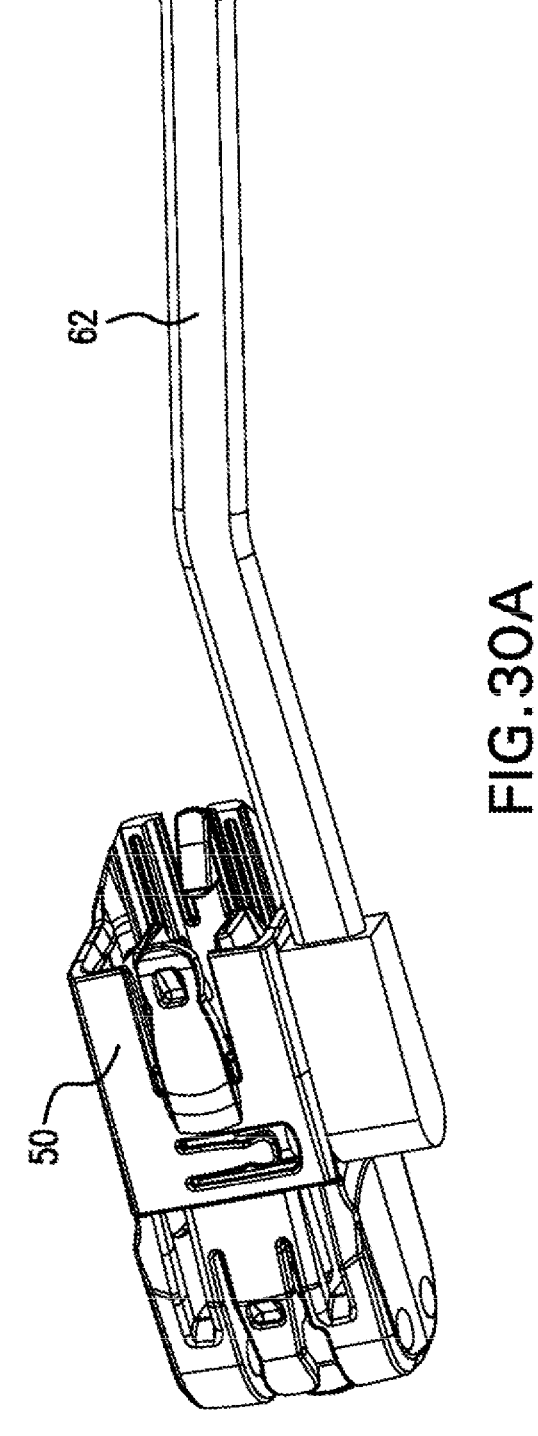
FIG. 30A is a perspective view illustrating a side lock wiper arm connected to an adapter.
Figure 30B:
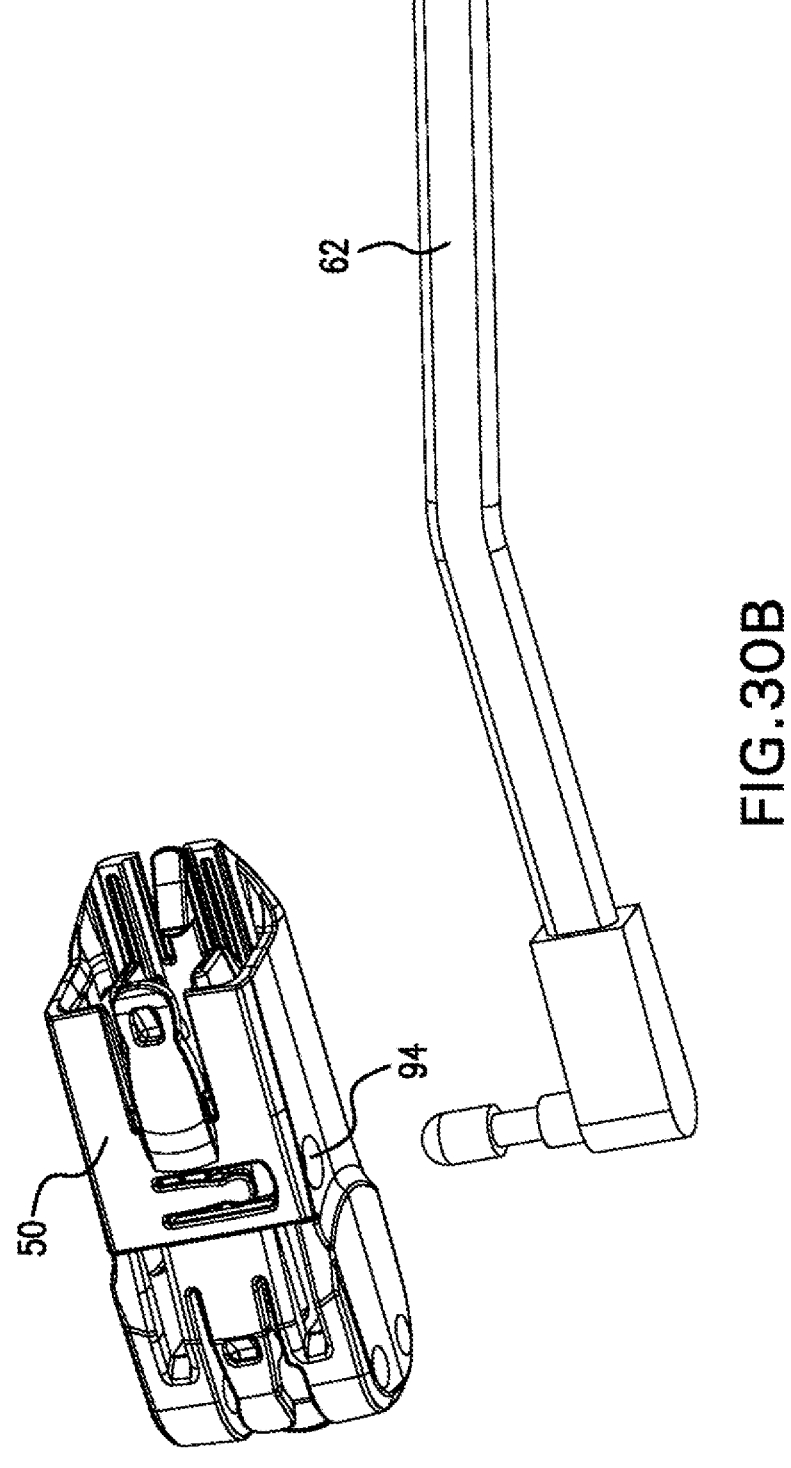
FIG. 30B is a perspective view illustrating how the side lock wiper arm of FIG. 30A is received by or removed from an adapter.
Figure 31A:
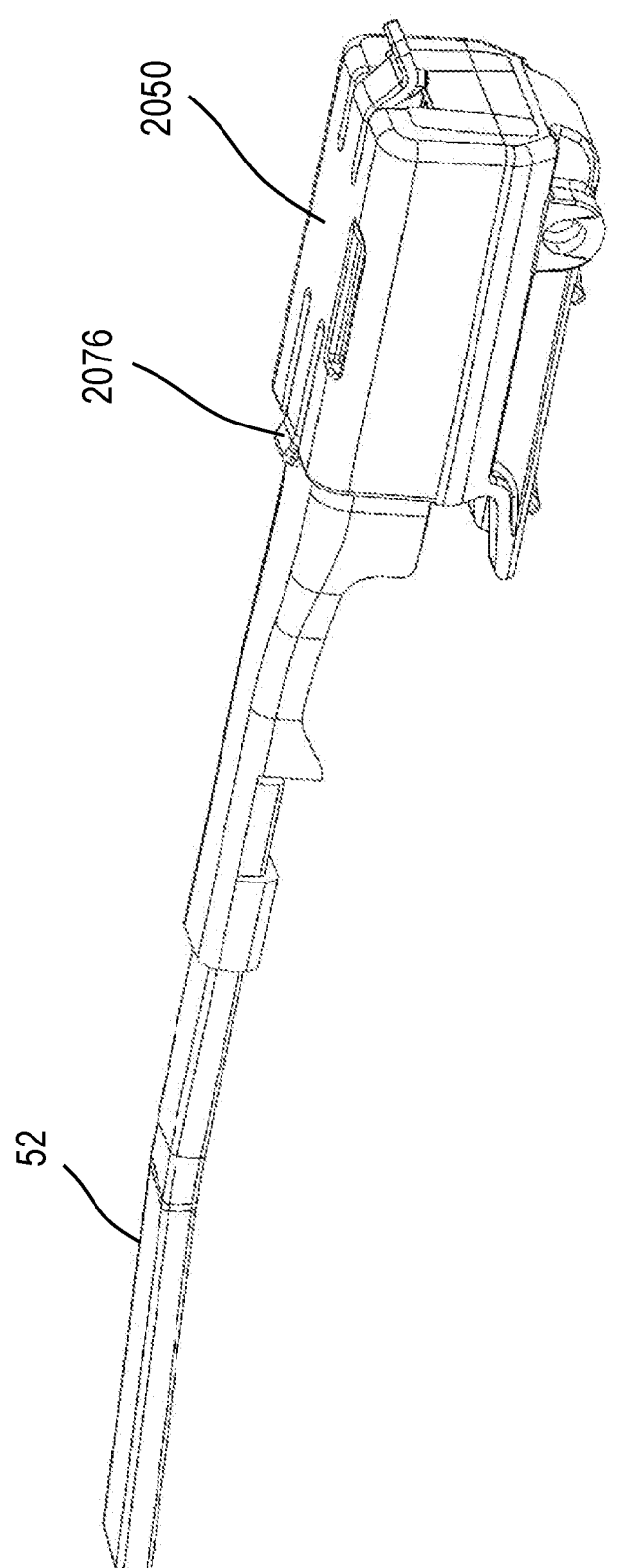
FIG. 31A is a perspective view illustrating a push button 19 mm wiper arm connected to a third adapter.
Figure 31B:
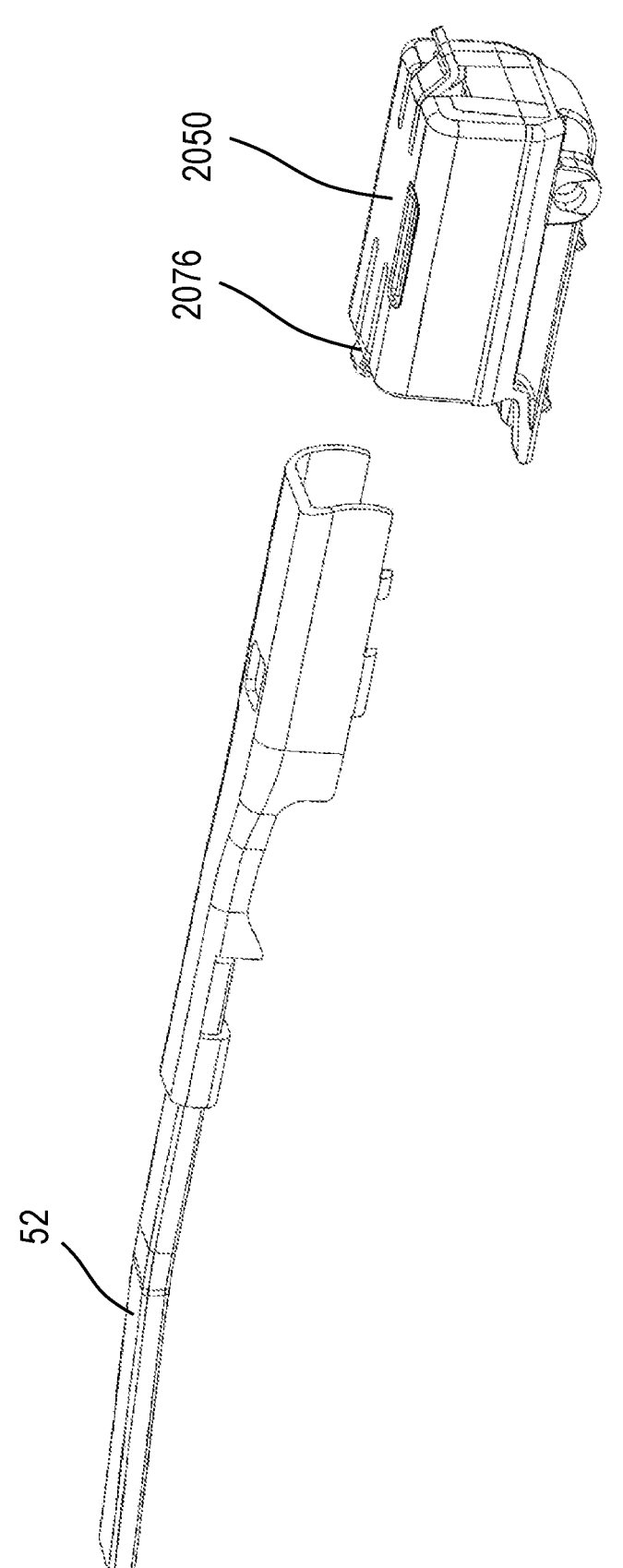
FIG. 31B is a perspective view illustrating how the push button 19 mm wiper arm of FIG. 31A is received by or removed from a third adapter.
Figure 32A:
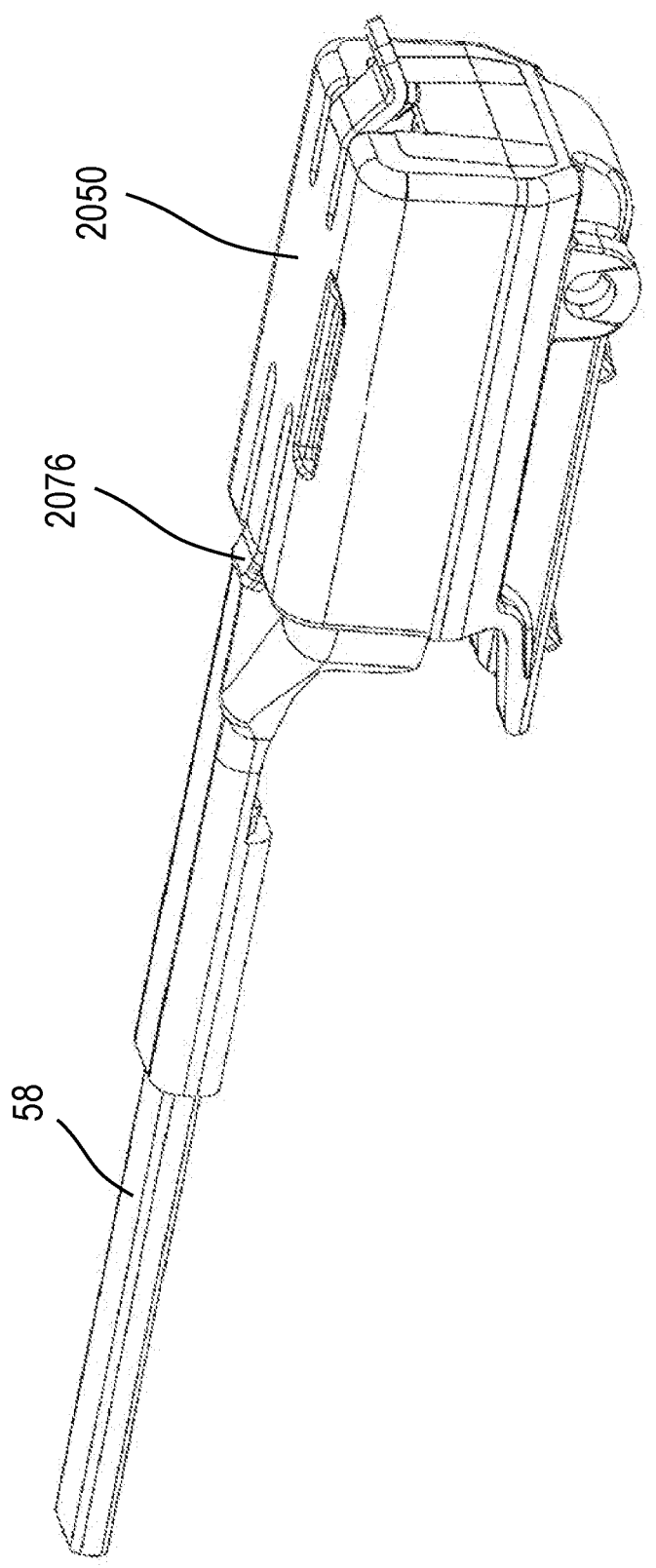
FIG. 32A is a perspective view illustrating a push button 22 mm short wiper arm connected to a third adapter.
Figure 32B:
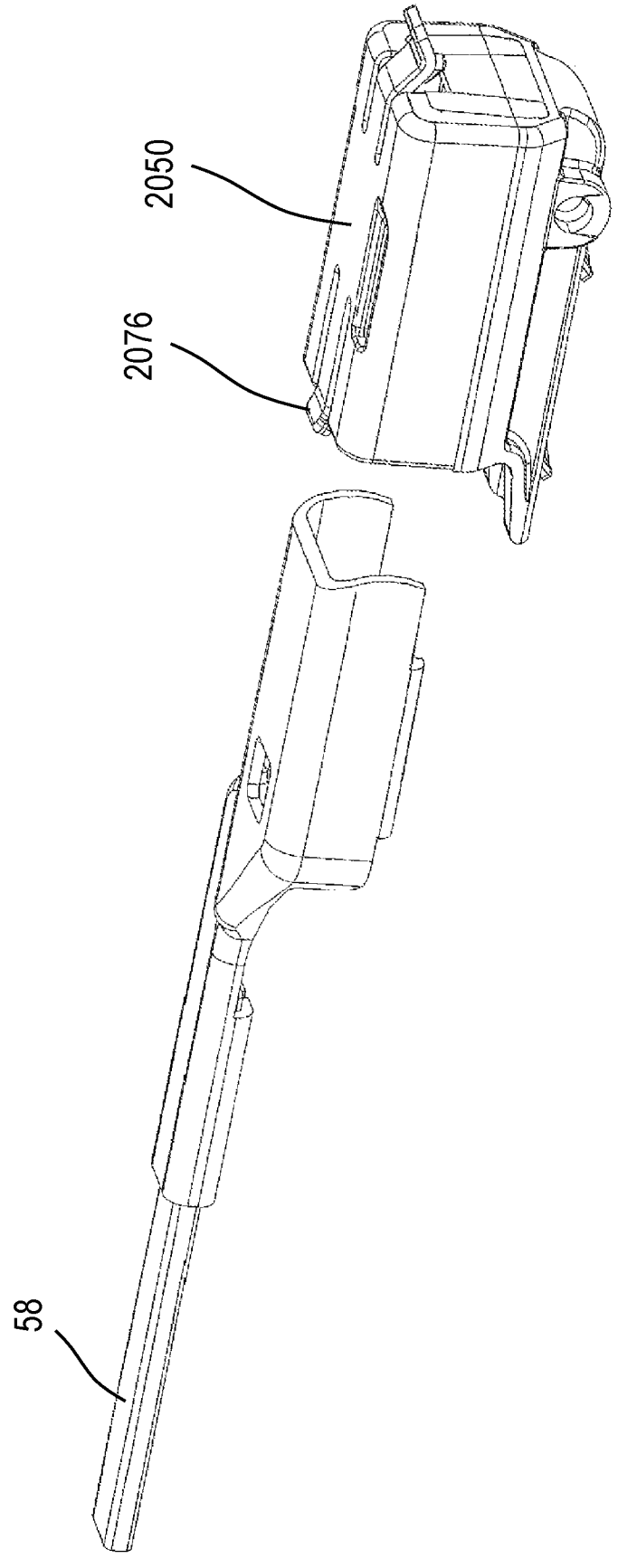
FIG. 32B is a perspective view illustrating how the push button 22 mm short wiper arm of FIG. 32A is received by or removed from a third adapter.
Figure 33A:
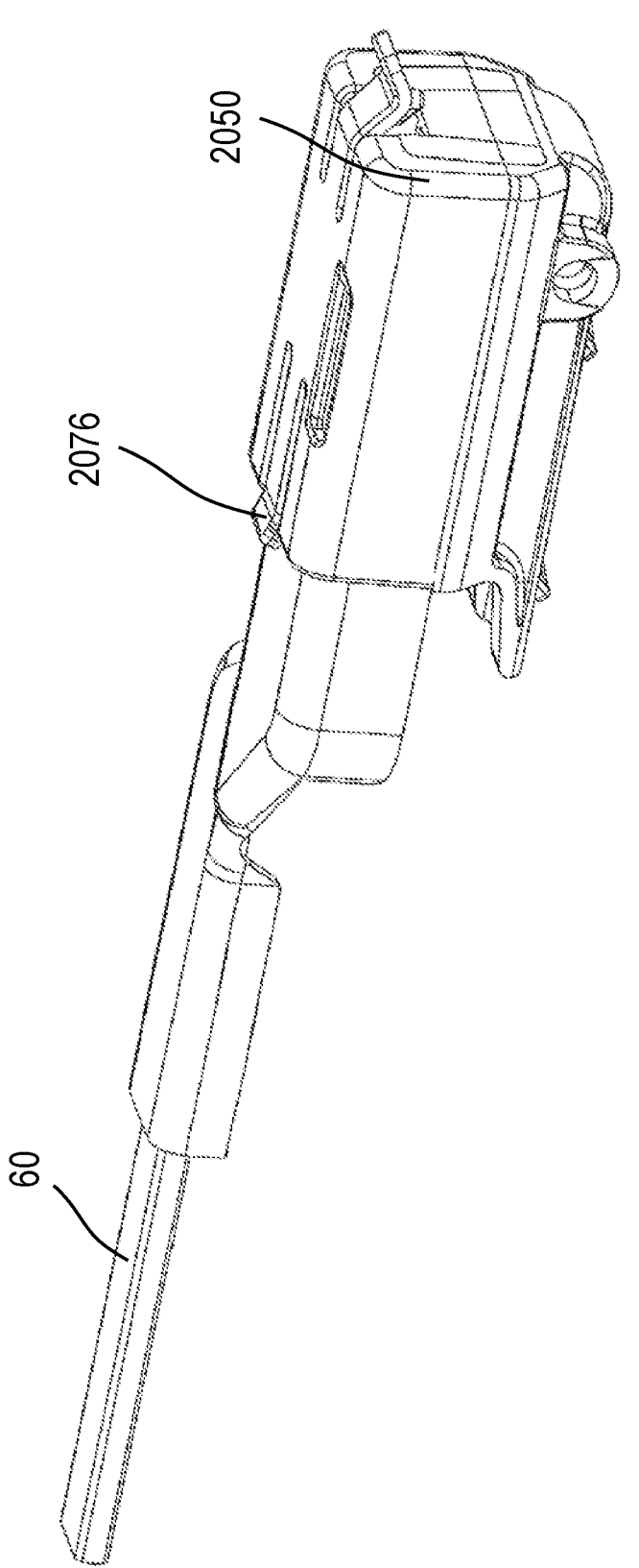
FIG. 33A is a perspective view illustrating a push button 22 mm wiper arm connected to a third adapter.
Figure 33B:
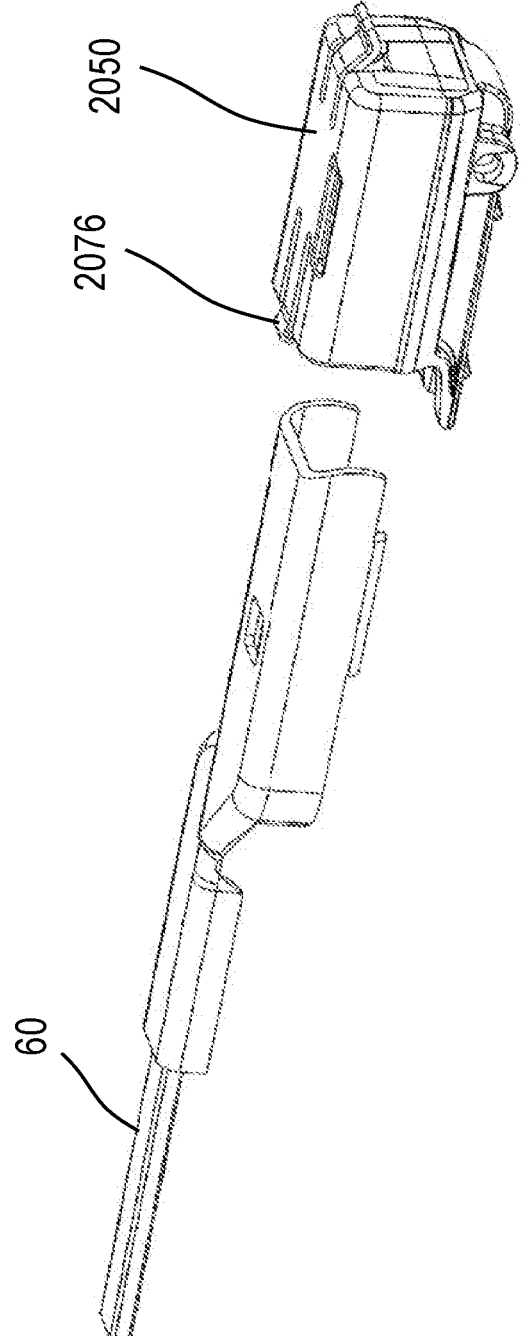
FIG. 33B is a perspective view illustrating how the push button 22 mm wiper arm of FIG. 33A is received by or removed from a third adapter.
Figure 34A:
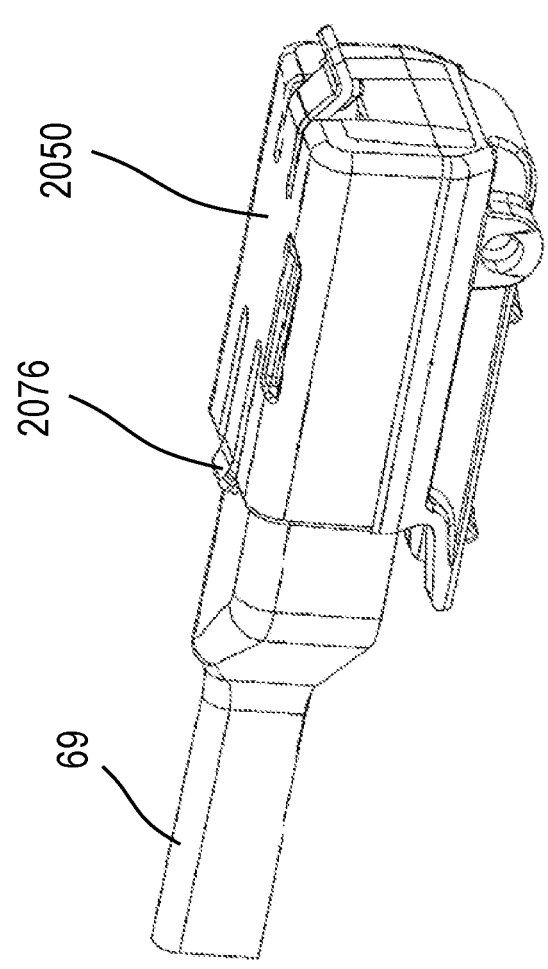
FIG. 34A is a perspective view illustrating a fitted zone wiper arm connected to a third adapter.
Figure 34B:
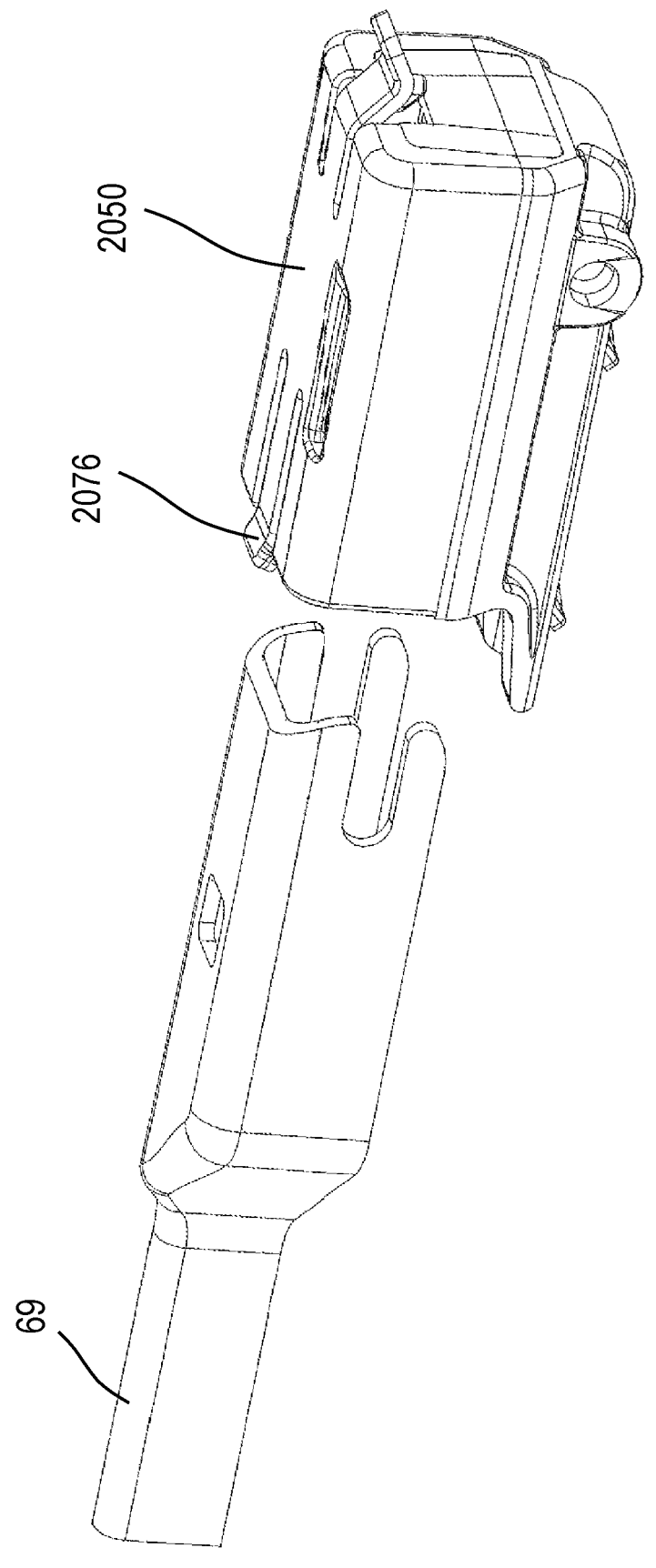
FIG. 34B is a perspective view illustrating how the fitted zone wiper arm of FIG. 34A is received by or removed from a third adapter.

The adapter 50 also includes a lower transverse opening 94 that cooperates with a vertically central distal end tab 96 and a vertically lower distal end tab 98 to connect the side lock 188 wiper arm 62 with the adapter 50. In particular, the side lock 188 wiper arm 62 may be installed onto the adapter by inserting the protruding pin of this arm into opening 94 until barb 359 (which extends downwardly from lower distal tab 98) engages and locks into the wiper arm's pin. This side lock 188 wiper arm 62 can be uninstalled or detached from the adapter 50 by depressing tab 98 and/or pushing it away from the pin such that barb 359 is no longer locked into the arm's pin, and slidably removing the pin from opening 94. FIGS. 30A-30B are functional drawings illustrating how this exemplary side lock arm interacts with the adapter 50 according to certain embodiments. The adapter 50 also includes a proximal transverse opening 95 that cooperates with a transverse tab 97 to connect the side lock 250 wiper arm 71 with the adapter 50. In particular, the side lock 250 wiper arm 71 may be installed onto the adapter by inserting the protruding pin of this arm into opening 95 until tab 97 engages and locks into the wiper arm's pin. This side lock 250 wiper arm 71 can be uninstalled or detached from the adapter 50 by depressing tab 97 and/or pushing it away from the pin such that it is no longer locked into the arm's pin, and slidably removing the pin from opening 95.

The cavity 74 is appropriately dimensioned to receive the push button 19 mm wiper arm 52, the standard hook wiper arm 54, the pinch tab wiper arm 56, the push button 22 mm short wiper arm 58, the push button 22 mm wiper arm 60, the side pin wiper arm 64, the large hook wiper arm 66, the side pin offset wiper arm 68, and the fz wiper arm 69. The aligned upper transverse openings 86 receive a portion of the side pin wiper arm 64 and the side pin offset wiper arm 68, the lower transverse opening 94 receives a portion of the side lock 188 wiper arm 62, and the proximal transverse opening 95 receives a portion of the side lock 250 wiper arm 71.

Figure 3:
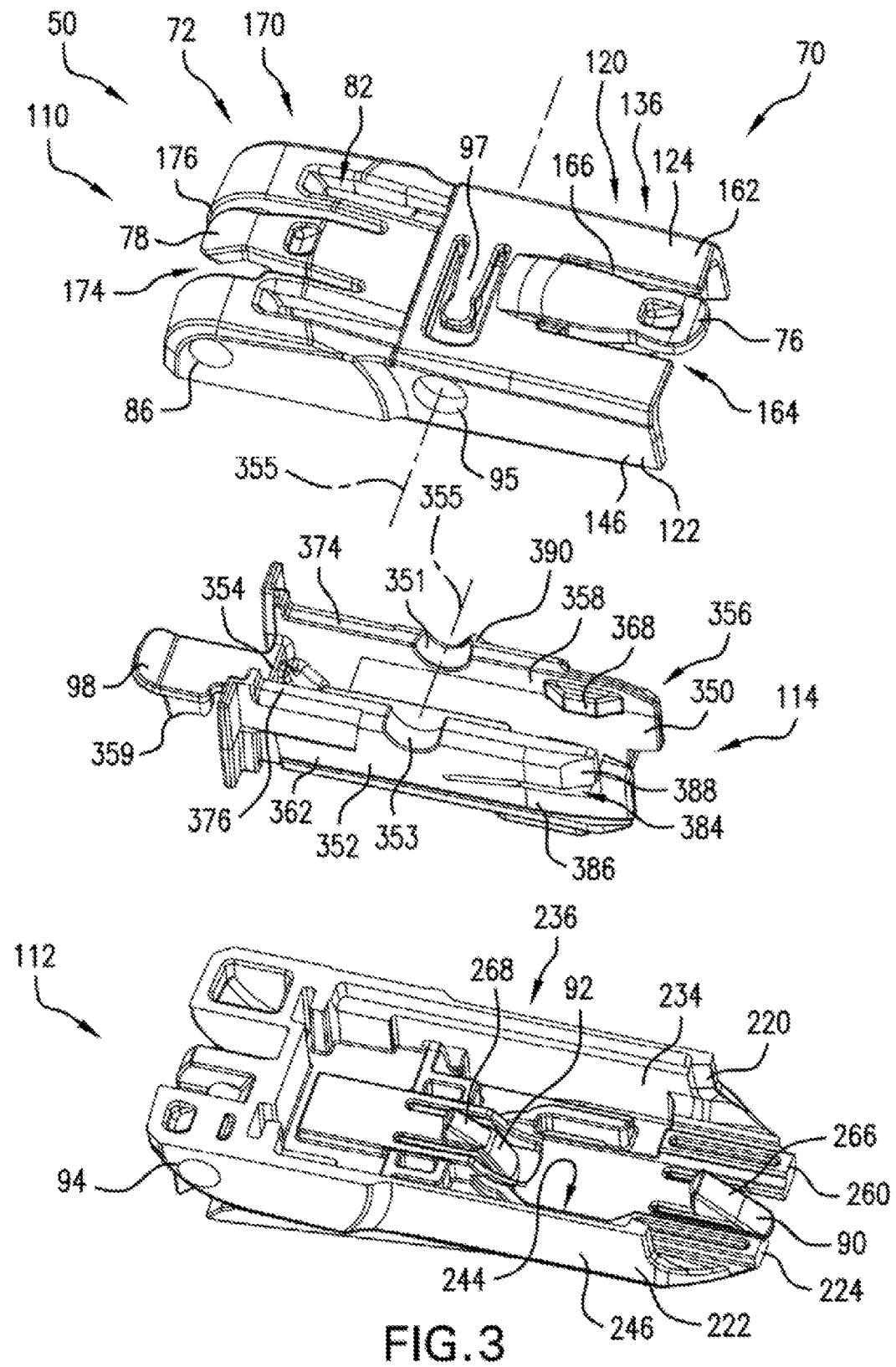
FIG. 3 is an exploded front perspective view of the adapter of FIG. 1.

FIGS. 3-4 depict exploded views of the adapter 50. The adapter 50 in the illustrated embodiment includes an upper body 110, a lower body 112, and an inner body 114 positioned between the upper body 110 and the lower body 112. The upper body and 110 and the lower body 112 cooperate to define the cavity 74 that extends from the proximal end 70 toward the distal end 72 of the adapter 50. The adapter 50 is shown as being manufactured from separate parts that are finally assembled and joined to each other to provide a one-piece body. The adapter 50 can be made from fewer separate components or a greater number of separate components than those shown in the figures.

In the illustrated embodiment, the upper body 110 includes the upper proximal tab 76, the upper distal tab 78, the cutout 82 and the aligned upper transverse openings 86, the proximal transverse opening 95, and the transverse tab 97. When viewed from the proximal end 70, the upper body 110 has a general upside down U-shaped configuration so as to include an inner side wall section 120, an outer side wall section 122, and a top wall section 124 bridging between the inner side wall section 120 and the outer side wall section 122.

The upper body inner side wall section 120 includes an interior surface 134 and an exterior surface 136. The exterior surface 136 is substantially smooth and planar in the illustrated embodiment and faces toward the adapter-facing surface 38 when the adapter 50 is connected with the coupler 34. The upper body outer side wall section 122 includes an interior surface 144 and an exterior surface 146.

The upper body top wall section 124 includes an interior surface 156 and an exterior surface 162. A first proximal end slot 164 and a second proximal end slot 166 each extend from the proximal end 70 longitudinally toward the distal end 72 to define the upper proximal tab 76. A barb 168 extends downwardly from the upper proximal tab 76 to engage in an opening provided in the push button 19 mm wiper arm 52, the push button 22 mm short wiper arm 58, the push button 22 mm arm 60, or the fz wiper arm 69 (see FIG. 1).

The upper body 110 also includes a distal end portion 170 and a first distal slot 174 and a second distal slot 176 define the upper distal tab 78. A projection 178 extends downwardly from the upper distal tab 78 to engage inside an opening provided in the pinch tab wiper arm 56 (see FIG. 1). The cutout 82 is located nearer to the upper body inner side wall section 120 as compared to the outer side wall section 122.

In the illustrated embodiment, the lower body 112 includes the first lower tab 90, the second lower tab 92, and the lower transverse opening 94. When viewed from the proximal end 70 (see FIG. 2), the lower body 112 has a general U-shaped configuration and includes an inner side wall section 220, an outer side wall section 222, and a bottom wall section 224 bridging between the inner side wall section 220 and the outer side wall section 222.

The lower body inner side wall section 220 also includes an interior surface 234 and an exterior surface 236. The exterior surface 236 is substantially smooth and planar in the illustrated embodiment and faces toward the adapter-facing surface 38 when the adapter 50 is connected with the coupler 34. The stop member 51 extends from the exterior surface 236 toward the adapter-facing surface 38 of the adapter 50 and is closer to the distal end 72 than the proximal end 70. The stop member 51 interacts with the limit ledge 49 so as to provide an overcomable pivot stop for the adapter 50 with respect to the coupler 34 in a detent manner. The lower body outer side wall section 222 includes an interior surface 244 and an exterior surface 246.

The bottom wall section 224 includes an interior surface 260 and an exterior surface 262. The bottom wall section 224 defines the first lower tab 90 and the second lower tab 92. The first lower tab 90 is positioned closer to the proximal end 70 of the adapter 50 than the second lower tab 92. Thus, the second lower tab 92 is between the first lower tab 90 and the distal end 72 of the adapter 50 in a plan view of the adapter 50.

Figures 5, 6:
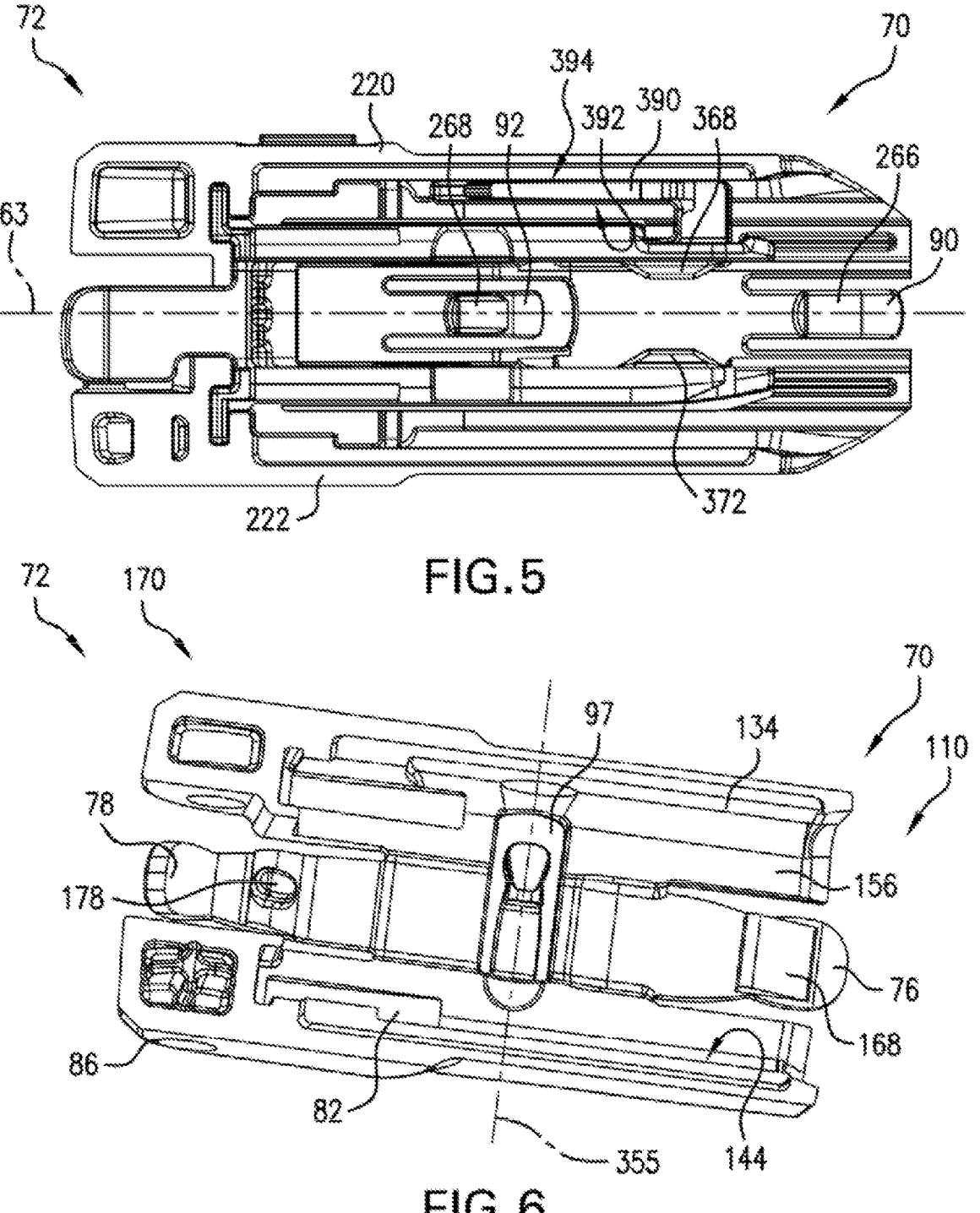
FIG. 5 is a plan view of an adapter lower body and an adapter inner body.
FIG. 6 is a bottom perspective view of an adapter upper body.

With reference to FIG. 5, a first barb 266 extends upwardly from the first lower tab 90 to engage in an opening provided in the large hook wiper arm 66 (FIG. 1). A second barb 268 extends upwardly from the second lower tab 92 to engage in an opening provided in the standard hook wiper arm 54 (FIG. 1). When a distal end of either arm of the standard hook wiper arm 54 or the large hook wiper arm 66 are received in the cavity 74, respective barbs 266, 268 are received in respective openings near the distal end of the respective wiper arms 54, 66.

The inner body 114 includes an inner tongue 350 and an outer tongue 352. The inner tongue 350 and the outer tongue 352 each extend toward the proximal end 70 of the adapter 50 from a cross member 354 that connects the inner tongue 350 and the outer tongue 352 together. The lower distal tab 98 can extend from the cross member 354. A barb 359 can extend from the lower distal tab 98 away from the top wall section 124 of the upper body 110 to cooperate with the lower transverse opening 94 to connect the side lock 188 wiper arm 62 with the adapter 50.

The inner tongue 350 includes an exterior surface 356, which is generally planar, vertically oriented and offset from the interior surface 134 of the upper body inner side wall section 120 and the interior surface 234 of the lower body inner side wall section 220. The inner tongue 350 also includes an interior surface 358 that faces towards the outer tongue 352. Similarly, the outer tongue 352 includes an exterior surface 362 parallel to the exterior surface 356 of the inner tongue 350. The outer tongue 352 also includes an interior surface 364 that is generally vertically oriented, parallel to and offset from the interior surface 358 of the inner tongue 350.

An inner protuberance 368 extends inwardly from the interior surface 358 of the inner tongue 350 towards the outer tongue 352. Similarly, another inner protuberance 372 is provided on the interior surface 364 of the outer tongue 352 and faces toward the inner tongue 350. The inner protuberances 368 and 372 engage with the standard hook wiper arm 54 and the large hook wiper arm 66 when either the standard hook wiper arm 54 or the large hook wiper arm 66 is received within the cavity 74 of the adapter 50 and more particularly between the inner tongue 350 and the outer tongue 352.

The inner tongue inner protuberance 368 and the outer tongue inner protuberance 372 are disposed between the first lower tab 90 and the second lower tab 92 along the longitudinal axis 63 in the plan view of the adapter 50. The inner tongue 350 defines an inner tongue proximal opening 351 and the outer tongue 352 defines an outer tongue proximal opening 353. The adapter 50 defines a lateral axis 355 that extends between the inner tongue proximal opening 351 and the outer tongue proximal opening 353. The transverse tab 97 is disposed along the lateral axis 355 in the plan view. The proximal transverse opening 95 of the outer side wall section 122 is in registry with the inner tongue proximal opening 351 and the outer tongue proximal opening 353 to receive the side lock 250 wiper arm 71.

The inner tongue 350 includes an inner tongue upper edge 374 and the outer tongue 352 includes an outer tongue upper edge 376. The upper edges 374 and 376 are offset vertically beneath the interior surface 156 of the upper body top wall section 124. This allows horizontally (generally) disposed sections of the push button 19 mm wiper arm 52, the pinch tab wiper arm 56, the push button 22 mm short wiper arm 58, and the push button 22 mm wiper arm 60 to be received in the cavity 74.

The inner tongue 350 also includes an inner tongue lower edge 378 and the outer tongue 352 includes an outer tongue lower edge 382. The lower edge 378 of the inner tongue 350 is co-planar with the lower edge 382 of the outer tongue 352. The outer tongue 352 defines a bifurcating slot 384 that creates a fixed portion 386 and a finger portion 388 of the outer tongue 352. The finger portion 388 of the outer tongue 352 is elastically deformable.

The adapter 50 also includes a wedge 390 that is elastically attached to the inner body 114. The wedge 390 includes an inner face 392 that faces toward the inner body 114 and an outer face 394 that faces away from the inner body 114, and also in a direction opposite the inner face 392. The wedge 390 can extend from the exterior surface 356 of the inner tongue 350 of the inner body 114 from the proximal end 70 of the adapter 50 toward the distal end 72 of the adapter 50.

The wedge 390 can exert a lateral biasing force on the push button 22 mm arm 60 and the push button 22 mm short wiper arm 58 toward the inner side wall section 120 of the upper body 110. Further, the wedge 390 can be laterally disposed between the inner body 114 and the push button 22 mm arm 60 and the push button 22 mm short wiper arm 58 when the arms 60, 58 are received in the adapter 50.

Further still, the wedge 390 can be laterally disposed between the inner side wall section 120 of the upper body 110 and the push button 19 mm wiper arm 52, the pinch tab wiper arm 56, or the fz wiper arm 69 when said wiper arms 52, 56, 69 are received in the adapter 50. Thus, the wedge 390 can exert a lateral biasing force on the push button 19 mm wiper arm 52, the pinch tab wiper arm 56, and the fz wiper arm 69 toward the exterior surface 356 of the inner tongue 350 of the inner body 114.

Various portions of the adapter 50 described above can be varied in thickness so as to either provide additional rigidity (for robustness), flexibility (to permit convenient engagement/disengagement with the different wiper arms), and/or a balance of both. For example, the thickness of (and thus extent of material used to mold) upper proximal tab 76 (or portions thereof) may be increased to provide stronger latching and/or ensure it does not break during insertion/removal of any wiper arms into/from the adapter 50 or during operation. Similarly, upper proximal tab 76 (or portions thereof) may be made thinner to allow it to flex more easily as a wiper arm is inserted or removed from the cavity 74 to accommodate passage of a portion of the various wiper arms. The thickness of portions of the adapter 50 may also be varied to ensure consistent expansion/contraction in case of temperature variation.

Similarly, various portions of the adapter 50 or coupler 34 described above can be outfitted with additional elements that may further enhance performance and/or permit convenient engagement/disengagement with the different wiper arms. For example, the coupler's adapter-facing surface 38 and/or certain inner body walls of the adapter 50 that define the cavity 74 may be outfitted with ribs (not shown) that can minimize transverse motion or wobbling of the adapter or wiper arm inserted therein. As another example, certain tabs (such as tabs 90, 92, 76, 97, 78 and/or 98) may include elongated external portions (not shown) that protrude from the respective surfaces of the adapter 50 to make it easier and/or more convenient for a user to depress these tabs to unlock the various wiper arms and disconnect them from the adapter 50.

Figure 2F:
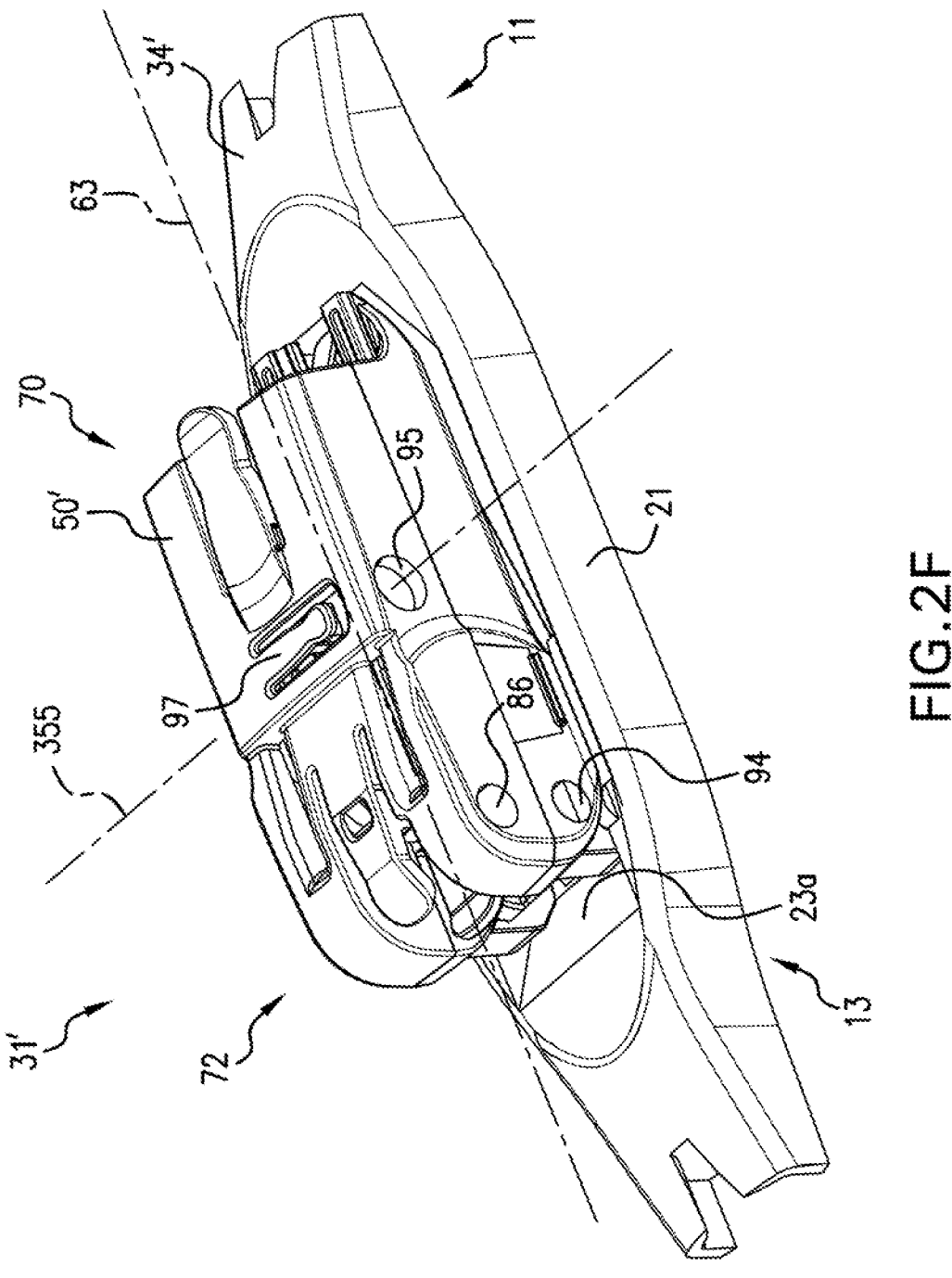
FIG. 2F is a perspective view of an alternative wiper set.

With reference to FIGS. 2F-2J, and more particularly to FIG. 2F, an alternative wiper set 31' that include an alternative coupler 34' and an alternative adapter 50' are shown. The alternative adapter 50' can be installed on and/or removed from various wiper arms in the same or similar manner discussed and depicted with respect to adapter 50. Any of adapters 50, 50', 150, 2050, 3050 or 4050 can be installed on and/or removed from either coupler 34 or 34' in the same or similar manner discussed and depicted with respect to adapters 50/50'. Unless otherwise noted, the alternative coupler 34' and the alternative adapter 50' share the same structure and features as the coupler 34 and the adapter 50, respectively, that are illustrated in FIGS. 1-2E and 3-6. For example, the alternative adapter 50' can engage with all of the wiper arms illustrated in FIG. 1 in the same manner as previously described with respect to the adapter 50. However, the alternative adapter 50' can interact with the alternative coupler 34' in a manner as will be described in more detail hereinafter.

Figure 2G:
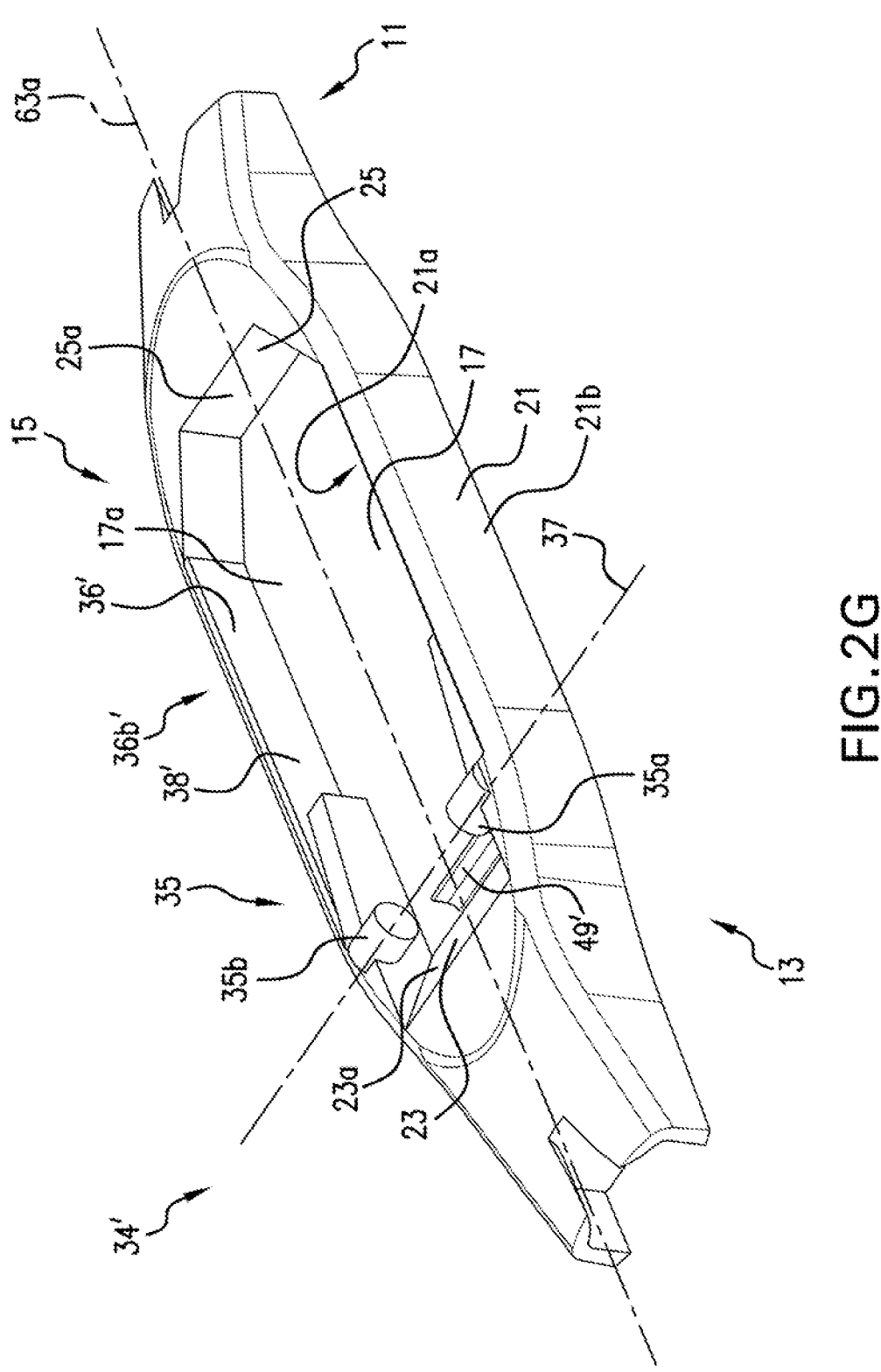
FIG. 2G is a perspective view of an alternative coupler.

The alternative coupler 34' can include a proximal end 11 and a distal end 13 that share a common orientation with the proximal end 70 and distal end 72 of the alternative adapter 50' as illustrated in FIG. 2F. The alternative adapter 50' defines a longitudinal axis 63 that extends between the proximal end 70 and the distal end 72 and the alternative coupler 34' defines a longitudinal axis 63a that extends between the proximal end 11 and the distal end 13 of the coupler 34' (FIG. 2G). Further, the proximal transverse opening 95 of the alternative adapter 50' defines a lateral axis 355. The transverse tab 97 is disposed along the lateral axis 355 in the plan view.

Figure 2I:
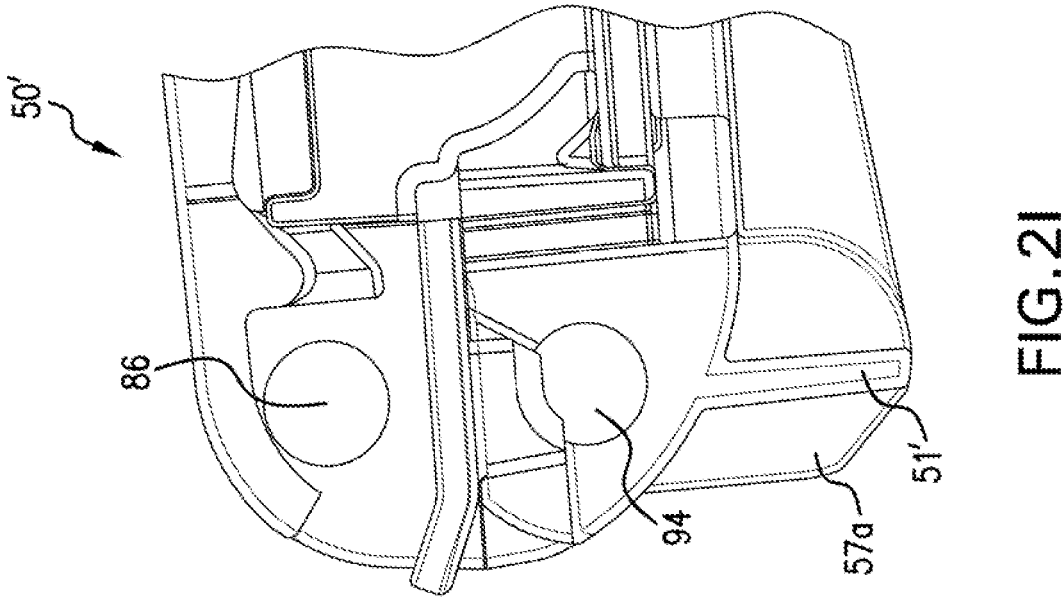
FIG. 2I is a cross-section of a forward end portion of the alternative adapter of FIG. 2H taken through a stop wall along a plane parallel to a longest dimension.
Figure 2H:
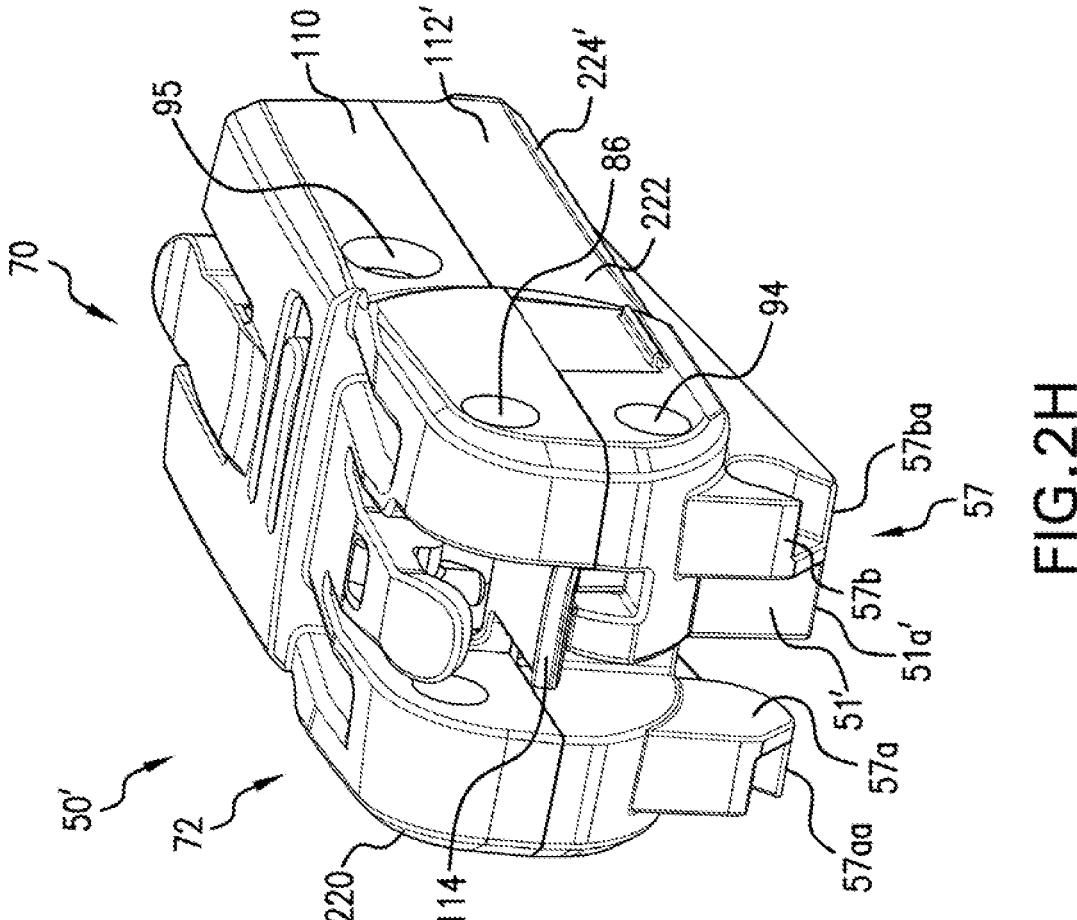
FIG. 2H is a perspective view of an alternative adapter.
Figure 2J:
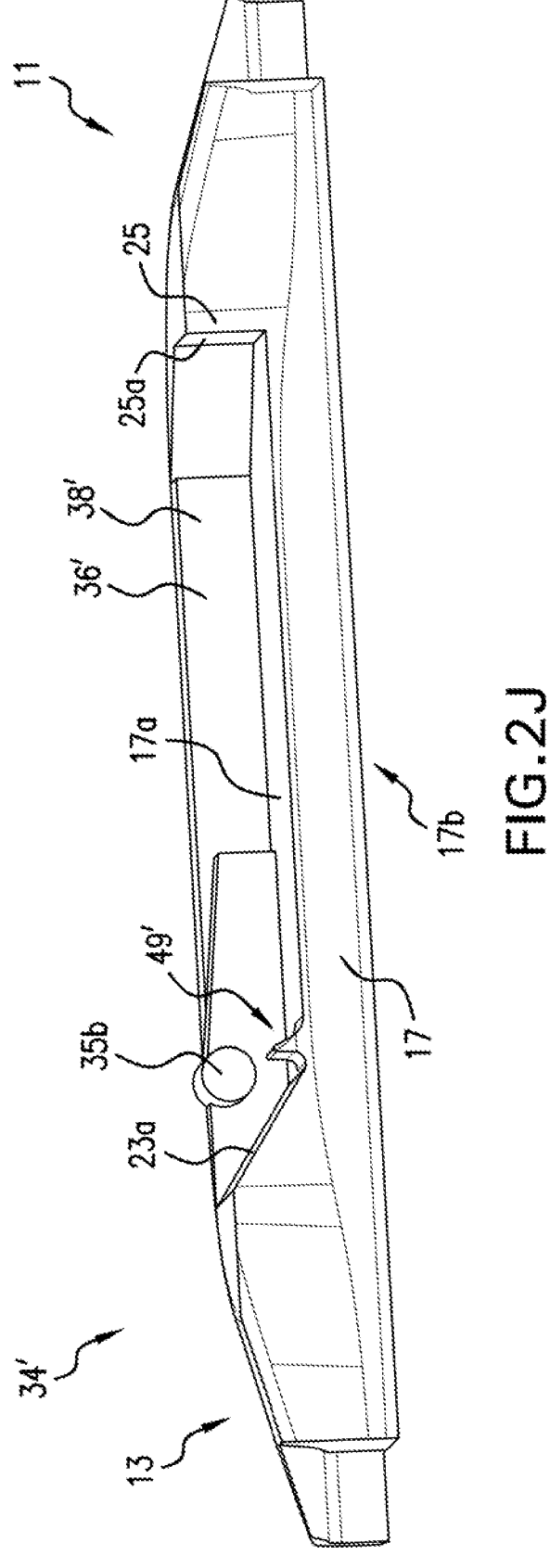
FIG. 2J is a cross-section of the alternative coupler of FIG. 2G taken through a stop wing along a plane parallel to a longest dimension.

With reference to FIGS. 2G and 2J, the alternative coupler 34' can define an adapter receiving depression 15. As illustrated, the depression 15 does not allow fluid communication through the alternative coupler 34'. However, it will be appreciated, that the depression 15 could entirely extend through the alternative coupler 34' so as to allow fluid communication therethrough (i.e., as a bore).

The depression 15 can be bounded by a floor 17 with an interior floor surface 17a that faces the alternative adapter 50'. The floor 17 can include an exterior floor surface 17b that faces in a direction that is opposite of a direction that the interior floor surface 17a faces. The depression 15 can also be bounded by a back wall 36' with an adapter-facing surface 38' and a back exterior surface 36b', a front wall 21 with a front interior surface 21a and a front exterior surface 21b, a distal wall 23 with a distal interior surface 23a, and a proximal wall 25 with a proximal interior surface 25a. The back wall 36' and the front wall 21 can be disposed at opposite lateral ends of the coupler 34'. Further, the distal wall 23 and the proximal wall 25 are disposed at opposite longitudinal ends of the coupler 34'.

The adapter-facing surface 38' of the back wall 36' can face the front interior surface 21a. Further, the front interior surface 21a can face in a direction that is opposite a direction in which the front exterior surface 21b faces. The front interior surface 21a is spaced from the adapter facing surface 38'. Further, the distal interior surface 23a and the proximal interior surface 25a can be disposed at opposite ends of the alternative coupler 34' so as to be at the distal end 13 and the proximal end 11, respectively, of the alternative coupler 34' and facing toward one another. The distal wall 23 and the proximal wall 25 can cooperate to connect the back wall 36' and the front wall 21 together.

With continued attention to FIG. 2G, the alternative coupler 34' also includes an adapter attachment, which can be an integrally formed post 35. The post 35 allows for a pivotal connection between the alternative coupler 34' and the alternative adapter 50'. The post defines a pivot axis 37 about which the alternative adapter 50' pivots. Further, the post 35 can define an obround cross-section in a plane orthogonal to the pivot axis 37. The post 35 can include a first post portion 35a and a second post portion 35b that are disposed on the pivot axis 37 and can be laterally spaced from one another.

The back wall 36' and more particularly the adapter facing surface 38', the front interior surface 21a of the front wall 21, and the proximal interior surface 25a of the proximal wall 25 of the alternative coupler 34' can be generally orthogonal to the pivot axis 37. As illustrated, the distal interior surface 23a of the distal wall 23 can have a ramp-like layout such that the distal interior surface 23a does not face in a same direction as the adapter facing surface 38', the front interior surface 21a of the front wall 21, or the proximal interior surface 25a of the proximal wall 25.

As shown in FIG. 2G, and more particularly in FIG. 2J, the alternative coupler 34' can also include a stop wing 49' that is disposed at the distal end 13 of the alternative coupler 34' for interaction with a stop member 51' (FIGS. 2H-2I) of the alternative adapter 50' as will be described in more detail hereinafter. As illustrated, the stop wing 49' can upwardly extend from the floor 17, and more particularly the interior floor surface 17a. The stop wing 49' can be spaced from the front wall 21, the back wall 36', the proximal wall 25, and the distal wall 23. Further, the stop wing 49' can be laterally disposed between, and spaced from, the first post portion 35a and the second post portion 35b in a plan view of the alternative coupler 34'.

Thus, the stop wing 49' can be disposed so as to be below the pivot axis 37. However, as noted hereinbefore, the floor 17 could be eliminated and the depression 15 could instead be a bore that would extend through the alternative coupler 34'. In that situation, the stop wing 49' could instead be attached to and extend from one or more of the walls of the coupler 34'.

The stop wing 49' can define a stop wing length that extends in a lateral direction of the alternative coupler 34' (i.e., parallel to the pivot axis 37). Further, the stop wing 49' can define a stop wing width that extends in a longitudinal direction of the alternative coupler 34' (i.e., parallel to the longitudinal axis 63a). As illustrated, the stop wing length is greater than the stop wing width. The stop wing 49' also upwardly extends from the floor 17 so as to define a stop wing height.

As shown in FIG. 2G, the length of the stop wing 49' can be constant. However, the width of the stop wing 49' may be non-constant. For example, the width of the stop wing 49' can decrease as the stop wing 49' extends upward from the floor 17. As illustrated, the stop wing 49' is spaced from the front interior surface 21a and also the adapter facing surface 38' of the rear wall 36'.

With special attention to FIGS. 2H-2I, the alternative adapter 50' can include an upper body 110, a lower body 112', and an inner body 114 positioned between the upper body 110 and the lower body 112. The lower body 112' can have a general U-shaped configuration and includes an inner side wall section 220, an outer side wall section 222, and a bottom wall section 224' bridging between the inner side wall section 220 and the outer side wall section 222.

Like the adapter 50, the alternative adapter 50' can include an adapter attachment mount 57 for engagement with the coupler 34'. The adapter attachment mount 57 can be disposed at the distal end 72 of the adapter 50' and be integral to the lower body 112'. The adapter attachment mount 57 can include an inner attachment mount 57*a* and an outer attachment mount 57*b* disposed at opposite lateral ends of the alternative adapter 50'. The inner attachment mount 57*a* and the outer attachment mount 57*b* are configured to engage the second post portion 35*b* and the first post portion 35*a*, respectively, of the alternative coupler 34' as described hereinbefore with respect to the wiper set 31.

The lower body 112' of the alternative adapter 50' can include the stop member 51'. As illustrated, the stop member 51' may be integral to the lower body 112'. The stop member 51' can downwardly extend from the bottom wall section 224' for engagement with the stop wing 49'. The stop member 51' of the alternative adapter 50' can be laterally disposed between the inner attachment mount 57*a* and the outer attachment mount 57*b*. As illustrated, the stop member 51' is offset from a lateral center of the alternative adapter 50' so that the stop member 51' directly contacts the outer attachment mount 57*b*.

The stop member 51' downwardly extends from the bottom wall section 224' such that an overall height of the alternative adapter 50' is not increased, as compared to the adapter 50. Further, the orientation of the stop member 51' is such that a bottom edge 51*a'* of the stop member 51' does not vertically extend below an inner attachment mount bottom edge 57*aa* of the inner attachment mount 57*a* or an outer attachment mount bottom edge 57*ba* of the outer attachment mount 57*b*. Thus, the bottom edge 51*a'* of the stop member 51*a*, the bottom edge 57*aa* of the inner attachment mount 57*a*, and the bottom edge 57*ba* of the outer attachment mount 57*b* are coplanar and define a lowest horizontal plane of the alternative adapter 50'.

As shown in FIG. 2I, the stop member 51' can be of a thin wall construction in which a height (i.e., extending along a vertical axis) is greater than a length, which in FIG. 2I would be a left-right direction (i.e., extending along the longitudinal axis 63). Further, the stop member 51' can define a width (i.e., extending along the lateral axis 355) that may be equal to a width of either the inner attachment mount 57*a* or the outer attachment mount 57*b*.

The interaction between the stop member 51' of the alternative adapter 50' and the stop wing 49' of the alternative coupler 34' is the same as the interaction between stop member 51 of the adapter 50 and the limit ledge 49 of the coupler 34. Namely, the interaction between the stop member 51' and the stop wing 49' provide an overcomable pivot stop for the alternative adapter 50' with respect to the alternative coupler 34' in a detent manner. Thus, for brevity, the description is omitted.

Figure 7:
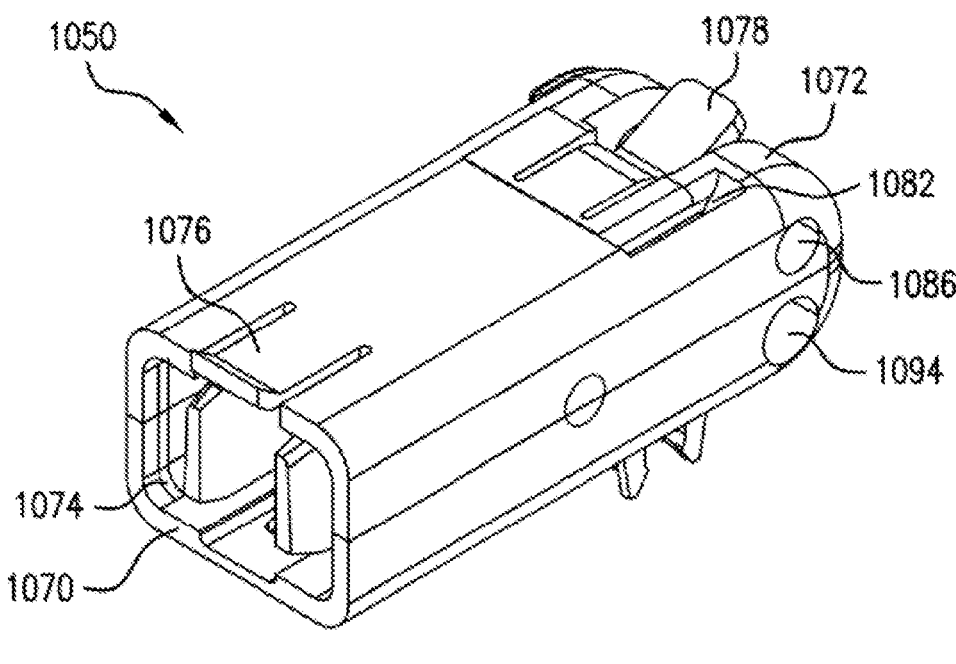
FIG. 7 is an upper distal end perspective view of an adapter.

With reference to FIGS. 7-10, a second adapter 1050 is shown. The second adapter 1050 can be installed on and/or removed from various wiper arms in the same or similar manner discussed and depicted with respect to adapter 50. The second adapter 1050 includes a plurality of attachment elements, which will be later described, to allow each of the wiper arms 52-66 shown in FIG. 1 to connect with the second adapter 1050. With reference to FIG. 7, the second adapter 1050 includes an upper proximal tab 1076 that cooperates with the push button 19 mm wiper arm 52, the push button 22 mm short wiper arm 58, and the push button 22 mm wiper arm 60 to connect each of these wiper arms 52, 58 and 60 to the second adapter 1050. The upper proximal tab 1076 can also be depressed, pushed away from the wiper arm, and/or manipulated to disengage the connection with these wiper arms.

Figure 8:
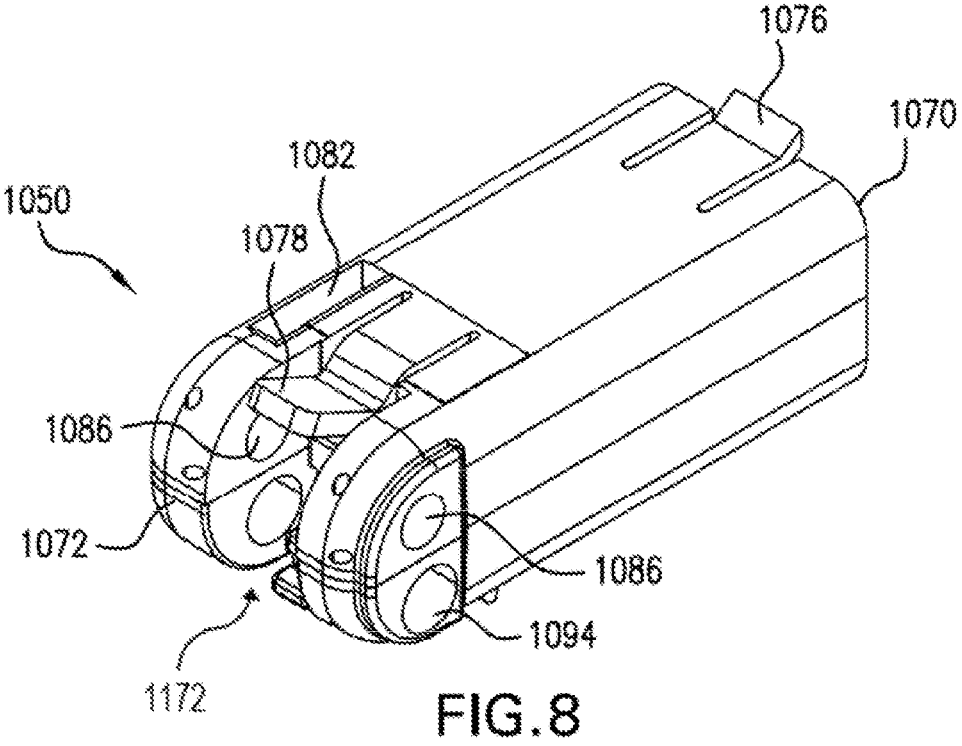
FIG. 8 is an upper proximal end perspective view of the adapter shown in FIG. 7.

With specific reference to FIGS. 7 and 8, the second adapter 1050 also includes an upper distal tab 1078 that cooperates with the pinch tab wiper arm 56 for connecting the pinch tab wiper arm 56 with the second adapter 1050. The upper distal tab 1078 can also be depressed, pushed away from the wiper arm, and/or manipulated to disengage the connection with these wiper arms. The second adapter 1050 also includes a cutout 1082 and a pair of aligned upper transverse openings 1086 that cooperate with the side pin wiper arm 64 for connecting the side pin wiper arm 64 to the second adapter 1050. The side pin wiper arm 64 can be detached from the second adapter 1050 by slidably removing the arm's pin from openings 1086 of the second adapter 1050.

Figure 9:
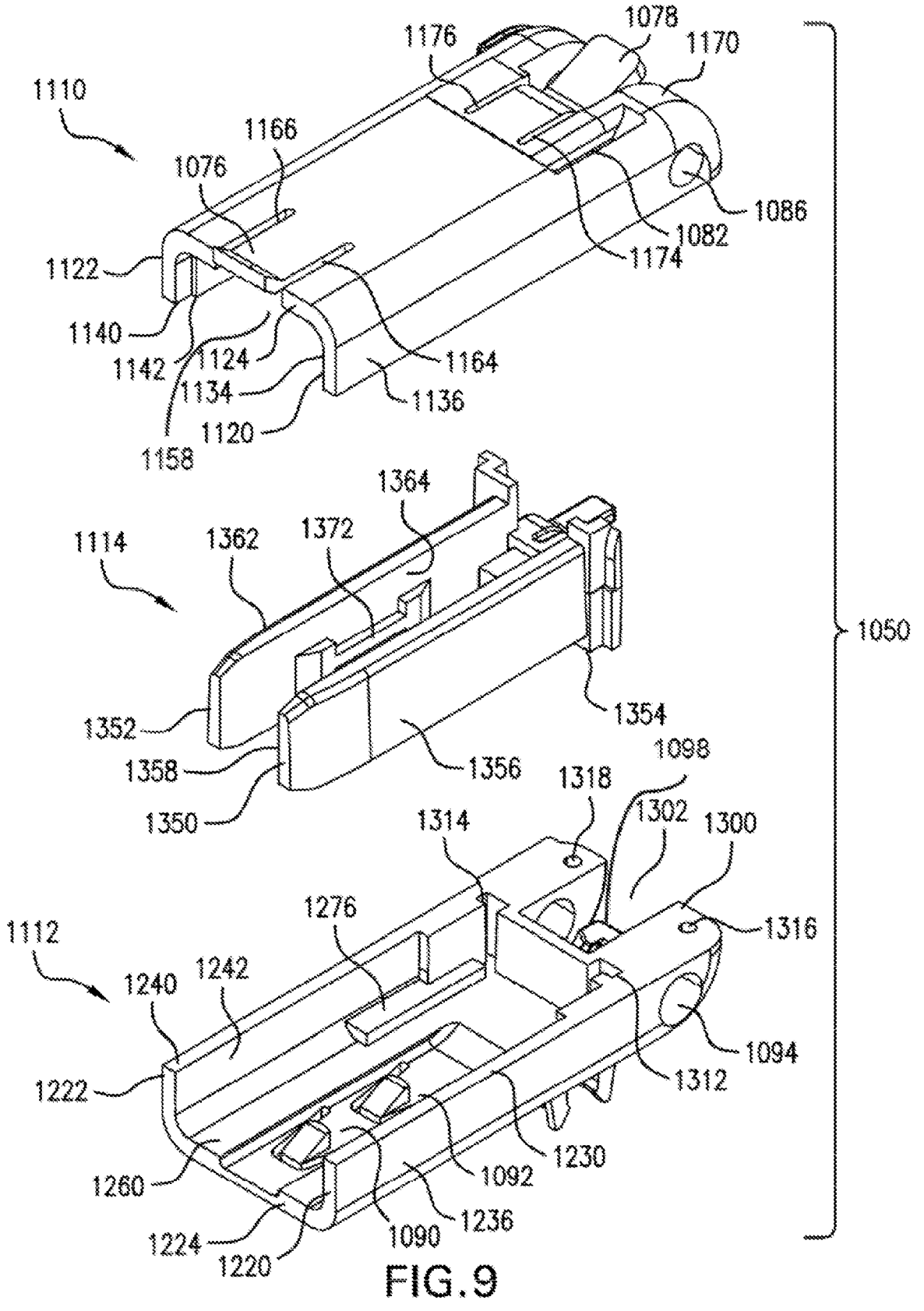
FIG. 9 is an exploded perspective view of the adapter shown in FIG. 7.

With reference to FIG. 9, the second adapter 1050 includes a first lower tab 1090 that cooperates with the large hook wiper arm 66 to connect the large hook wiper arm 66 with the second adapter 1050. The first lower tab 1090 can also be depressed, pushed away from the wiper arm, and/or manipulated to disengage the connection with the large hook wiper arm 66. The second adapter 1050 also includes a second lower tab 1092 that cooperates with the standard hook wiper arm 54 to connect the standard hook wiper arm 54 with the second adapter 1050. The second lower tab 1092 can also be depressed, pushed away from the wiper arm, and/or manipulated to disengage the connection with the standard hook wiper arm 54. The second adapter 1050 also includes a pair of aligned lower transverse openings 1094 that cooperate with a vertically central distal end tab 1096 and a vertically lower distal end tab 1098 to connect the side lock wiper arm 62 with the second adapter 1050. The distal end tab 1096 can also be depressed, pushed away from the wiper arm, and/or manipulated to disengage the connection with the side lock wiper arm 62. A cavity 1074 is appropriately dimensioned to receive the push button 19 mm wiper arm 52, the push button 22 mm short wiper arm 58, the push button 22 mm wiper arm 60, the standard hook wiper arm 54, the large hook wiper arm 66, and the pinch tab wiper arm 56. The aligned upper transverse openings 1086 receive a portion of the side lock wiper arm 62, and the aligned lower transverse openings 1094 receive a portion of the side pin wiper arm 64.

FIG. 7 depicts an exploded view of the second adapter 1050. The second adapter 1050 in the illustrated embodiment includes an upper body 1110, a lower body 1112, and an inner body 1114 positioned between the upper body 1110 and the lower body 1112. The second adapter 1050 is shown as being manufactured from separate parts that are finally assembled and joined to each other to provide a one-piece body. The second adapter 1050 can be made from fewer separate components or a greater number of separate components than those shown in FIGS. 6-8.

In the illustrated embodiment, the upper body 1110 includes the upper proximal tab 1076, the upper distal tab 1078, the cutout 1082 and the aligned upper transverse openings 1086. When viewed from the proximal end 1070 (see FIG. 7), the upper body 1110 has a general upside down U-shaped configuration so as to include an inner side wall section 1120, an outer side wall section 1122, and a top wall section 1124 bridging between the inner side wall section 1120 and the outer side wall section 1122.

Figure 10:
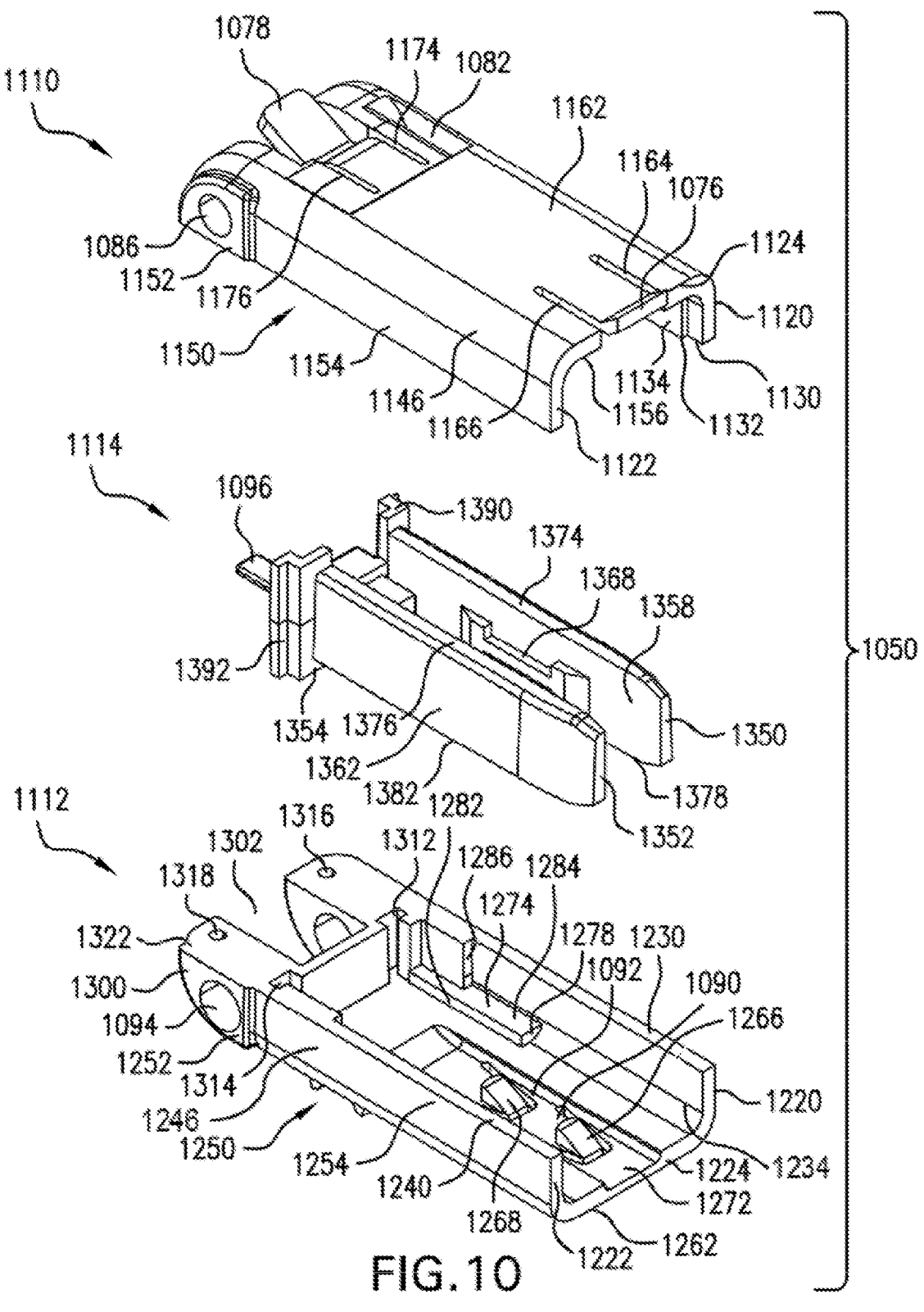
FIG. 10 is another exploded perspective view showing an opposite side of the adapter shown in FIG. 9.
Figure 11:
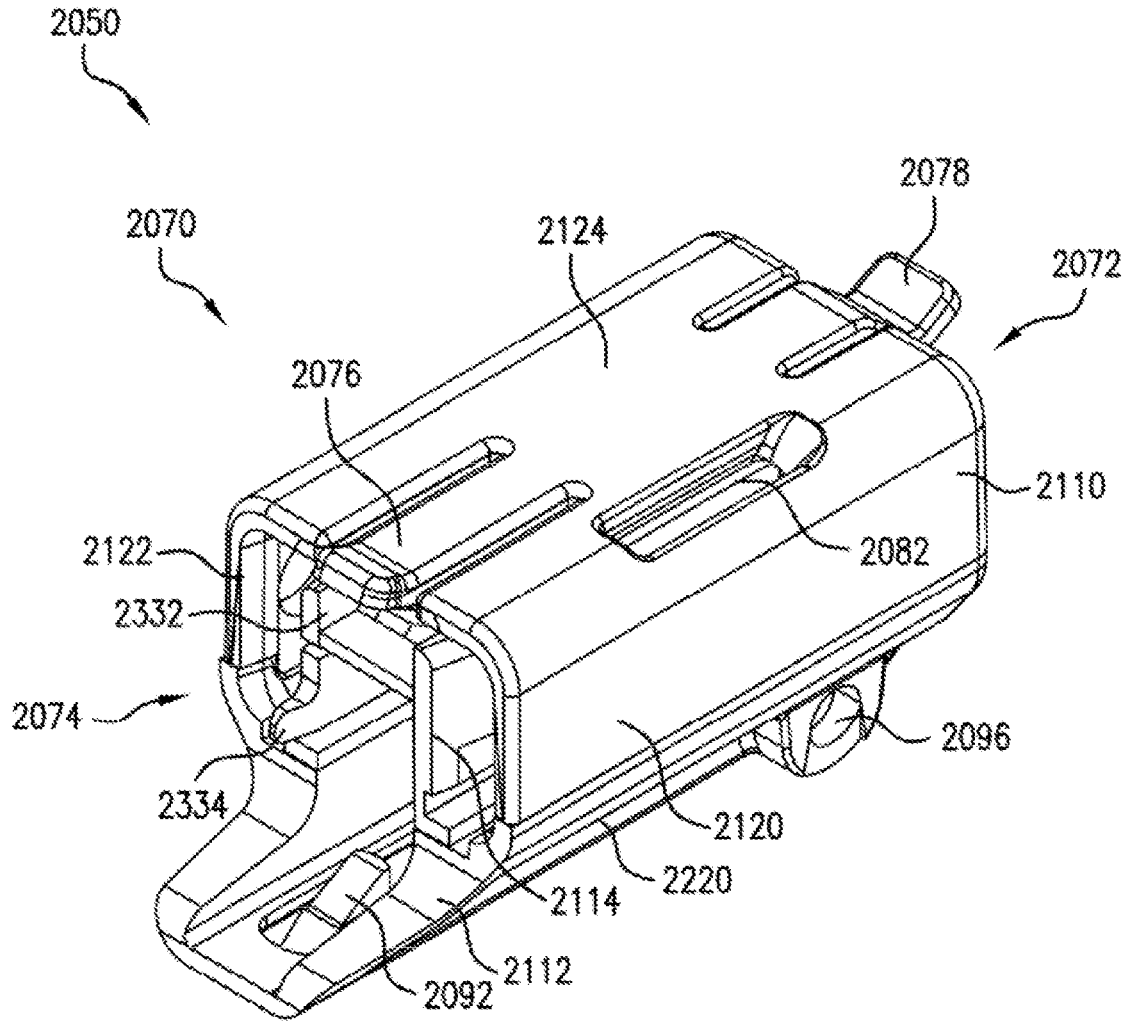
FIG. 11 is a perspective view of an adapter.

The upper body inner side wall section 1120 includes an inner lower edge 1130, which is more clearly seen in FIG. 10. An inner locating flange 1132 depends downwardly from the inner lower edge 1130 to facilitate connecting the upper body 1110 to the lower body 1112. The upper body inner side wall section 1120 also includes an interior surface 1134 and an exterior surface 1136. The exterior surface 1136 is substantially smooth and planar in the illustrated embodiment and faces toward the adapter-facing surface 38 when the second adapter 1050 is connected with the coupler 34.

The upper body outer side wall section 1122 also includes an outer lower edge 1140. An outer locating flange 1142 depends downwardly from the outer lower edge 1140. The upper body outer side wall section 1122 includes an interior surface 1144 and an exterior surface 1146. With reference to FIG. 10, an upper protuberance 1150 having an upper head section 1152 and an upper tail section 1154 extends outwardly from the exterior surface 1146 of the upper body outer side wall section 1122. The upper head section 1152 is curved and substantially semicircular in configuration. The upper tail section 1154 extends from the upper head section 1152 and tapers downwardly toward the proximal end 1070 (FIG. 7) of the second adapter 1050.

The upper body top wall section 1124 includes an interior surface 1156, in which a central upper recess 1158 is formed, and an exterior surface 1162. A first proximal end slot 1164 and a second proximal end slot 1166 each extend from the proximal end 1070 (FIG. 7) longitudinally toward the distal end 1072 (FIG. 8) to define the upper proximal tab 1076. A barb 168 extends downwardly from the upper proximal tab 1076 to engage in an opening provided in the push button 19 mm wiper arm 52, the push button 22 mm short wiper arm 58, or the push button 22 mm arm 60 (see FIG. 1).

The upper body 1110 also includes a distal end portion 1170 having a central notch 1172. The upper distal tab 1078 is positioned in the central notch 1172. As more clearly seen in FIG. 9, a first distal slot 1174 and a second distal slot 1176 define the upper distal tab 1078. A projection 1178 extends downwardly from the upper distal tab 1078 to engage inside an opening provided in the pinch tab wiper arm 56 (see FIG. 1). The cutout 1082 is located on a side of the central notch 1172 nearer to the upper body inner side wall section 1120 as compared to the outer side wall section 1122.

An inner vertical elongate slot and an outer vertical elongate slot are each provided in the distal end portion 1170. The vertical elongate slots facilitate attachment between the inner body 1114 with the upper body 1110. An inner post and an outer post each depend downwardly from a distal end portion lower surface, which is co-planar with the inner lower edge 1130 and the outer lower edge 1140, to facilitate attachment of the upper body 1110 to the lower body 1112.

In the illustrated embodiment, the lower body 1112 includes the first lower tab 1090, the second lower tab 1092, the aligned lower transverse openings 1094, and the vertically lower distal end tab 1098. When viewed from the proximal end 1070 (see FIG. 7), the lower body 1112 has a general U-shaped configuration and includes an inner side wall section 1220, an outer side wall section 1222, and a bottom wall section 1224 bridging between the inner side wall section 1220 and the outer side wall section 1222.

The lower body inner side wall section 1220 includes an inner upper edge 1230. The lower body inner side wall section 1220 also includes an interior surface 1234 and an exterior surface 1236. The exterior surface 1236 is substantially smooth and planar in the illustrated embodiment and faces toward the adapter-facing surface 38 when the second adapter 1050 is connected with the coupler 34.

The lower body outer side wall section 1222 also includes an outer upper edge 1240. The lower body outer side wall section 1222 also includes an interior surface 1244 and an exterior surface 1246. With reference to FIG. 10, a lower protuberance 1250 having a lower head section 1252 and a lower tail section 1254 extends outwardly from the exterior surface 1246 of the lower body outer side wall section 1222.

The lower head section 1252 is curved and substantially semicircular in configuration. The lower tail section 1254 extends from the lower head section 1252 and tapers upwardly toward the proximal end 1070 (FIG. 8) of the second adapter 1050.

The bottom wall section 1224 includes an interior surface 1260 and an exterior surface 1262. A backwards "E"-shaped cutout 1264 extends through the bottom wall section 1224 to define the first lower tab 1090 and the second lower tab 1092. The first lower tab 1090 is positioned closer to the proximal end 1070 of the second adapter 1050 than the second lower tab 1092. With reference to FIG. 10, a first barb 1266 extends upwardly from the first lower tab 1090 to engage in an opening provided in the large hook wiper arm 66 (FIG. 1). A second barb 1268 extends upwardly from the second lower tab 1092 to engage in an opening provided in the standard hook wiper arm 54 (FIG. 1).

The bottom wall section 1224 also includes a central lower recess 1272 in which the first lower tab 1090 and the second lower tab 1092 are located. The central lower recess 1272 is centrally located between the lower body inner side wall section 1220 and the lower body outer side wall section 1222. The central lower recess 1272 extends from the proximal end 1070 (see FIG. 7) toward the distal end 1072. The standard hook wiper arm 54 and the large hook wiper arm 66 are received in the central upper recess 1158 and the central lower recess 1272 when a distal end of either arm is received in the cavity 1074 (FIG. 7) and respective barbs 1266, 1268 are received in respective openings near the distal end of the respective wiper arms 54, 66.

With respect to FIG. 10, an inner shelf 1274 and an outer shelf 1276 extend upwardly from the bottom wall section 1224. The inner shelf 1274 extends inwardly from the interior surface 1234 of the lower body inner side wall section 1220. The outer shelf 1276 extends inwardly from the interior surface 1244 of the lower body outer side wall section 1222. The inner shelf 1274 and the outer shelf 1276 are mirror images of one another with respect to a longitudinal central axis. Therefore, the inner shelf 1274 will be described with particularity with the understanding that the outer shelf 1276 takes a similar configuration.

The inner shelf 1274 defines a vertical transverse surface 1278 positioned adjacent to a section of the "E"-shaped cutout 1264 that defines the second lower tab 1092. The vertical transverse surface 1278 is planar in the illustrated embodiment. The inner shelf 1274 also defines a vertical longitudinal surface 1282 that is laterally offset from the central lower recess 1272 in a direction toward the lower body inner side wall section 1220. The vertical longitudinal surface 1282 is also planar. The inner shelf 1274 also defines a horizontal longitudinal surface 1284 that is vertically offset above the interior surface 1260 of the bottom wall section 1224. The horizontal longitudinal surface 1284 is also planar. A slightly inclined generally vertical surface 1286 extends upwardly from the horizontal longitudinal surface 1284.

The lower body 1112 includes a first catch and a second catch each extending downwardly from the exterior surface 1262 of the lower body bottom wall section 1224. The first and second catches cooperate with each other and are spaced appropriately to define an axle channel that receives the post (not visible in FIG. 1) extending between the adapter attachment mounts 42. The catches connecting with the post is only one possible method of attaching the second adapter 1050 to the coupler 34. Other types of attachment mechanisms that allow the second adapter 1050 to pivot with respect to the coupler 34 could also be used and these attachment mechanisms could be located on other surfaces of the second adapter 1050. For example, an attachment mechanism could be provided on an inner side or an outer side of the second adapter 1050.

The lower body 1112 also includes a lower body distal end portion 1300 having a lower central notch 1302 that is aligned with the upper central notch 1172 in the upper body distal end portion 1170 when the lower body 1112 is connected with the upper body 1110. The vertically lower distal end tab 1098 is positioned in the lower central notch 1302. A projection extends upwardly from the vertically lower distal end tab 1098 to engage inside an annular recess provided in an axle (or pin) on the side lock wiper arm 62 (FIG. 1) when the axle is received through one of the aligned lower transverse openings 1094.

An inner vertical elongate slot 1312 and an outer vertical elongate slot 1314 are each provided in the lower body distal end portion 1300. The vertical elongate slots 1312, 1314 facilitate attachment of the inner body 1114 with the lower body 1112. An inner post receptacle 1316 and an outer post receptacle 1318 are each provided in a lower body distal end portion upper surface 1322, which is co-planar with the inner upper edge 1230 and the outer upper edge 1240. The inner post receptacle 1316 receives the inner post and the outer post receptacle 1318 receives the outer post when the upper body 1110 is attached with the lower body 1112.

The inner body 1114 includes an inner tongue 1350 and an outer tongue 1352 that each extend toward the proximal end 1070 (FIG. 7) of the second adapter 1050 from a cross member 1354. The inner tongue 1350 includes an exterior surface 1356, which is generally planar, vertically oriented and offset from the interior surface 1134 of the upper body inner side wall section 1120 and the interior surface 1234 of the lower body inner side wall section 1220. The inner tongue 1350 also includes an interior surface 1358 that faces towards the outer tongue 1352.

Similarly, the outer tongue 1352 includes an exterior surface 362 parallel to the exterior surface 1356 of the inner tongue 1350. The outer tongue 1352 also includes an interior surface 1364 that is generally vertically oriented, parallel to and offset from the interior surface 1358 of the inner tongue 1350. An inner bone-shaped protuberance 1368 (FIG. 10) extends inwardly from the interior surface 1358 of the inner tongue 1350 towards the outer tongue 1352. Similarly, another inner protuberance 1372 (FIG. 9) is provided on the interior surface 1364 of the outer tongue 1352 and faces toward the inner tongue 1350. The inner protuberances 1368 and 1372 engage with the standard hook wiper arm 54 and the large hook wiper arm 66 when either the standard hook wiper arm 54 or the large hook wiper arm 66 is received within the cavity 1074 of the second adapter 1050 and more particularly between the inner tongue 1350 and the outer tongue 1352.

The inner tongue 1350 includes an inner tongue upper edge 1374 and the outer tongue 1352 includes an outer tongue upper edge 1376. The inner tongue upper edge 1374 is co-planar with the outer tongue upper edge 1376. The upper edges 1374 and 1376 are offset vertically beneath the interior surface 1156 of the upper body top wall section 1124. This allows horizontally (generally) disposed sections of the push button 19 mm wiper arm 52, the pinch tab wiper arm 56, the push button 22 mm short wiper arm 58, and the push button 22 mm wiper arm 60 to fit between the upper edges 1374, 1376 and the interior surface 1156 of the upper body top wall section 1124 when any of these aforementioned wiper arms 52, 56, 58 and 60 are received in the cavity 1074 (FIG. 7).

The inner tongue 1350 also includes an inner tongue lower edge 1378 and the outer tongue 1352 includes an outer tongue lower edge 1382. The lower edge 1378 of the inner tongue 1350 is co-planar with the lower edge 1382 of the outer tongue 1352. Each of the lower edges 1378, 1382 are offset from the interior surface 1260 of the lower body bottom wall section 1224.

An inner flange 1390 extends away from the cross member 1354. An outer flange 1392 also extends from the cross member 1354. When the second adapter 1050 is assembled, the inner flange 1390 is received in the inner vertical elongate slot in the upper body 1110 and in the inner vertical elongate slot 1312 in the lower body 1112. Likewise, the outer flange 1392 is received in the outer vertical elongate slot in the upper body 1110 and the outer vertical elongate slot 1314 in the lower body 1112.

The inner body 1114 also includes the vertically central distal end tab 1096 that extends away from the cross member 1354 in a direction opposite the direction in which the tongues 1350, 1352 extend. The vertically central distal end tab 1096 facilitates the connection of the side lock wiper arm 62 (FIG. 1) when the axle thereof is received through one of the aligned lower transverse openings 1094.

Figure 35A:
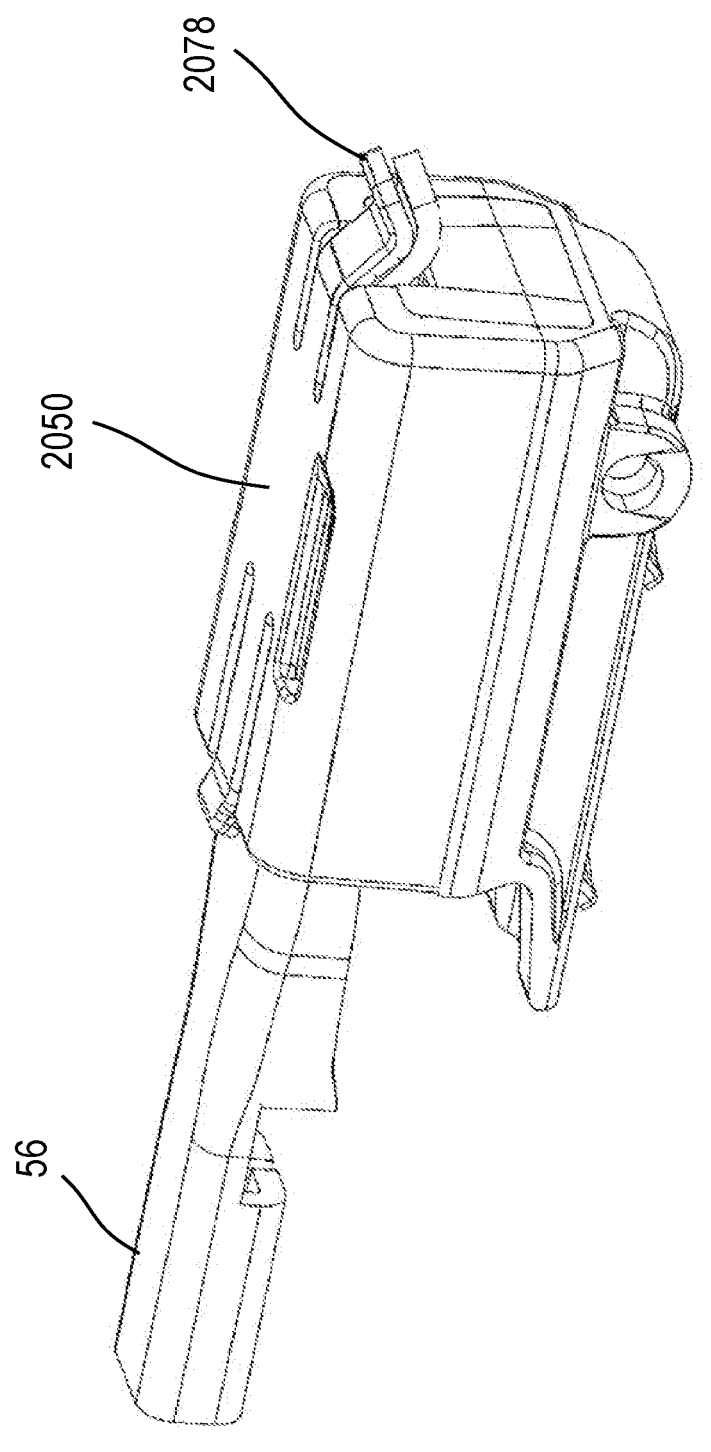
FIG. 35A is a perspective view illustrating a pinch tab wiper arm connected to a third adapter.
Figure 35B:
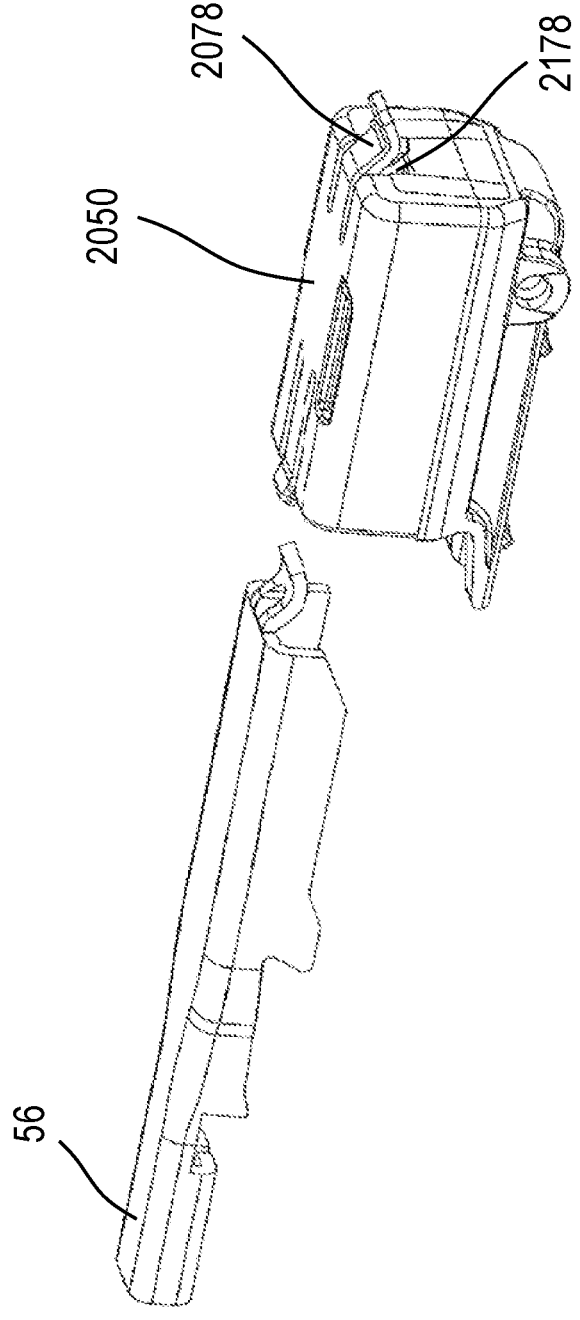
FIG. 35B is a perspective view illustrating how the pinch tab wiper arm of FIG. 35A is received by or removed from a third adapter.
Figure 36A:
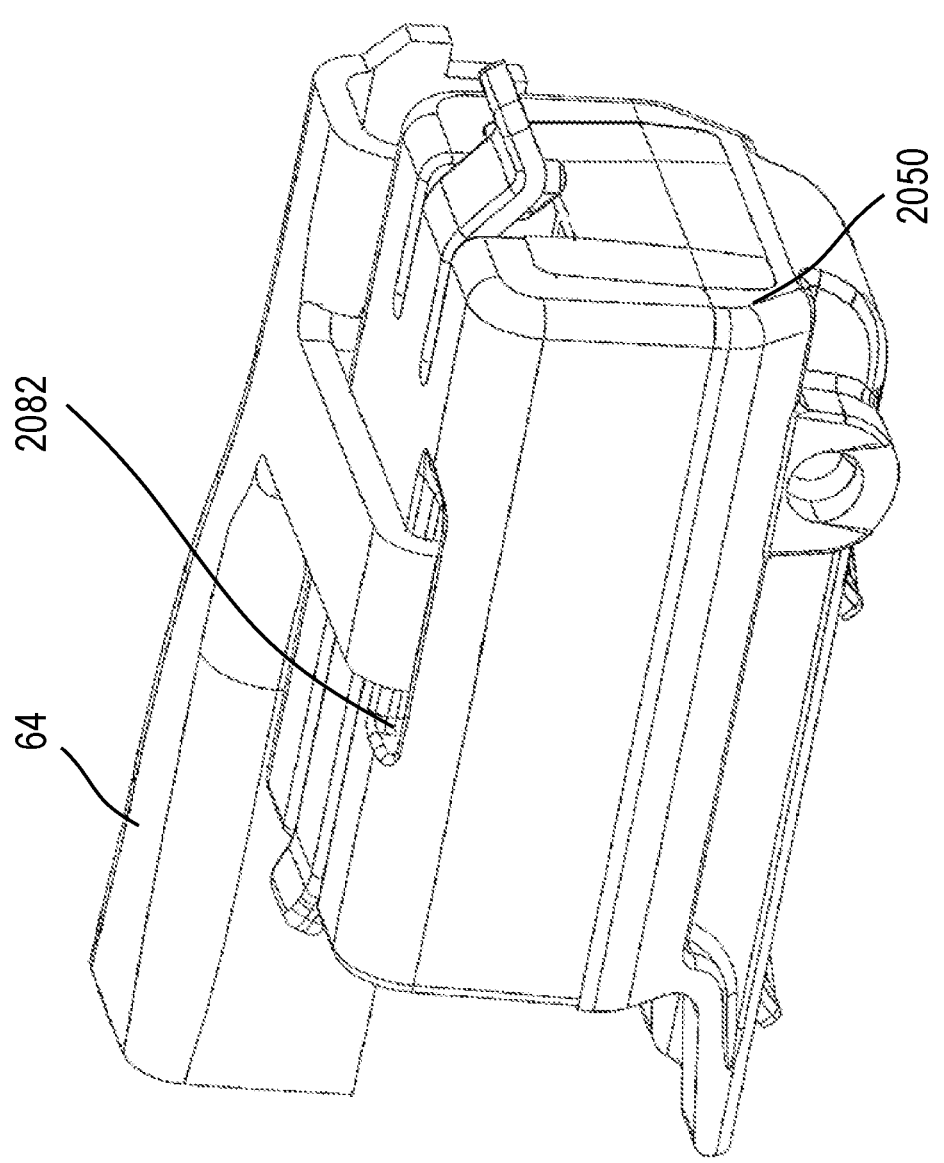
FIG. 36A is a perspective view illustrating a side pin wiper arm connected to a third adapter.
Figure 36B:
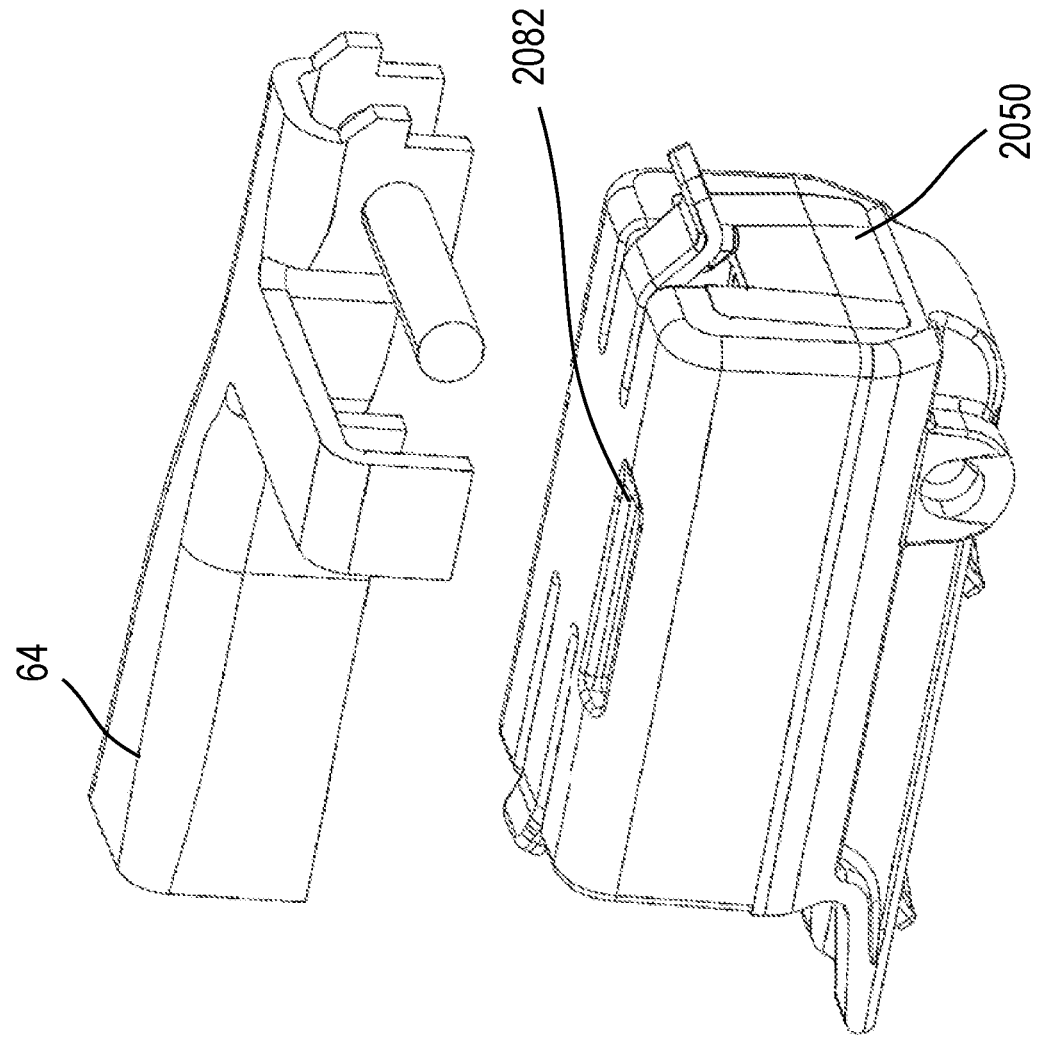
FIG. 36B is a perspective view illustrating how the side pin wiper arm of FIG. 36A is received by or removed from a third adapter.
Figure 37A:
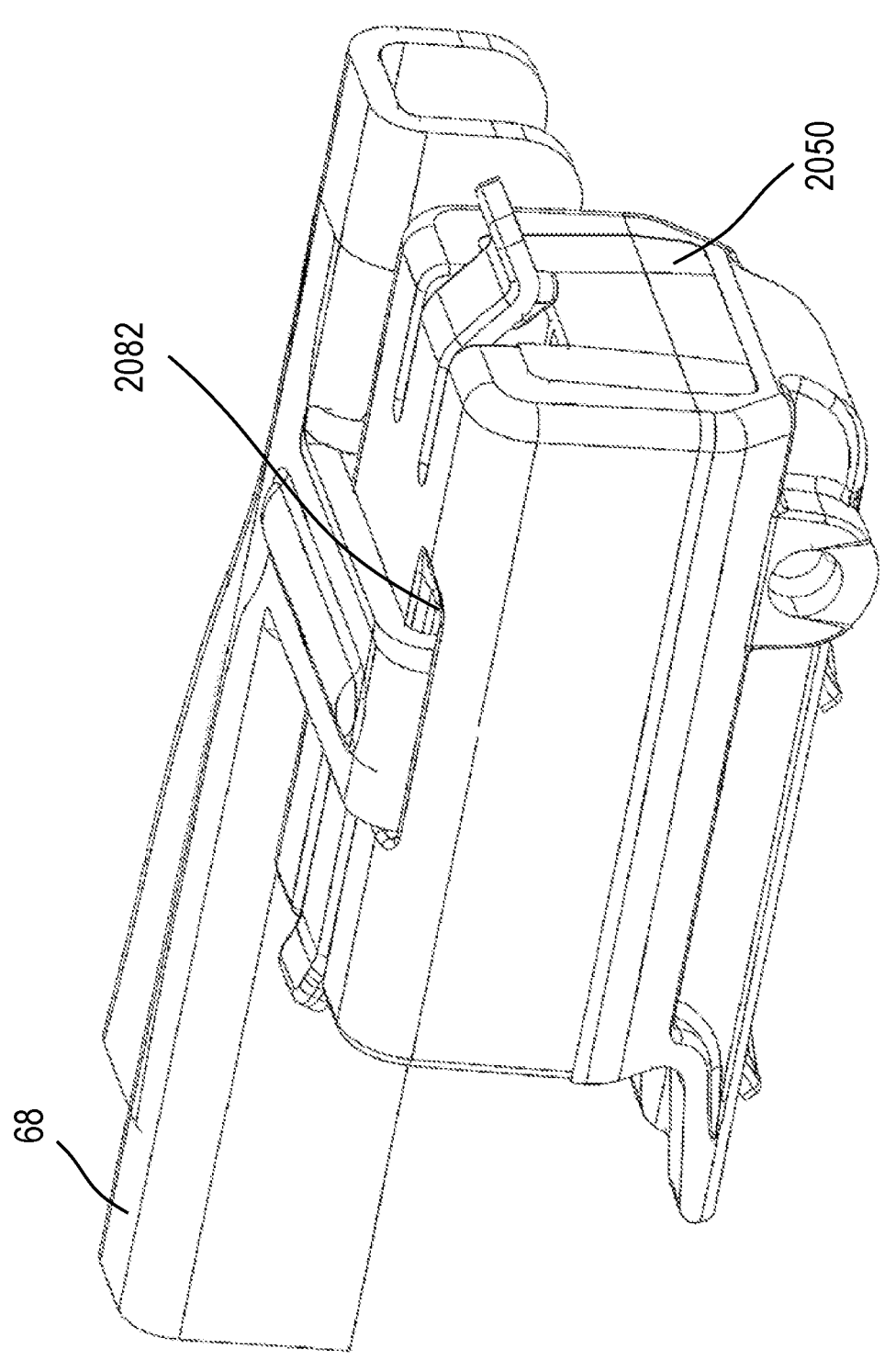
FIG. 37A is a perspective view illustrating a side pin offset wiper arm connected to a third adapter.
Figure 37B:
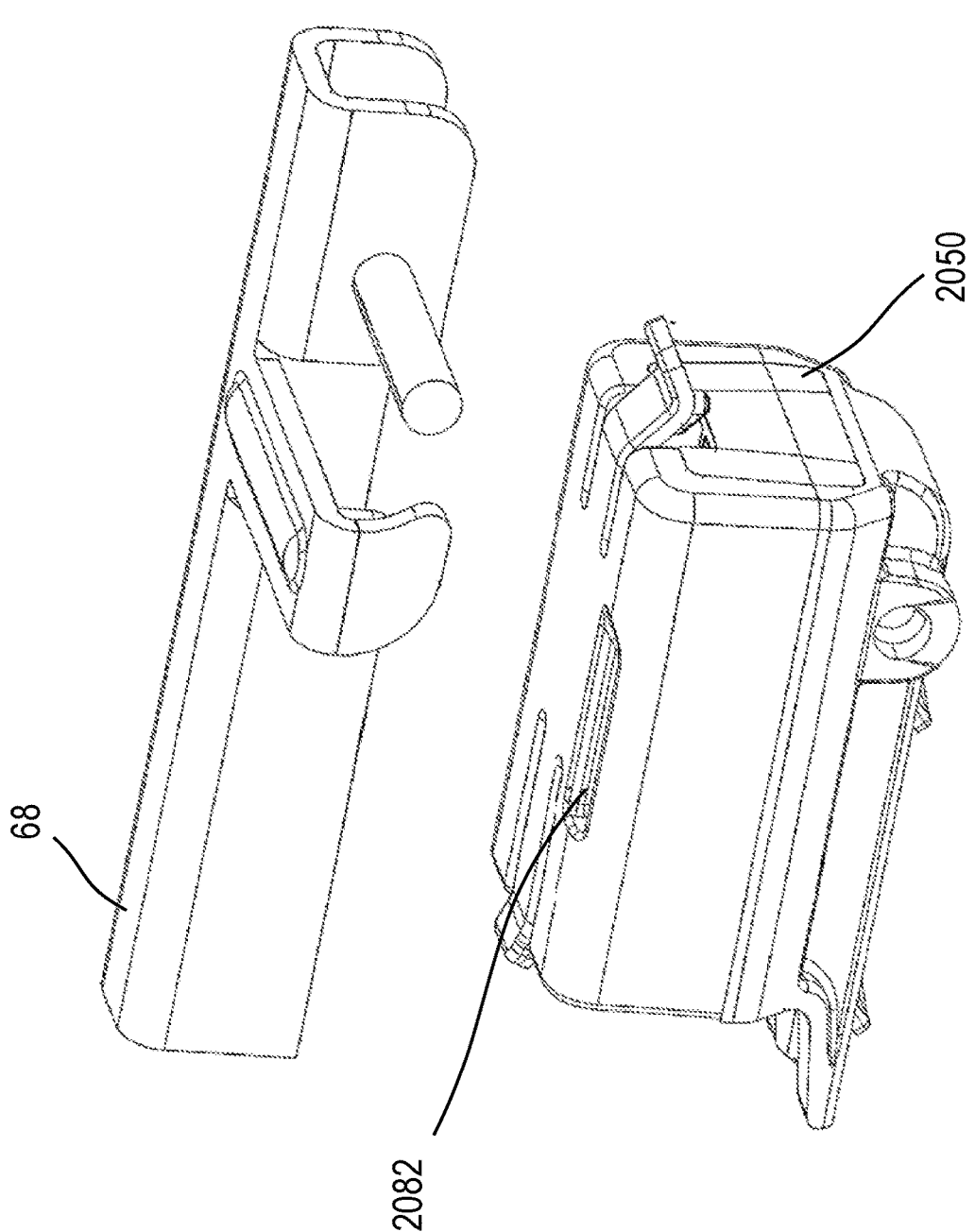
FIG. 37B is a perspective view illustrating how the side pin offset wiper arm of FIG. 37A is received by or removed from a third adapter.

With reference to FIGS. 11-14, the third adapter 2050 is shown. The third adapter 2050 can be installed on and/or removed from various wiper arms in the same or similar manner discussed and depicted with respect to adapter 50. The third adapter 2050 includes an upper proximal tab 2076 that cooperates with the push button 19 mm wiper arm 52, the push button 22 mm short wiper arm 58, the push button 22 mm wiper arm 60, and the fz wiper arm 69 to connect each of these wiper arms 52, 58, 60, 69 to the third adapter 2050. The upper proximal tab 2076 can also be depressed, pushed away from the wiper arm, and/or manipulated to disengage the connection with these wiper arms. FIGS. 31A-31B, 32A-32B, 33A-33B, and 34A-34B are functional drawings illustrating how these exemplary push button style wiper arms interact with the third adapter 2050 according to certain embodiments. As noted hereinbefore, the various wiper arms are illustrated in FIG. 1. The third adapter 2050 also includes an upper distal tab 2078 that cooperates with the pinch tab wiper arm 56 for connecting the pinch tab wiper arm 56 with the third adapter 2050. The upper distal tab 2078 can also be depressed, pushed away from the wiper arm, and/or manipulated to disengage the connection with the pinch tab wiper arm 56. FIGS. 35A-35B are functional drawings illustrating how this exemplary pinch tab style wiper arm interacts with the third adapter 2050 according to certain embodiments.

Figure 38A:
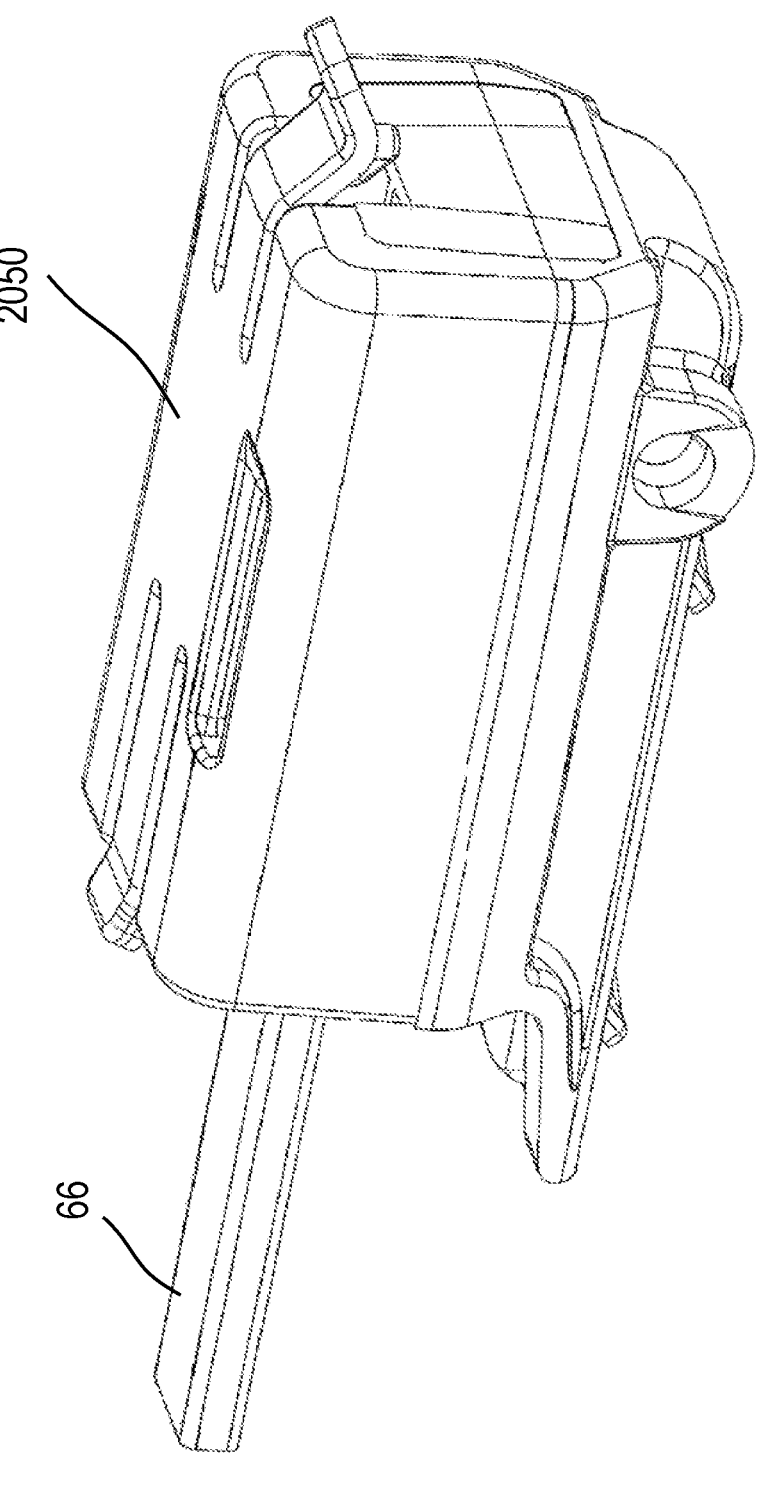
FIG. 38A is a perspective view illustrating a large hook wiper arm connected to a third adapter.
Figure 38B:
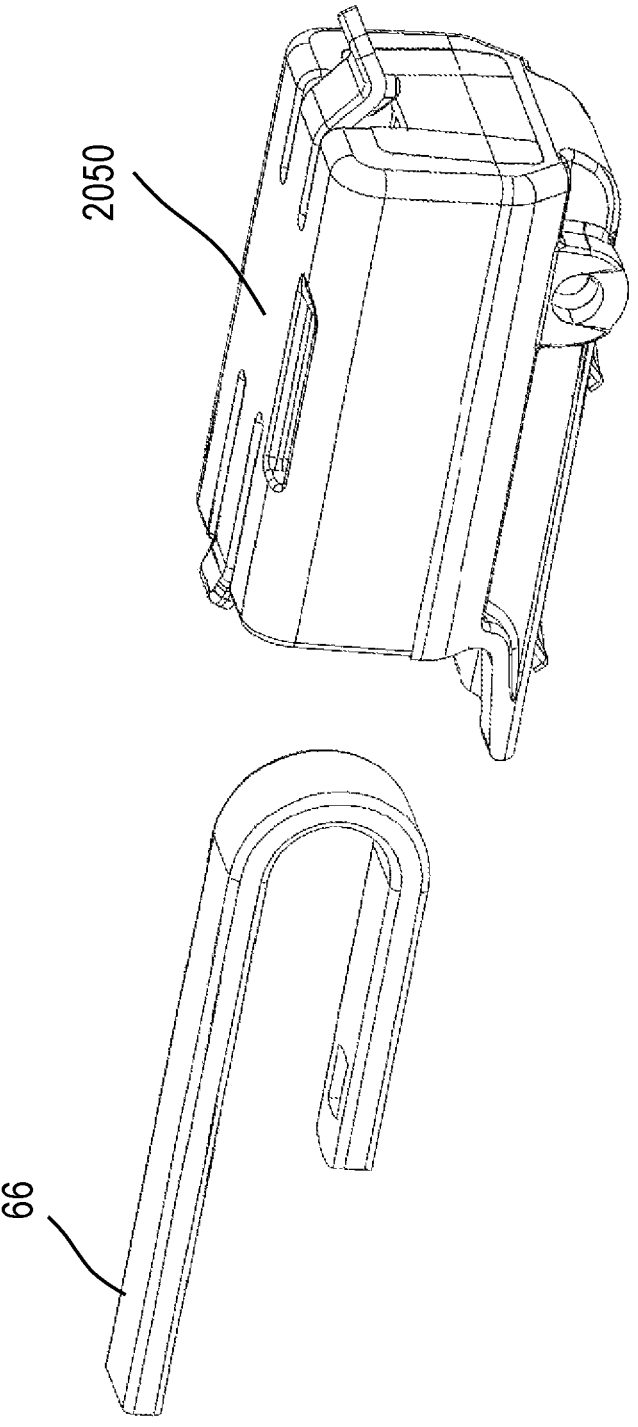
FIG. 38B is a perspective view illustrating how the large hook wiper arm of FIG. 38A is received by or removed from a third adapter.
Figure 39A:
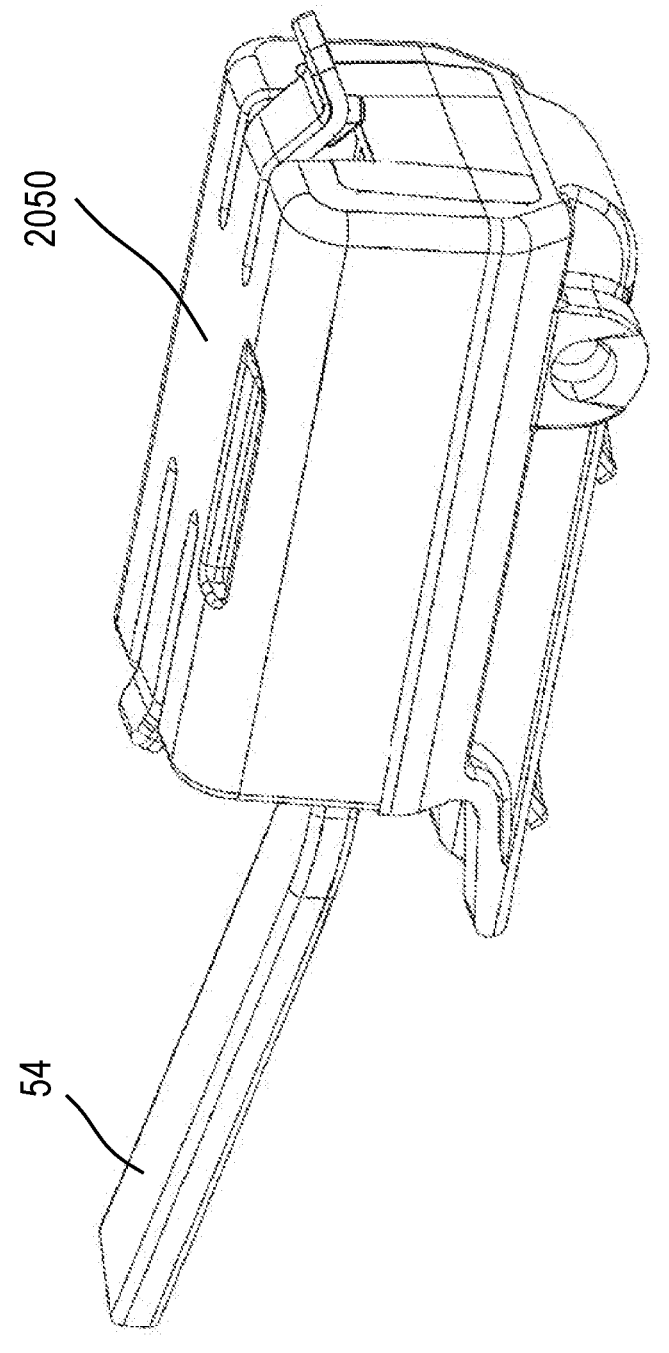
FIG. 39A is a perspective view illustrating a standard hook wiper arm connected to a third adapter.
Figure 39B:
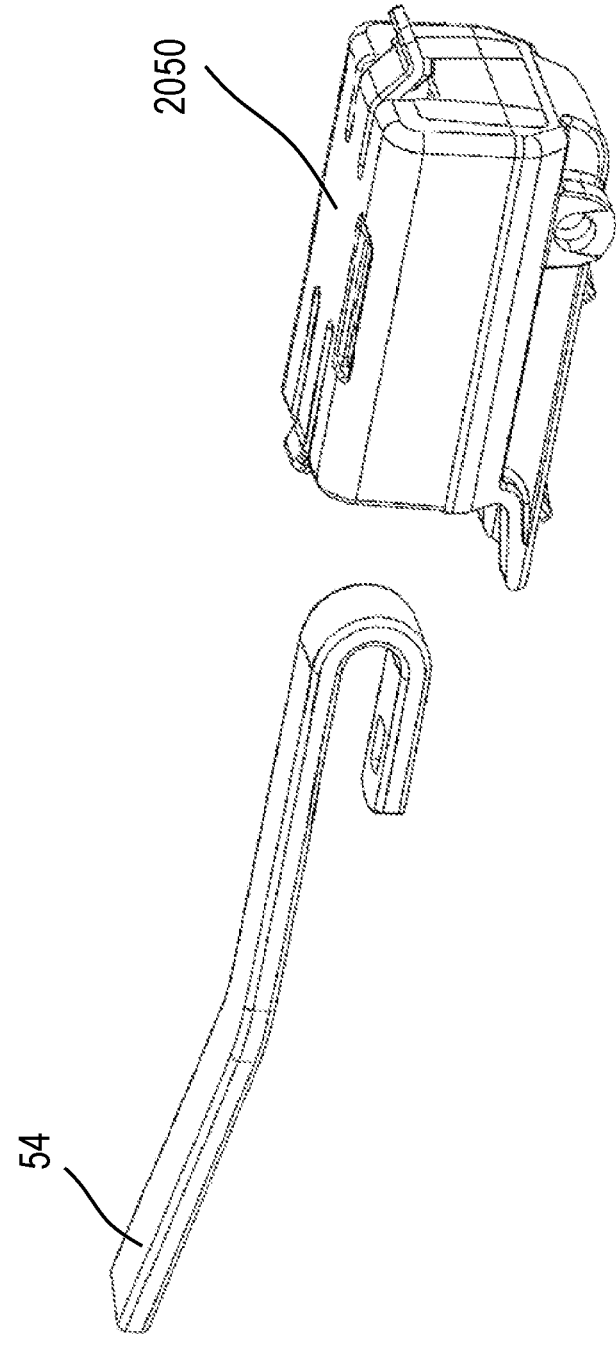
FIG. 39B is a perspective view illustrating how the standard hook wiper arm of FIG. 39A is received by or removed from a third adapter.

The third adapter 2050 also includes a cutout 2082 and a transverse distal opening 2086 (FIG. 12) that cooperates with the side pin wiper arm 64 or the side pin offset wiper arm 68 for connecting the side pin wiper arm 64 or the side pin offset wiper arm 68 to the third adapter 2050. The side pin wiper arm 64 or the side pin offset wiper arm 68 can be detached from the third adapter 2050 by slidably removing the arm's pin from openings 2086 of the third adapter 2050. FIGS. 36A-36B and 37A-37B are functional drawings illustrating how these exemplary pin style wiper arms interact with the third adapter 2050 according to certain embodiments. As shown in FIG. 13, the third adapter 2050 further includes a first lower tab 2090 that cooperates with the large hook wiper arm 66 to connect the large hook wiper arm 66 with the third adapter 2050. The first lower tab 2090 can also be depressed, pushed away from the wiper arm, and/or manipulated to disengage the connection with the large hook wiper arm 66. FIGS. 38A-38B are functional drawings illustrating how this exemplary large hook style wiper arm interacts with the third adapter 2050 according to certain embodiments. The third adapter 2050 also includes a second lower tab 2092 that cooperates with the standard hook wiper arm 54 to connect the standard hook wiper arm 54 with the third adapter 2050. The second lower tab 2092 can also be depressed, pushed away from the wiper arm, and/or manipulated to disengage the connection with the standard hook wiper arm 54. FIGS. 39A-39B are functional drawings illustrating how this exemplary standard hook style arm interacts with the third adapter 2050 according to certain embodiments.

Figure 12:
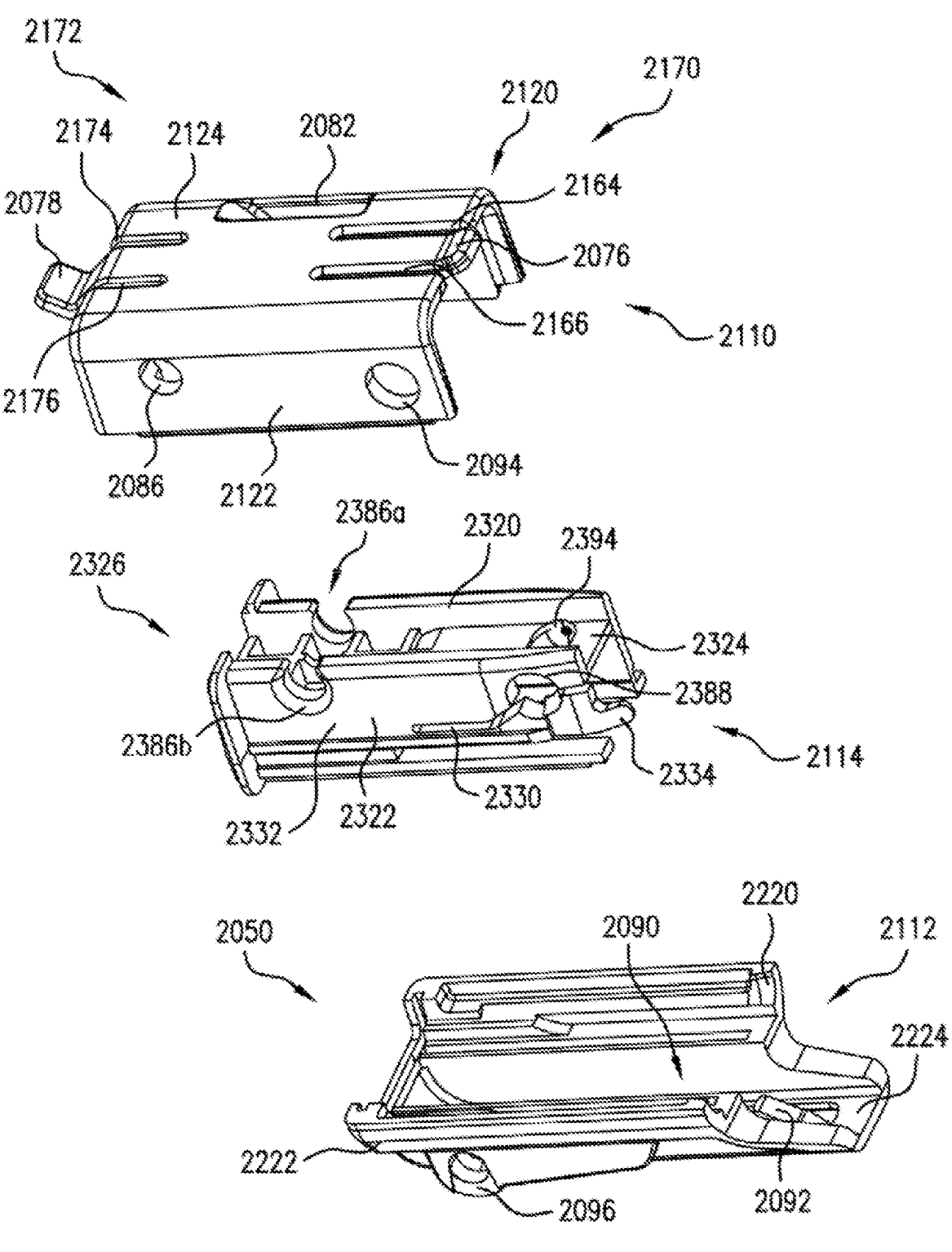
FIG. 12 is an exploded perspective view of the adapter of FIG. 11.
Figure 13:
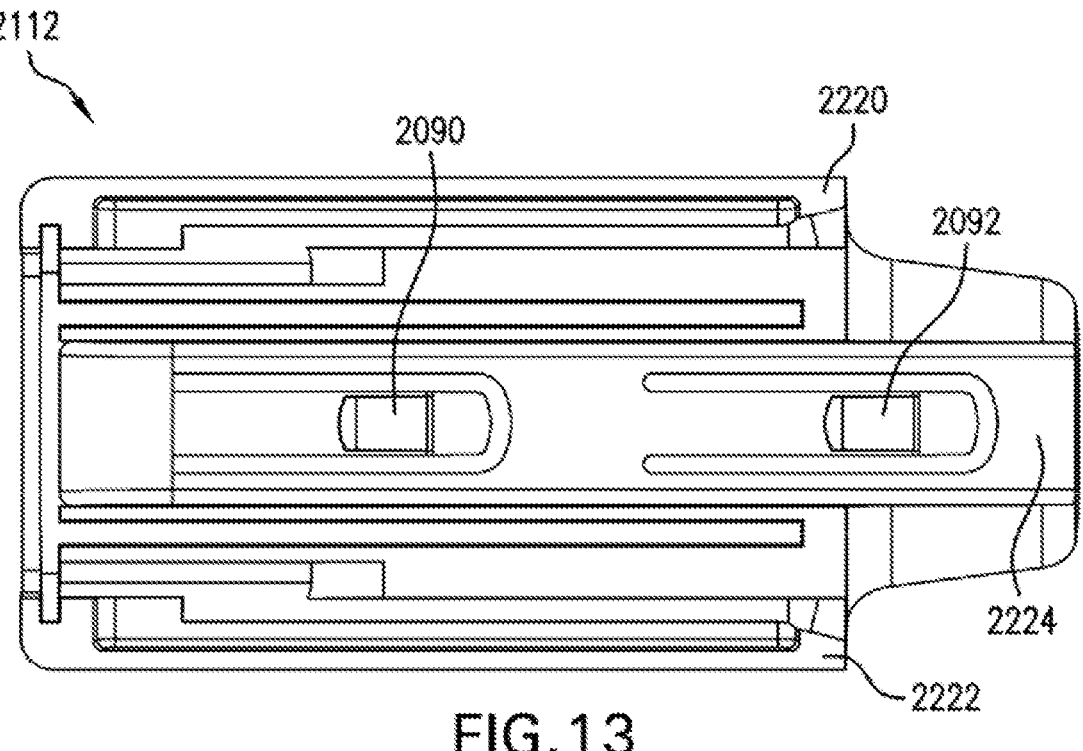
FIG. 13 is a top plan view of a lower body of the adapter of FIG. 11.
Figure 14:
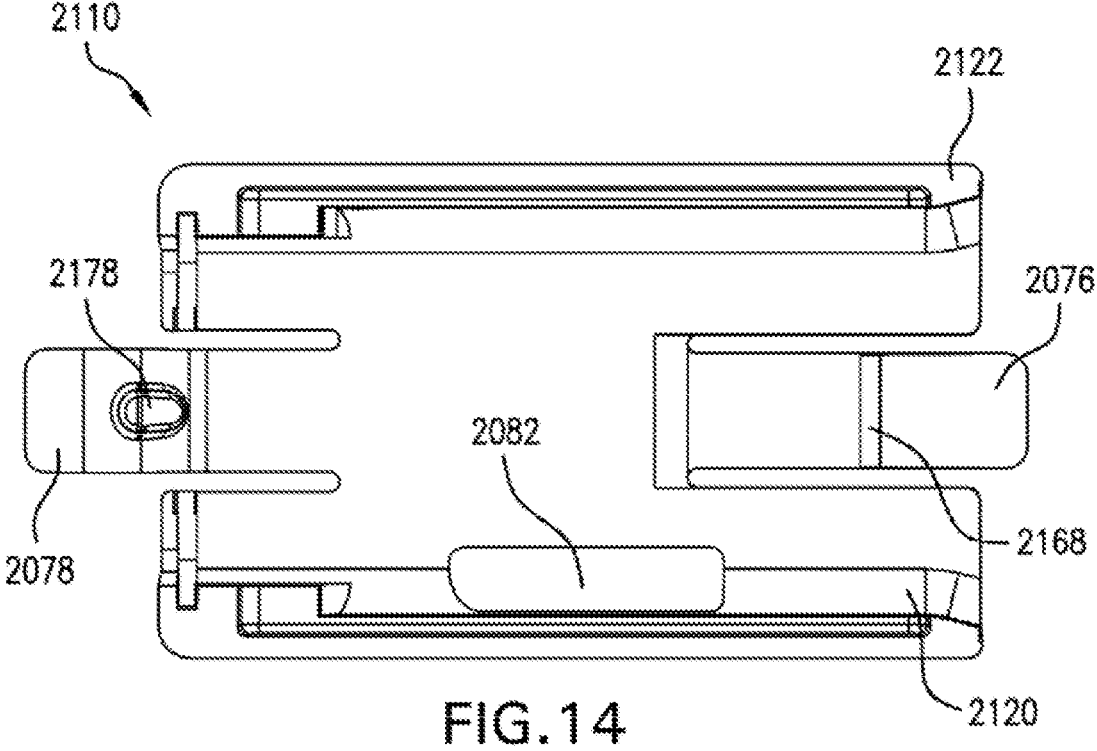
FIG. 14 is a bottom plan view of an upper body of the adapter of FIG. 11.
Figure 40A:
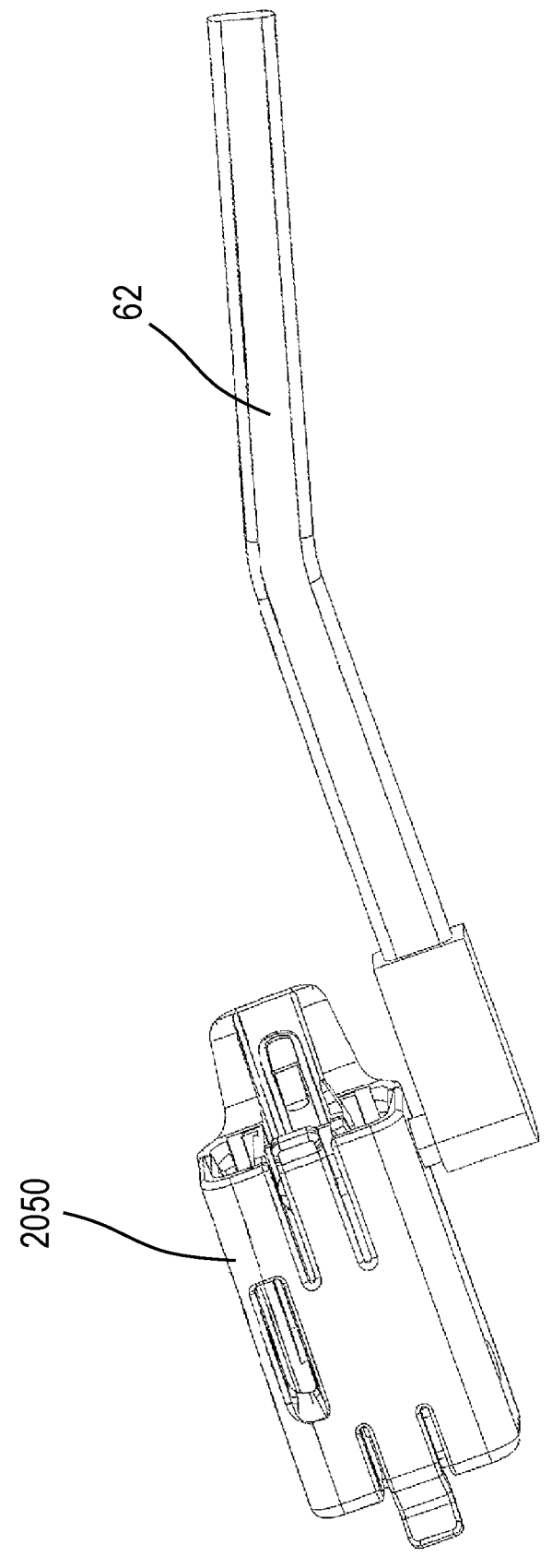
FIG. 40A is a perspective view illustrating a side lock wiper arm connected to a third adapter.
Figure 40B:
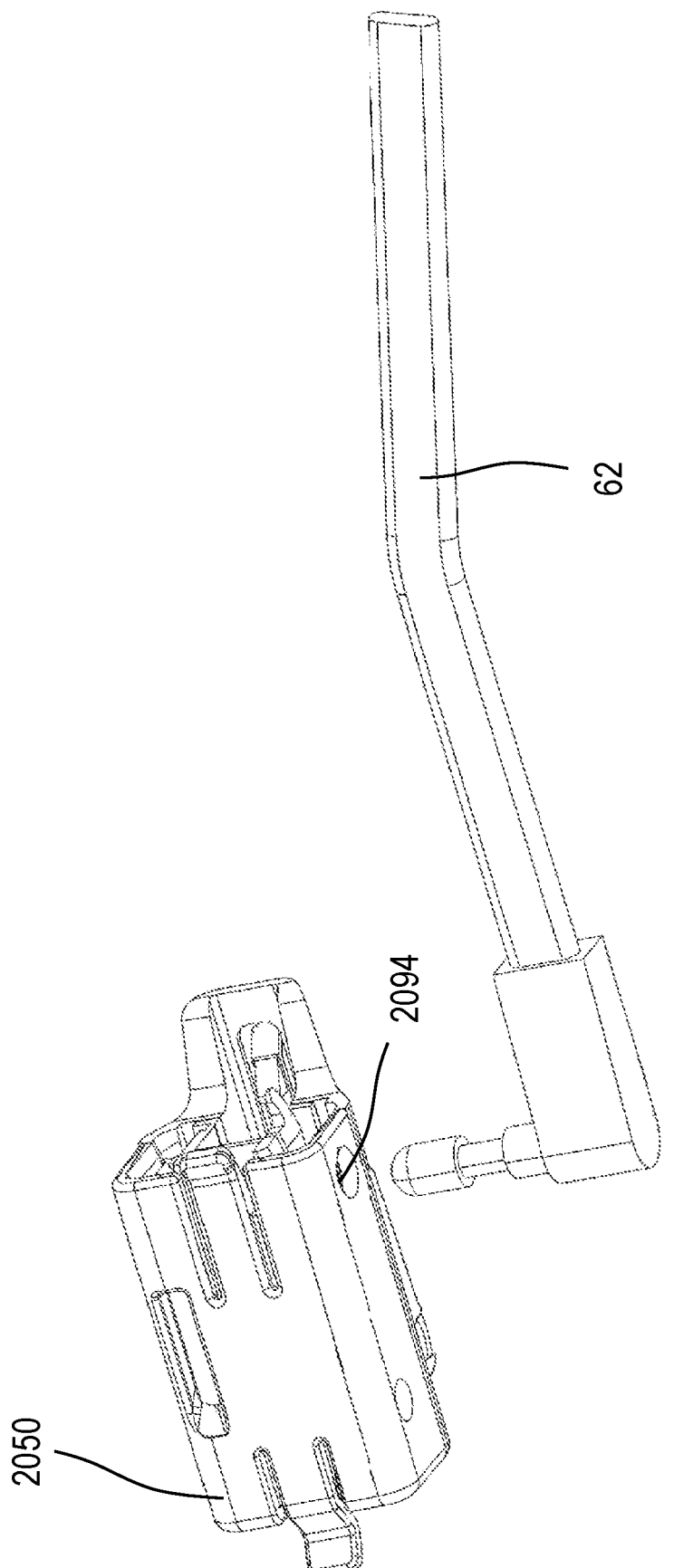
FIG. 40B is a perspective view illustrating how the side lock wiper arm of FIG. 40A is received by or removed from a third adapter.
Figure 41A:
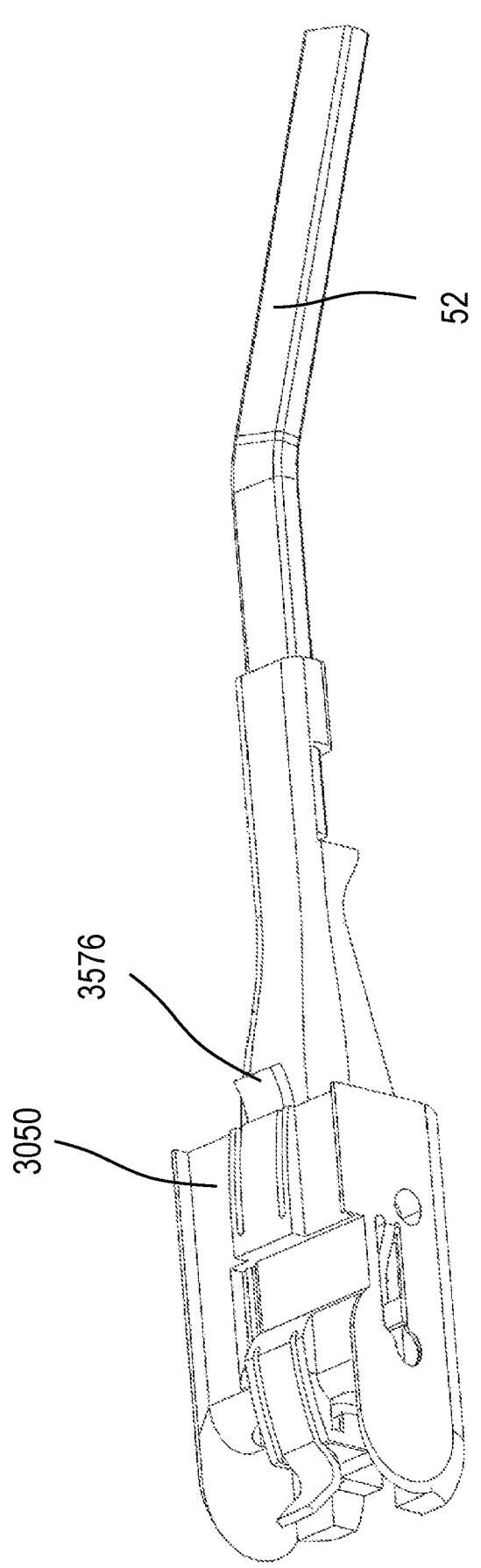
FIG. 41A is a perspective view illustrating a push button 19 mm wiper arm connected to a fourth adapter.
Figure 41B:
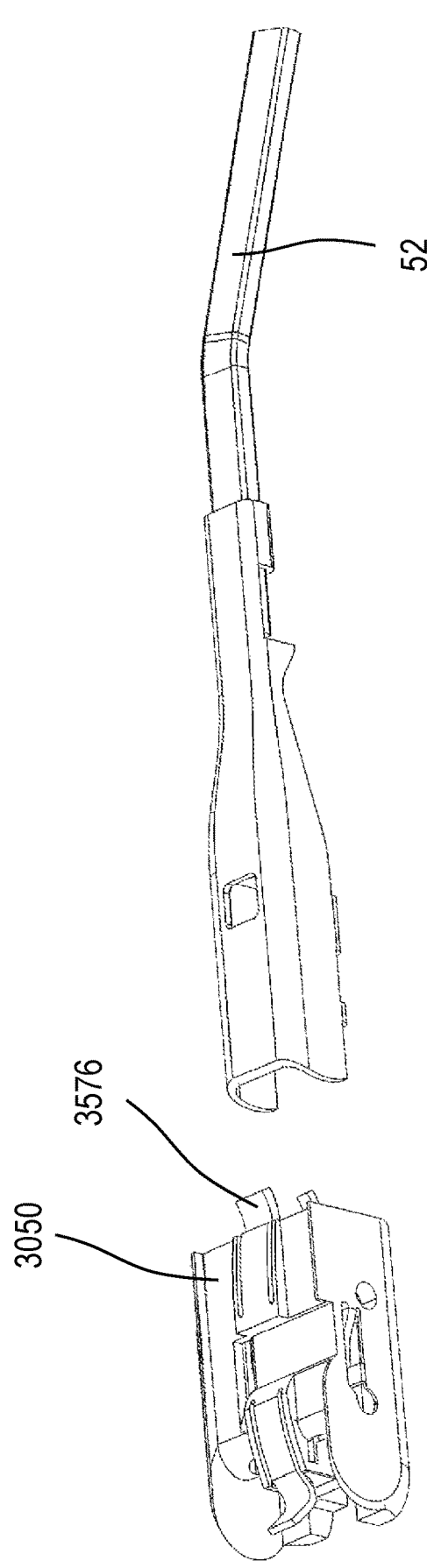
FIG. 41B is a perspective view illustrating how the push button 19 mm wiper arm of FIG. 41A is received by or removed from a fourth adapter.
Figure 42A:
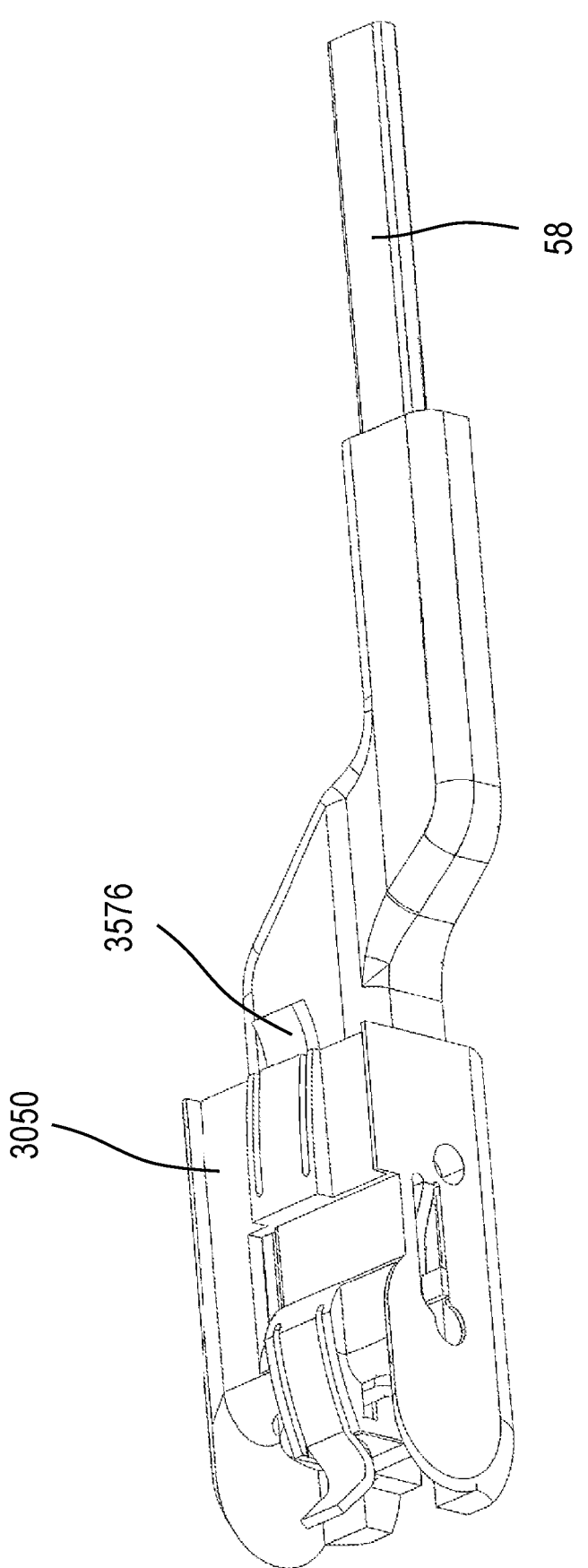
FIG. 42A is a perspective view illustrating a push button 22 mm wiper arm connected to a fourth adapter.
Figure 42B:
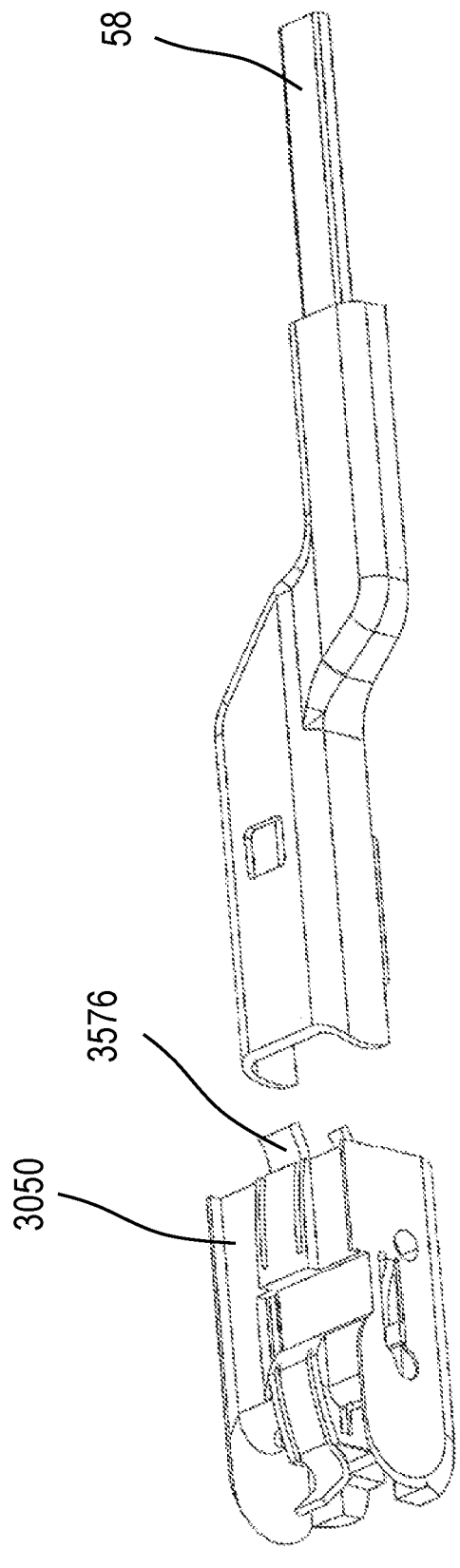
FIG. 42B is a perspective view illustrating how the push button 22 mm wiper arm of FIG. 42A is received by or removed from a fourth adapter.
Figure 43A:
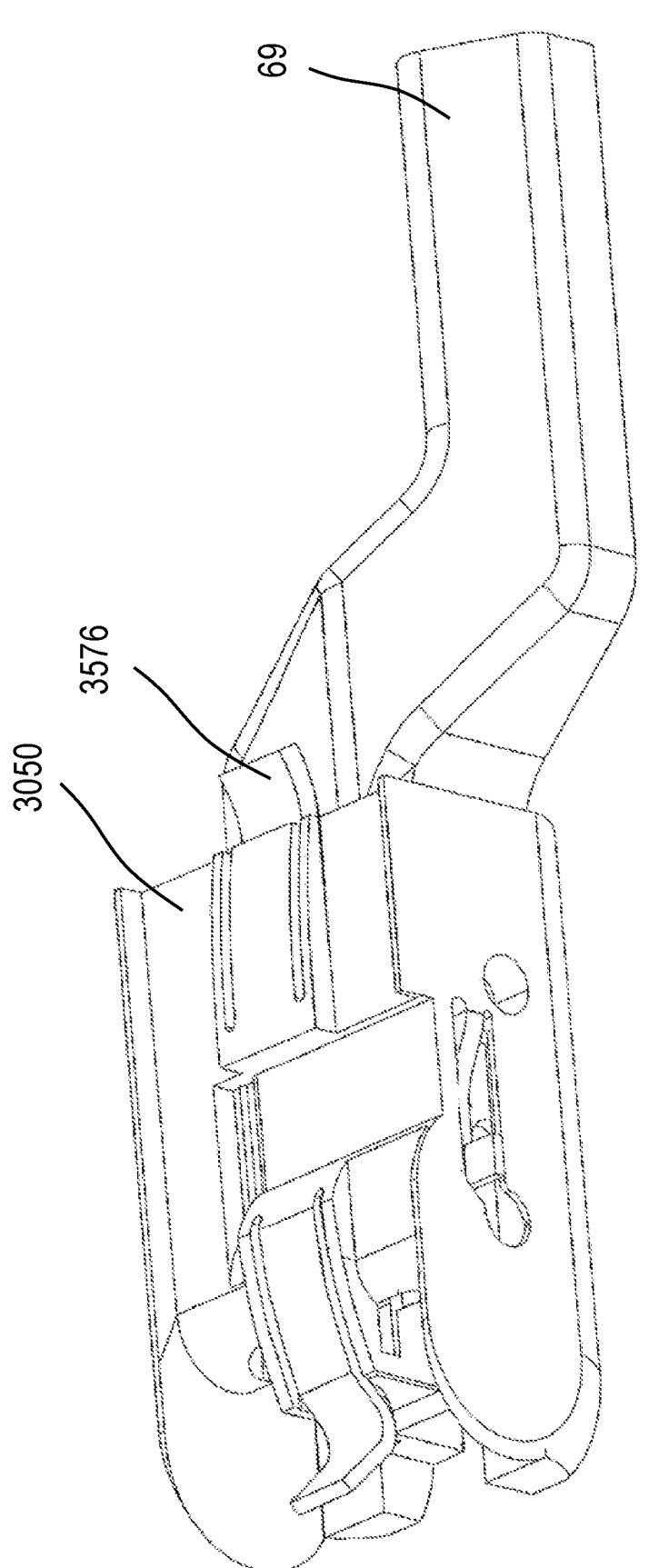
FIG. 43A is a perspective view illustrating a fitted zone wiper arm connected to a fourth adapter.
Figure 43B:
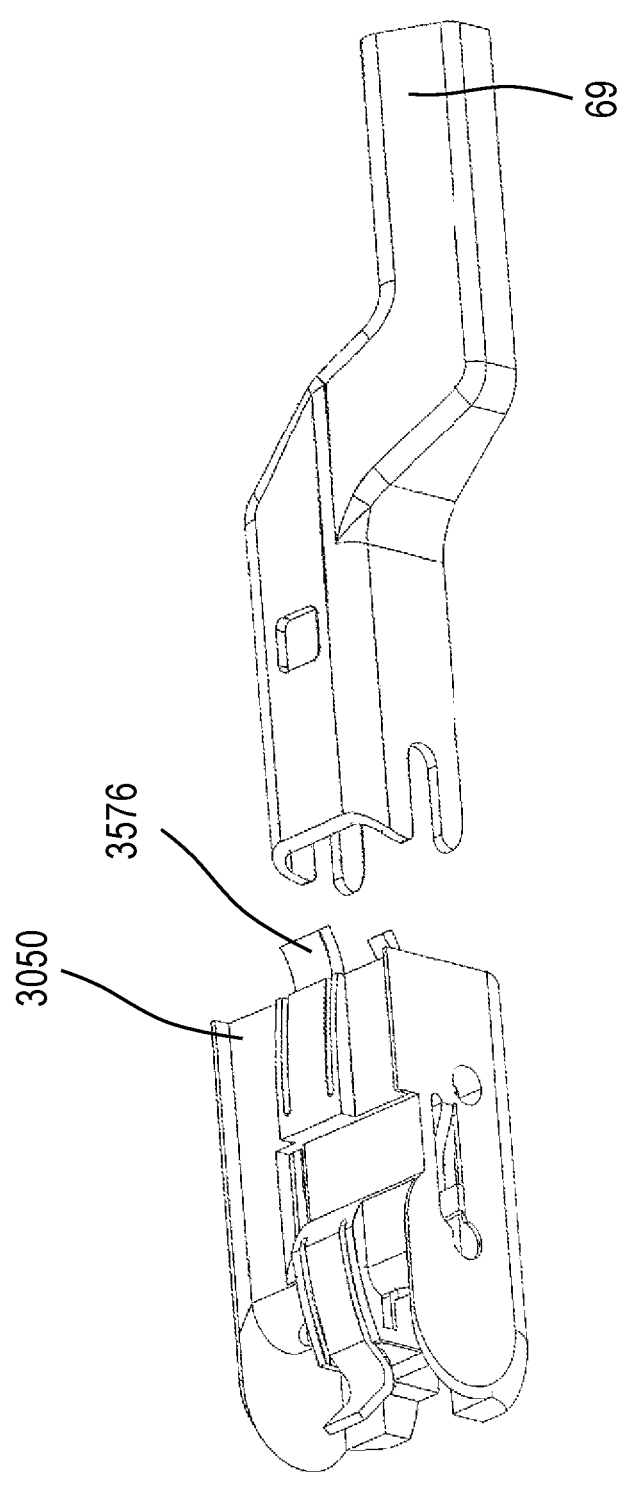
FIG. 43B is a perspective view illustrating how the fitted zone wiper arm of FIG. 43A is received by or removed from a fourth adapter.

With reference to FIG. 12, the third adapter 2050 also includes a proximal transverse opening 2094 that receives the side lock wiper arm 62. FIGS. 40A-40B are functional drawings illustrating how this exemplary side lock arm interacts with the third adapter 2050 according to certain embodiments. The cavity 2074 is appropriately dimensioned to receive the push button 19 mm wiper arm 52, the standard hook wiper arm 54, the pinch tab wiper arm 56, the push button 22 mm short wiper arm 58, the push button 22 mm wiper arm 60, the large hook wiper arm 66, and the fz wiper arm 69.

With continued attention to FIG. 12, the third adapter 2050 in the illustrated embodiment includes an upper body 2110, a lower body 2112, and an inner body 2114 positioned between the upper body 2110 and the lower body 2112. The third adapter 2050 is shown as being manufactured from separate parts that are finally assembled and joined to each other to provide a one-piece body. The third adapter 2050 can be made from fewer separate components or a greater number of separate components than those shown.

The upper body 2110 includes the upper proximal tab 2076, the upper distal tab 2078, the cutout 2082, the transverse distal opening 2086, and the proximal transverse opening 2094. When viewed from the proximal end 2070, the upper body 2110 has a general upside down U-shaped configuration so as to include an inner side wall section 2120, an outer side wall section 2122, and a top wall section 2124 bridging between the inner side wall section 2120 and the outer side wall section 2122.

The upper body 2110 includes a proximal end portion 2170. The top wall section 2124 can define a first proximal end slot 2164 and a second proximal end slot 2166 that each extend from the proximal end 2070 longitudinally toward the distal end 2072 to define the upper proximal tab 2076. A barb 2168 (FIG. 14) extends downwardly from the upper proximal tab 2076 to engage in an opening provided in the push button 19 mm wiper arm 52, the push button 22 mm short wiper arm 58, the push button 22 mm arm 60, or the fz wiper arm 69.

The upper body 2110 also includes a distal end portion 2172 and can define a first distal slot 2174 and a second distal slot 2176 that cooperate to define a second upper distal tab 2078. A projection 2178 (FIG. 14) extends downwardly from the upper distal tab 2078 to engage inside an opening provided in the pinch tab wiper arm 56.

The inner body 2114 includes an inner wall section 2320, and an outer wall section 2322 that are spaced from one another. An intermediate wall section 2324 extends between the inner wall section 2320 and the outer wall section 2322 and a distal wall section 2326 connects the inner wall section 2320 and the outer wall section 2322 together at the distal end 272 of the third adapter 2050. The inner wall section 2320, the outer wall section 2322, and the intermediate wall section 2324 form an H shape when viewed from the proximal end 2070 of the third adapter 2050.

The inner wall section 2320 defines a distal opening 2386a and a depression 2394 and the outer wall section 2322 defines a distal opening 2386b and a proximal opening 2388. The distal opening 2386a of the inner wall section 2320 is in registry with the distal opening 2386b of the outer wall section 2322 and the transverse distal opening 2086 of the outer side wall section 2122.

The openings 2386a, 2386b, 2086 cooperate to receive pins of the side pin wiper arm 64 or the side pin offset wiper arm 68 to connect the side pin wiper arm 64 or the side pin offset wiper arm 68 to the third adapter 2050. Further, the depression 2394 of the inner wall section 2320, the proximal opening 2388 of the outer wall section 2322, and the proximal transverse opening 2094 of the upper body 2110 are in registry to receive a pin of the side lock wiper arm 62.

The outer wall section 2322 defines a bifurcating slot 2330 so as to create a fixed portion 2332 and a finger portion 2334. As will be appreciated, the slot 2330 allows for the finger portion 2334 to be moveable with respect to the fixed portion 2332 of the outer wall section 2322 or the inner wall section 2320. Thus, the finger portion 2334 can selectively flex away from the top wall section 2124 of the upper body 2110 to allow for a momentary increase in the diameter of the proximal opening 2388 to allow passage of a portion of the pin of the side lock wiper arm 62 that may have a slightly larger diameter than the proximal opening 2388. Then, when the finger portion 2334 returns to the non-flexed position, there is a secure fit with the pin of the side lock wiper arm 62.

Further, the finger portion 2334 can selectively flex away from the inner wall section 2320 to allow for a momentary increase in a distance between the finger portion 2334 and the inner wall section 2320 to allow passage of a portion of the various wiper arms. Then, when the finger portion 2334 returns to the non-flexed position, there is a secure fit with the wiper arm and the third adapter 2050.

The lower body 2112 includes the first lower tab 2090, the second lower tab 2092, and a mounting opening 2096. When viewed from the proximal end 2070, the lower body 2112 has a general U-shaped configuration and includes an inner side wall section 2220, an outer side wall section 2222, and a bottom wall section 2224 bridging between the inner side wall section 2220 and the outer side wall section 2222. For reference, the standard hook wiper arm 54 and the large hook wiper arm 66 are disposed between the bottom wall section 2224 and the intermediate wall section 2324 when the standard hook wiper arm 54 and the large hook wiper arm 66 are received by the third adapter 2050.

Figures 15, 16, 17:
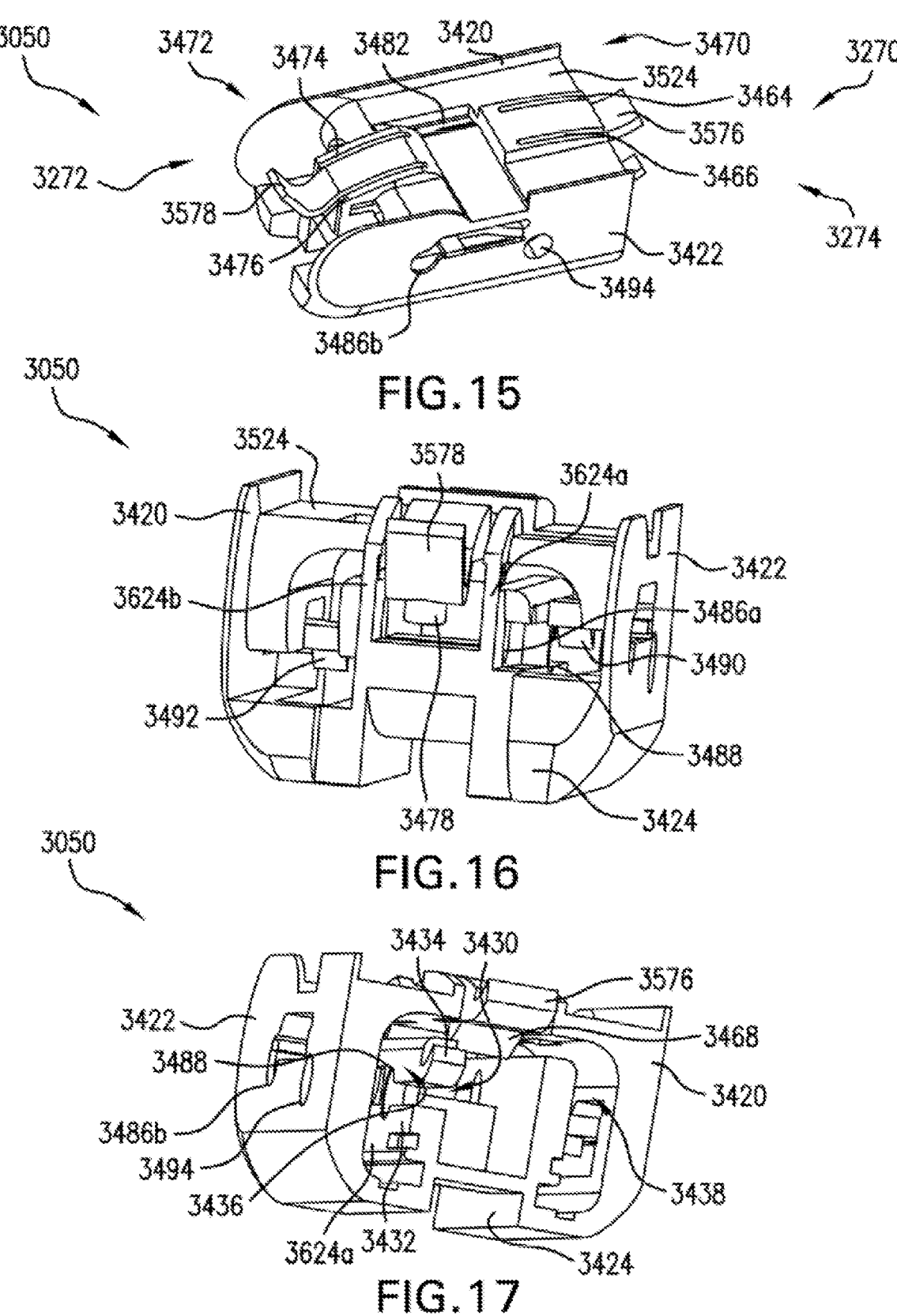
FIG. 15 is a front perspective view of an adapter.
FIG. 16 is a bottom front perspective view of the adapter of FIG. 15.
FIG. 17 is a bottom rear perspective view of the adapter of FIG. 15.

With reference to FIGS. 15-17, a fourth adapter 3050 is shown. The fourth adapter 3050 can be installed on and/or removed from various wiper arms in the same or similar manner discussed and depicted with respect to adapter 50. The fourth adapter 3050 can be a one-piece body having a proximal end 3270 and a distal end 3272. The proximal end 3270 of the fourth adapter 3050 is open to a cavity 3274. The fourth adapter 3050 includes a plurality of attachment elements, which will be later described, to allow each of the aforementioned wiper arms to connect with the fourth adapter 3050.

Figure 44A:
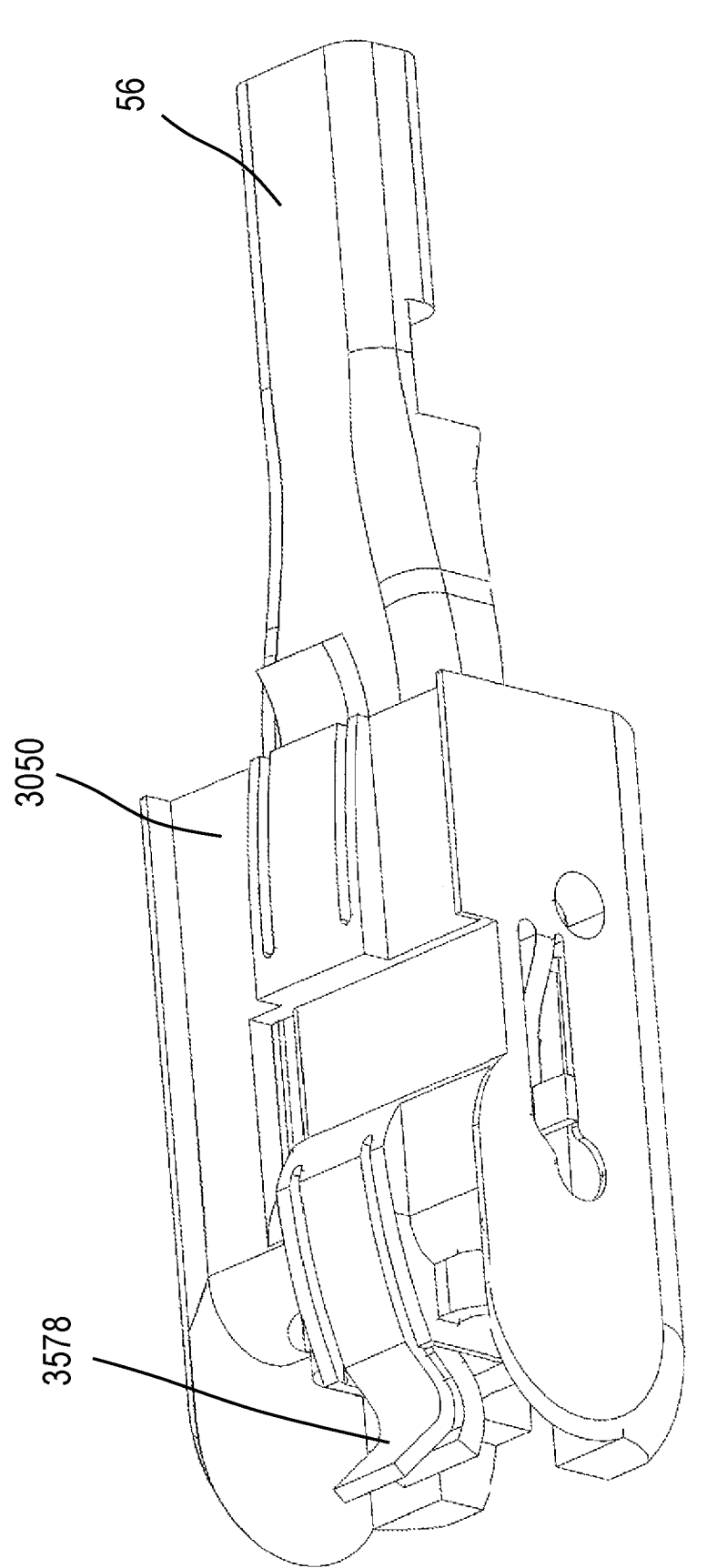
FIG. 44A is a perspective view illustrating a pinch tab wiper arm connected to a fourth adapter.
Figure 44B:
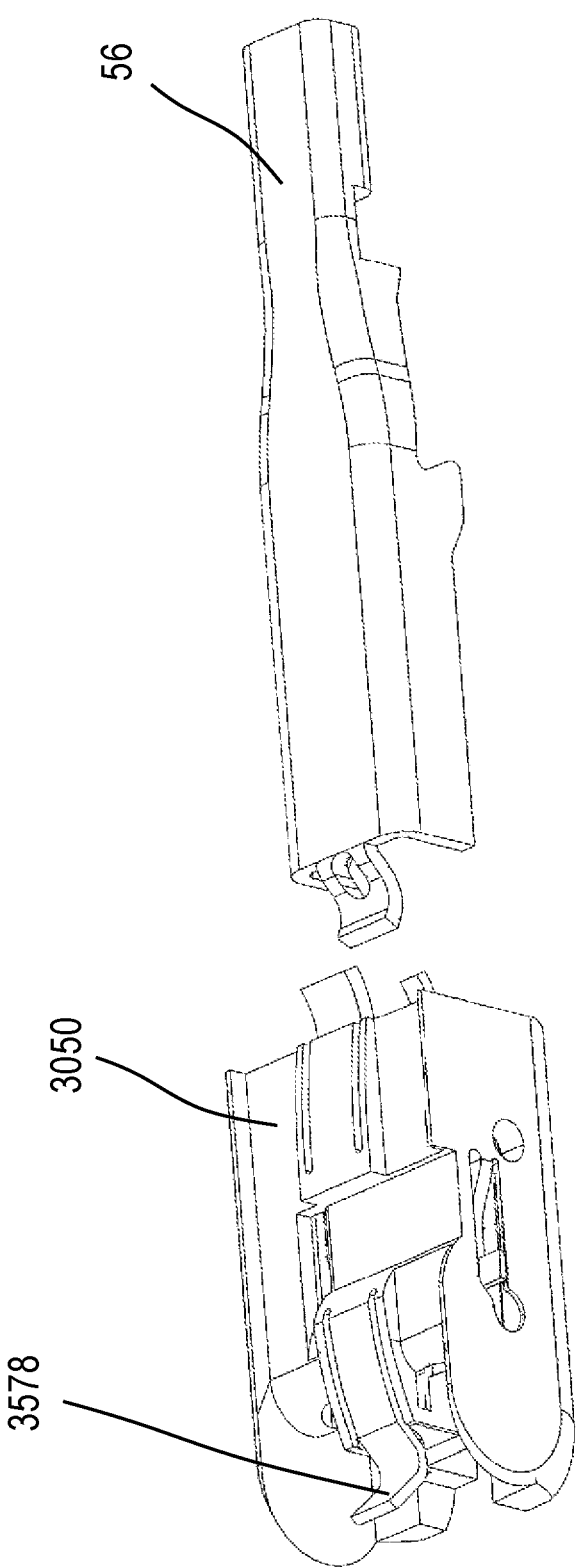
FIG. 44B is a perspective view illustrating how the pinch tab wiper arm of FIG. 44A is received by or removed from a fourth adapter.

The fourth adapter 3050 includes an upper proximal tab 3576 that cooperates with the push button 19 mm wiper arm 52, the push button 22 mm wiper arm 60, and the fz wiper arm 69 to connect each of these wiper arms 52, 60, 69 to the fourth adapter 3050. The upper proximal tab 3576 can also be depressed, pushed away from the wiper arm, and/or manipulated to disengage the connection with these wiper arms. FIGS. 41A-41B, 42A-42B, and 43A-43B are functional drawings illustrating how these exemplary push button style wiper arms interact with the fourth adapter 3050 according to certain embodiments. The fourth adapter 3050 also includes an upper distal tab 3578 that cooperates with the pinch tab wiper arm 56 for connecting the pinch tab wiper arm 56 with the fourth adapter 3050. The upper distal tab 3578 can also be depressed, pushed away from the wiper arm, and/or manipulated to disengage the connection with the pinch tab wiper arm 56. FIGS. 44A-44B are functional drawings illustrating how this exemplary pinch tab style wiper arm interacts with the fourth adapter 3050 according to certain embodiments.

Figure 45A:
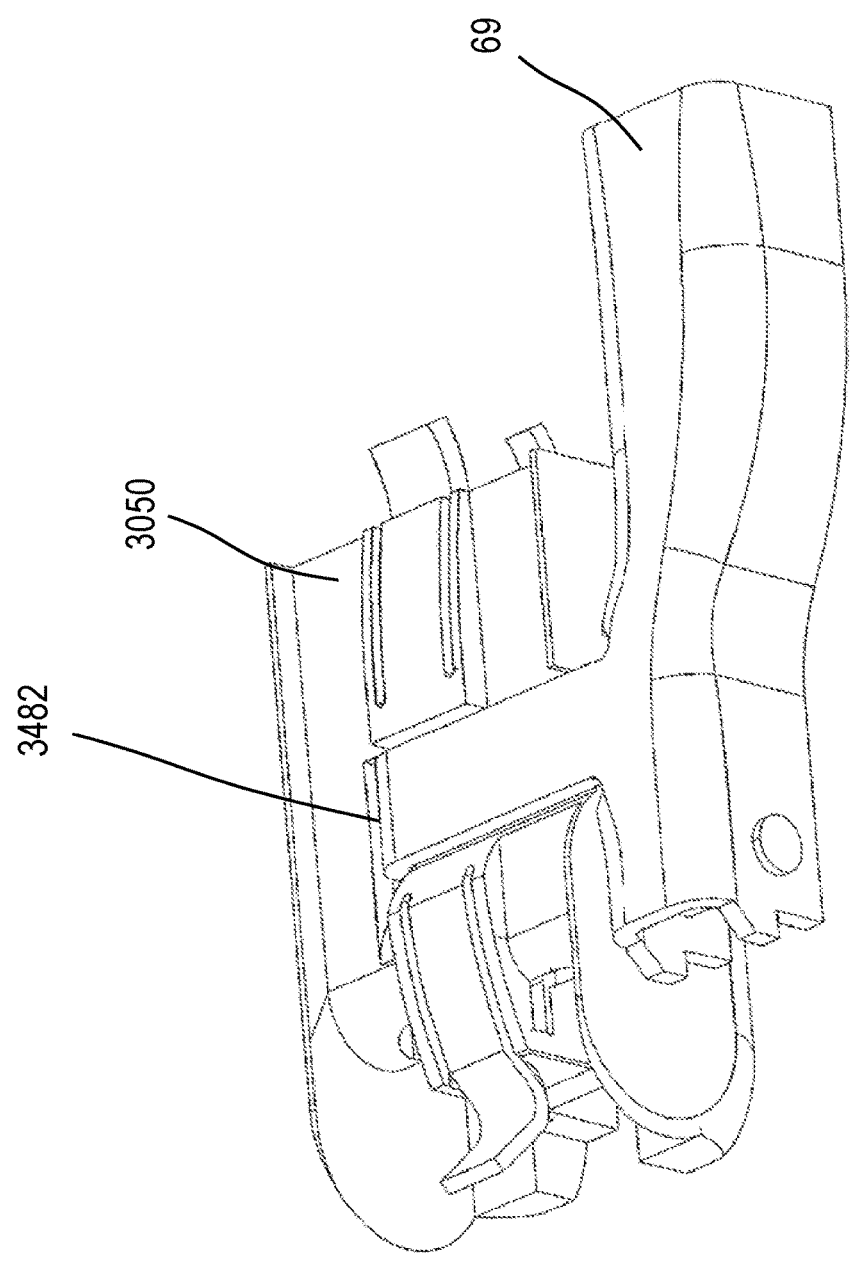
FIG. 45A is a perspective view illustrating a side pin wiper arm connected to a fourth adapter.
Figure 45B:
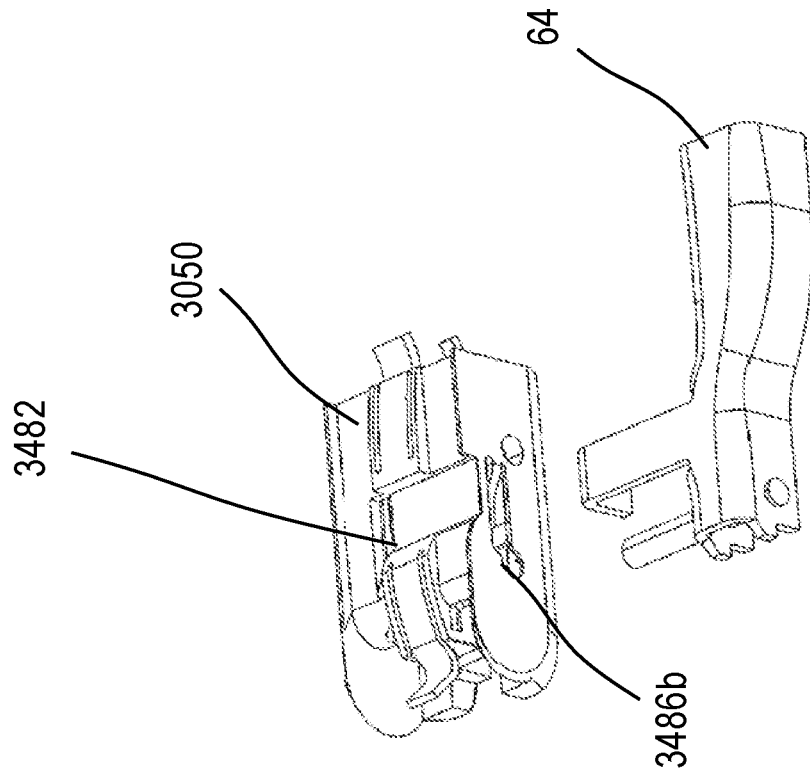
FIG. 45B is a perspective view illustrating how the side pin wiper arm of FIG. 45A is received by or removed from a fourth adapter.
Figure 46A:
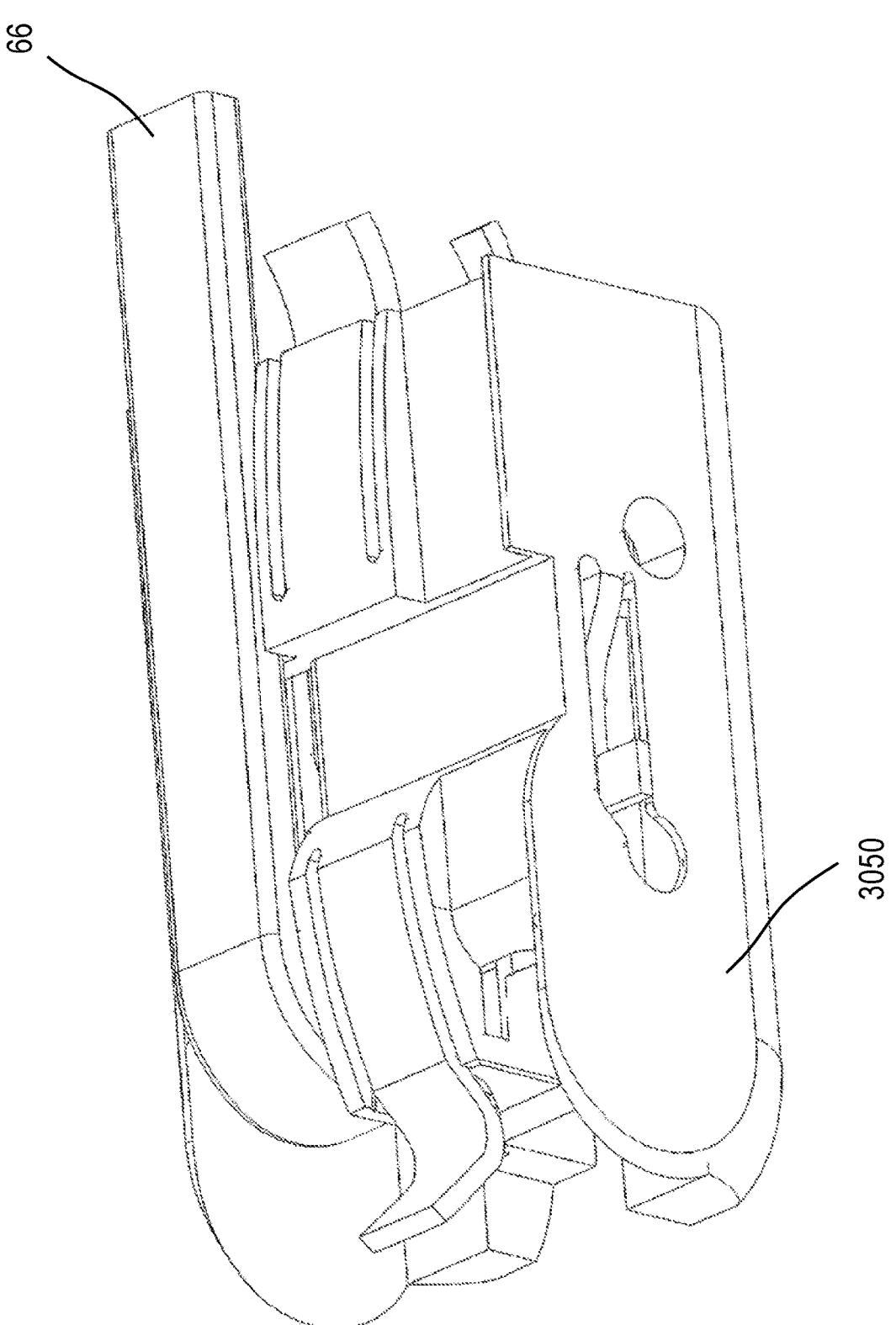
FIG. 46A is a perspective view illustrating a large hook wiper arm connected to a fourth adapter.
Figure 46B:
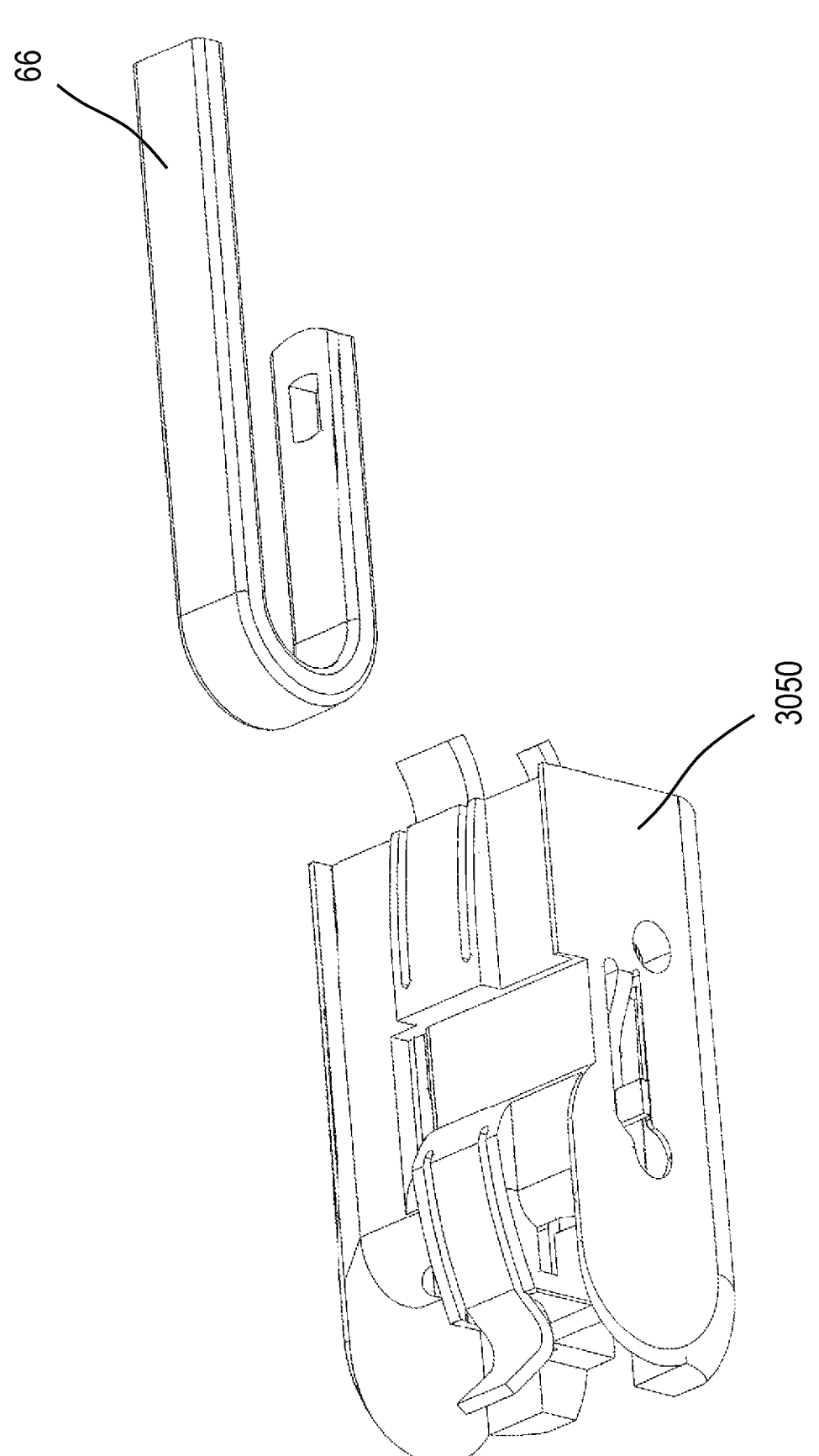
FIG. 46B is a perspective view illustrating how the large hook wiper arm of FIG. 46A is received by or removed from a fourth adapter.
Figure 47A:
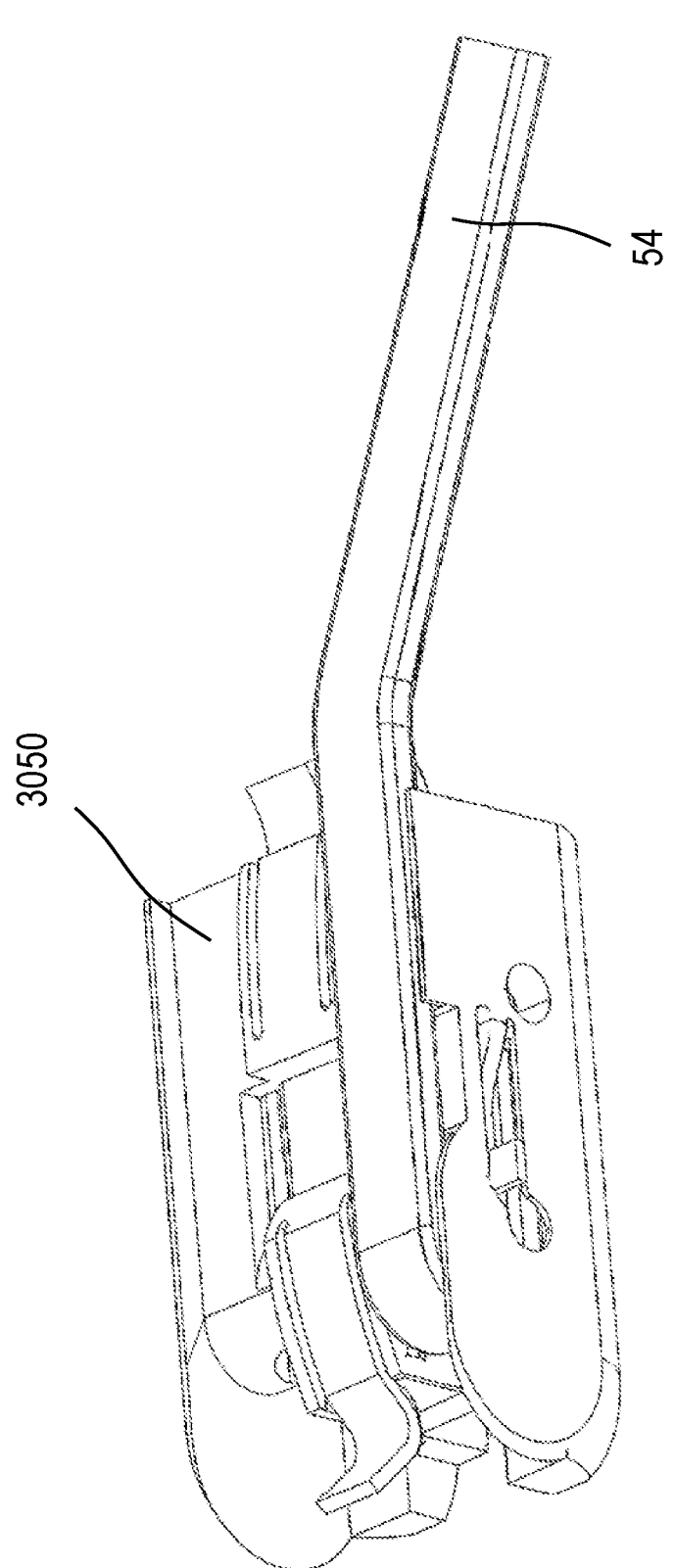
FIG. 47A is a perspective view illustrating a standard hook wiper arm connected to a fourth adapter.
Figure 47B:
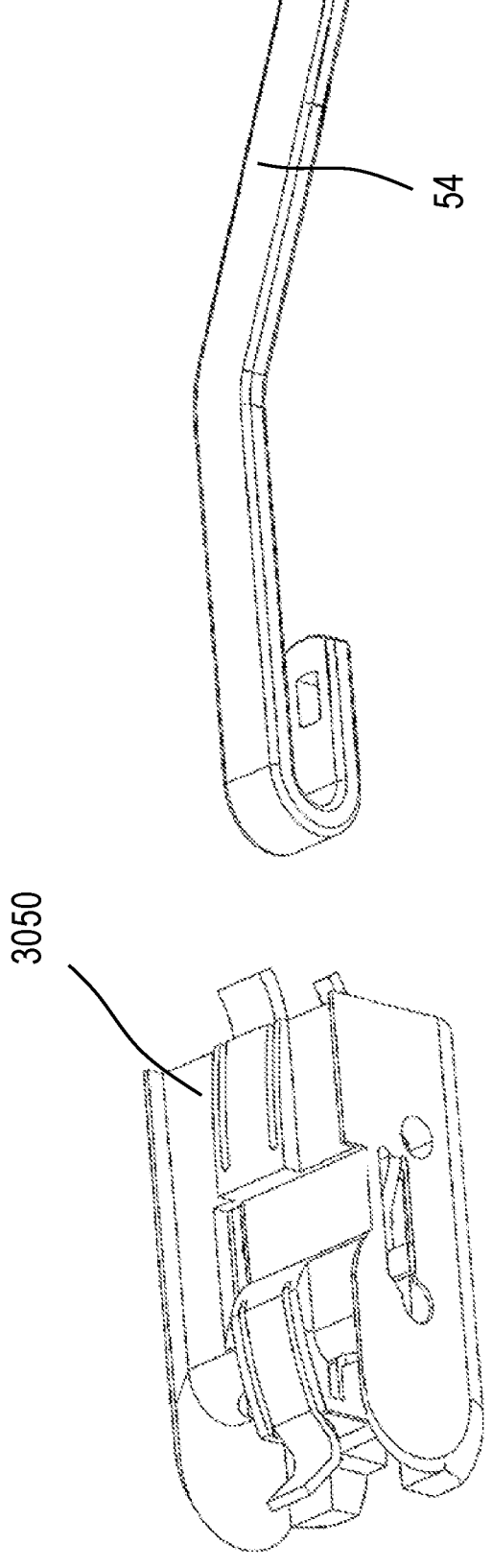
FIG. 47B is a perspective view illustrating how the standard hook wiper arm of FIG. 47A is received by or removed from a fourth adapter.
Figure 48A:
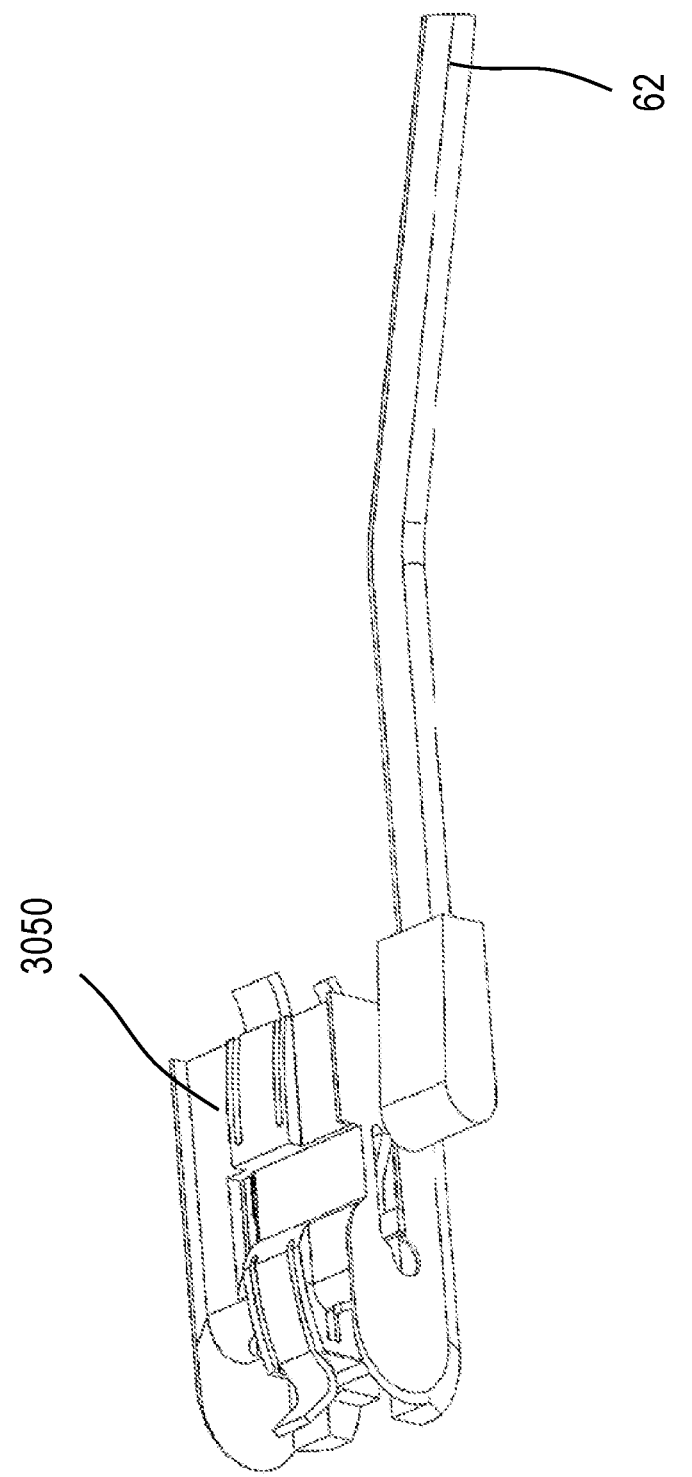
FIG. 48A is a perspective view illustrating a side lock wiper arm connected to a fourth adapter.
Figure 48B:
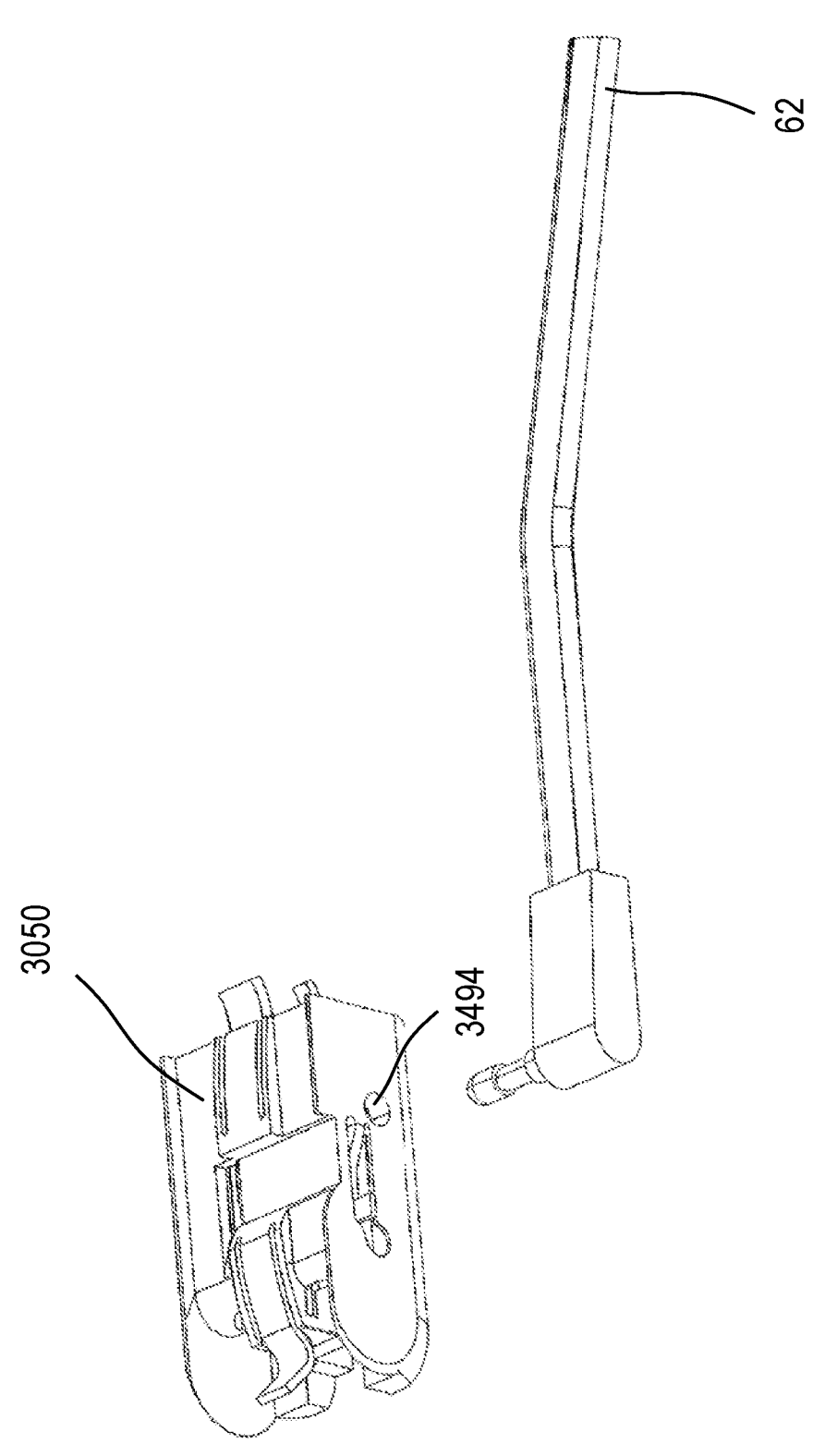
FIG. 48B is a perspective view illustrating how the side lock wiper arm of FIG. 48A is received by or removed from a fourth adapter.
Figure 49A:
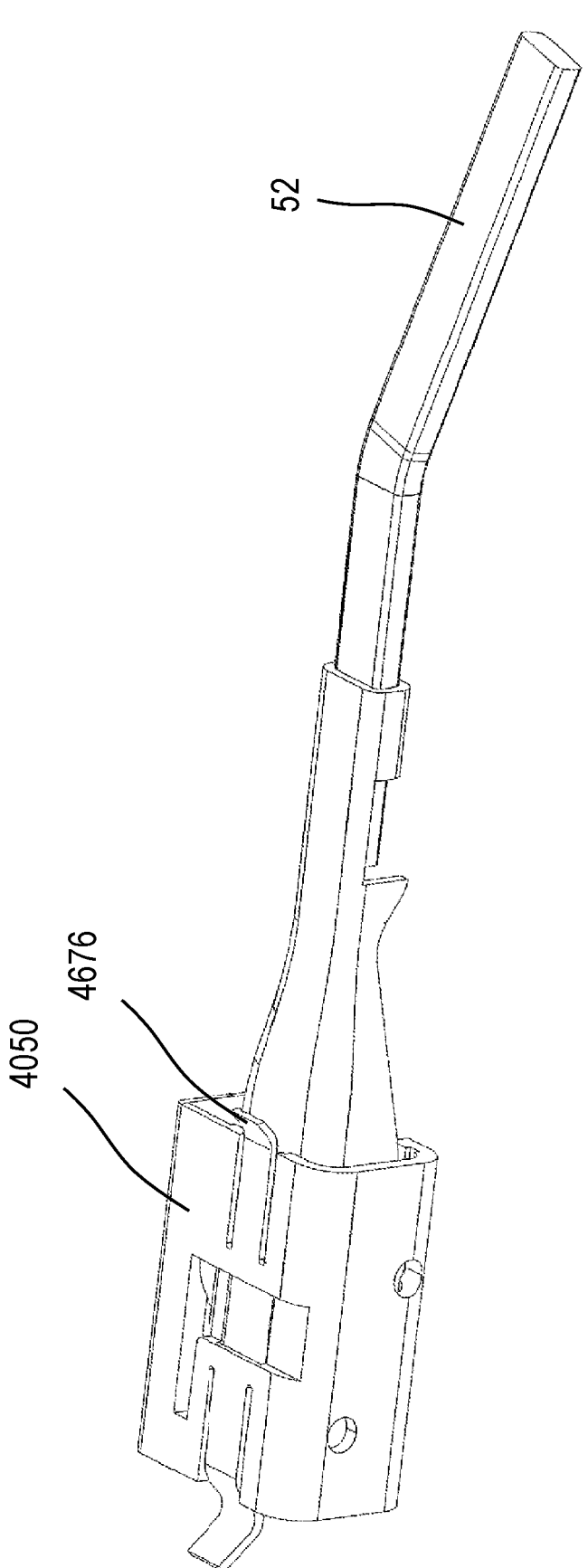
FIG. 49A is a perspective view illustrating a push button 19 mm wiper arm connected to a fifth adapter.
Figure 49B:
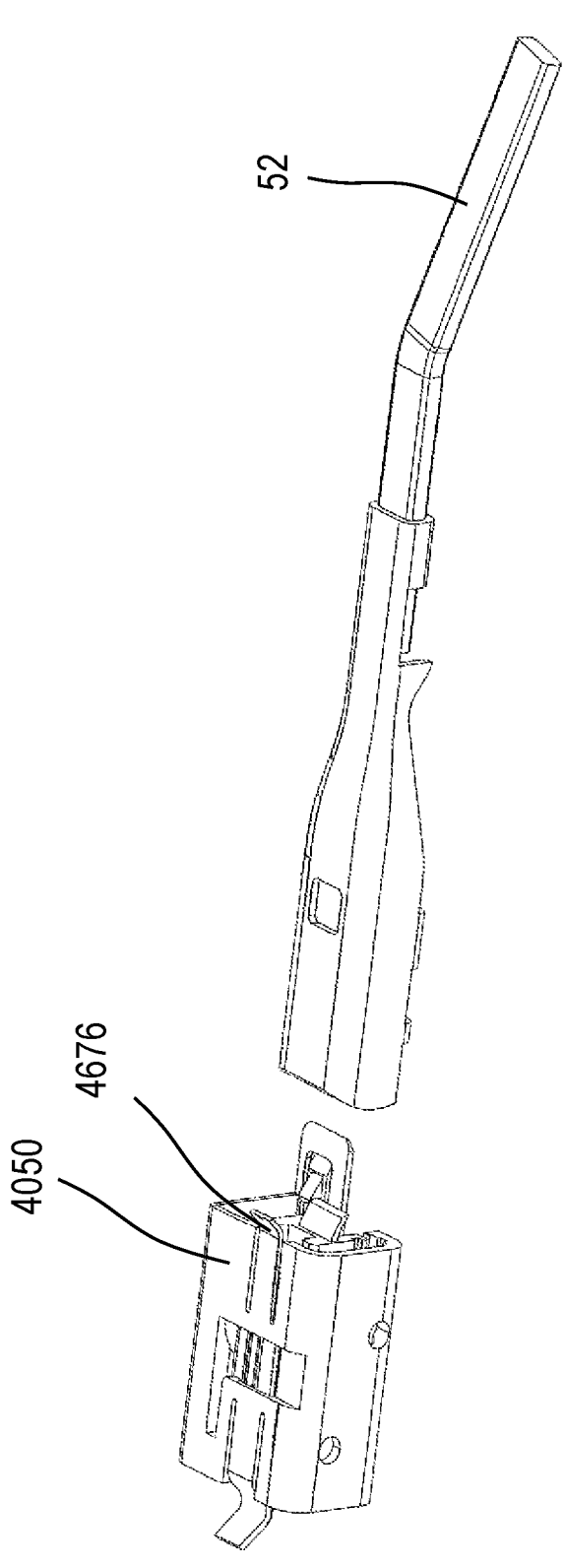
FIG. 49B is a perspective view illustrating how the push button 19 mm wiper arm of FIG. 49A is received by or removed from a fifth adapter.
Figure 50A:
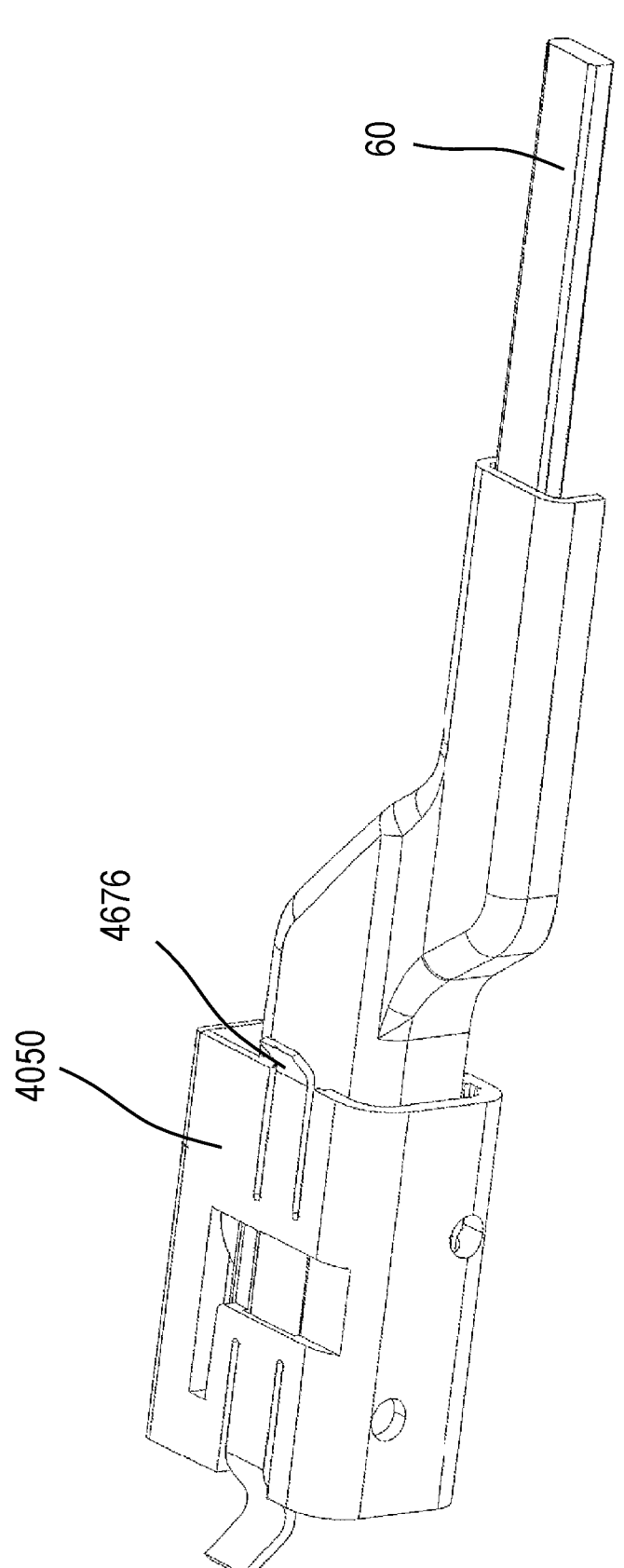
FIG. 50A is a perspective view illustrating a push button 22 mm wiper arm connected to a fifth adapter.
Figure 50B:
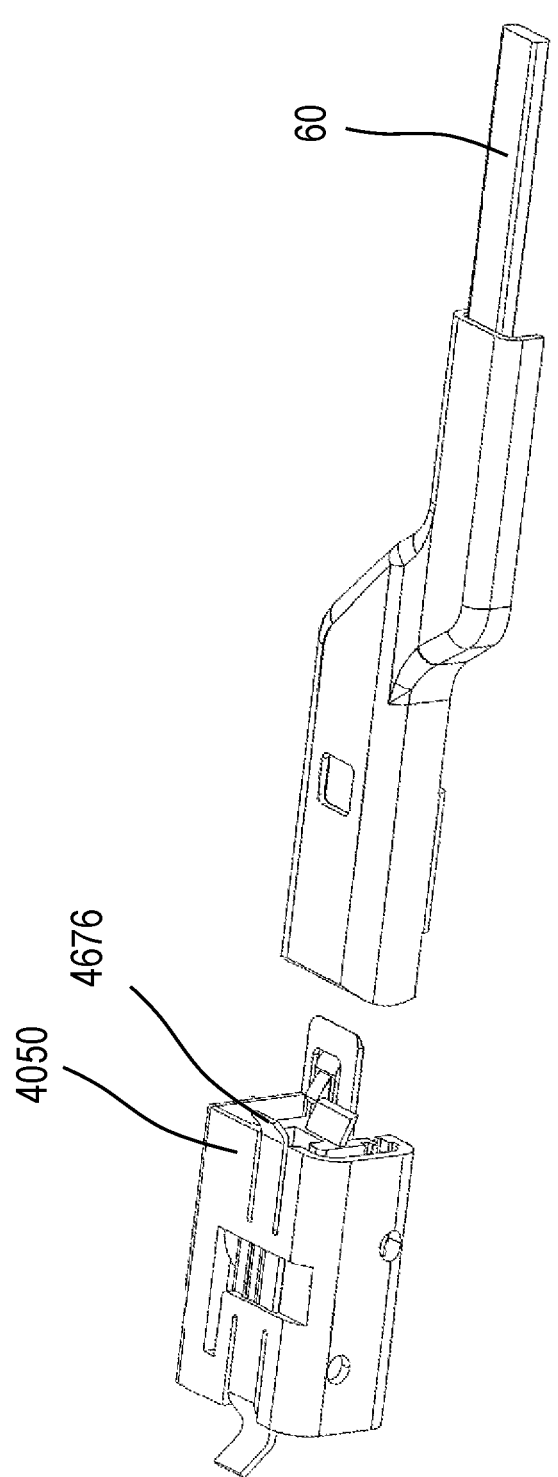
FIG. 50B is a perspective view illustrating how the push button 22 mm wiper arm of FIG. 50A is received by or removed from a fifth adapter.
Figure 51A:
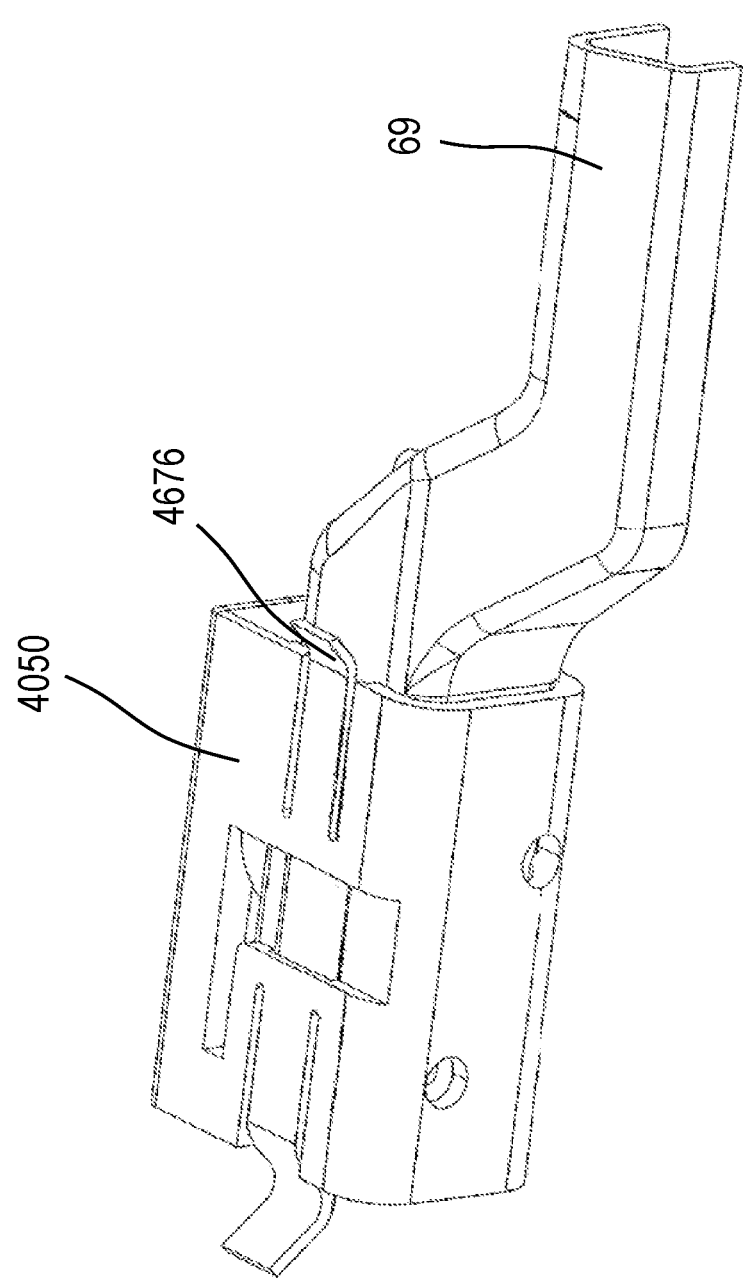
FIG. 51A is a perspective view illustrating a fitted zone wiper arm connected to a fifth adapter.
Figure 51B:
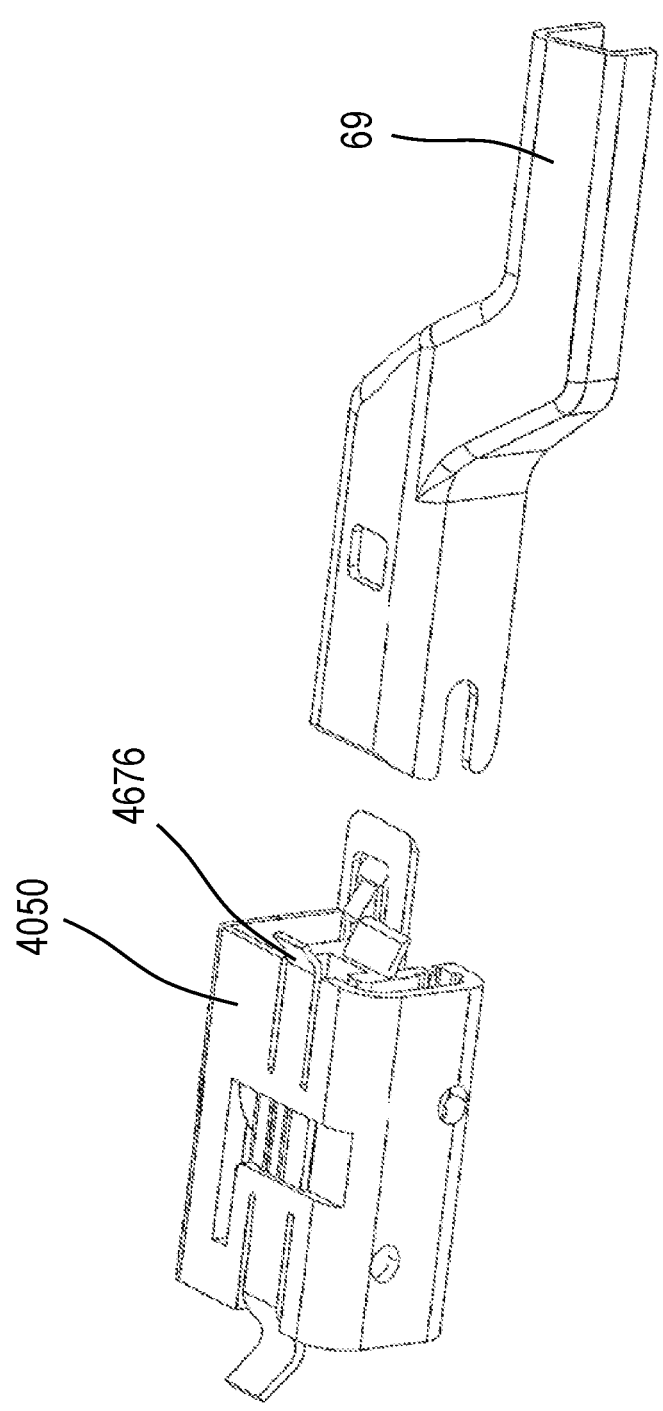
FIG. 51B is a perspective view illustrating how the fitted zone wiper arm of FIG. 51A is received by or removed from a fifth adapter.

The fourth adapter 3050 also includes a cutout 3482 and a transverse distal opening 3486 that cooperate with the side pin wiper arm 64 for connecting the side pin wiper arm 64 to the fourth adapter 3050. The side pin wiper arm 64 can be detached from the fourth adapter 3050 by slidably removing the arm's pin from openings 3486 of the fourth adapter 3050 from the side pin wiper arm 64. FIGS. 45A-45B are functional drawings illustrating how this exemplary pin style wiper arm interacts with the fourth adapter 3050 according to certain embodiments. Further, the fourth adapter 3050 also includes a proximal transverse opening 3494 that receives the side lock wiper arm 62. FIGS. 48A-48B are functional drawings illustrating how this side lock wiper arm interacts with the fourth adapter 3050 according to certain embodiments.

With reference to FIG. 16, the fourth adapter 3050 also includes a first lower tab 3490 that cooperates with the large hook wiper arm 66 to connect the large hook wiper arm 66 with the fourth adapter 3050 and a second lower tab 3492 that cooperates with the standard hook wiper arm 54 to connect the standard hook wiper arm 54 with the fourth adapter 3050. The first lower tab 3490 and second lower tab 3492 can also be depressed, pushed away from the wiper arm, and/or manipulated to disengage the connections with the large hook wiper arm 66 and standard hook wiper arm 54, respectively. FIGS. 46A-46B and 47A-47B are functional drawings illustrating how these exemplary hook style wiper arms interact with the fourth adapter 3050 according to certain embodiments.

The fourth adapter 3050 includes an inner wall section 3420 and an outer wall section 3422 that are spaced from one another. A stepped bottom wall section 3424 connects the inner wall section 3420 and the outer wall section 3422 on a side of the fourth adapter 3050 and a top wall section 3524 connects the inner wall section 3420 and the outer wall section 3422 on an opposite side. A first intermediate wall section 3624a and a second intermediate wall section 3624b are disposed between the inner wall section 3420 and the outer wall section 3422.

The first intermediate wall section 3624a and the second intermediate wall section 3624b are spaced from one another and can be generally parallel to the inner wall section 3420 and the outer wall section 3422. A cavity 3274 is appropriately dimensioned to receive the push button 19 mm wiper arm 52, the standard hook wiper arm 54, the pinch tab wiper arm 56, the push button 22 mm wiper arm 60, the large hook wiper arm 66, and the fz wiper arm 69.

With continued reference to FIGS. 15-17, and more particularly FIG. 17, the top wall section 3524 is spaced from the bottom wall section 3424. Further, the first intermediate wall section 3624a is spaced from the outer wall section 3422 and the second intermediate wall section 3624b is spaced from the inner wall section 3420 so as to define a first hook opening 3436 and a second hook opening 3438 for receipt of at least part of the standard hook wiper arm 54 and the large hook wiper arm 66, respectively.

As shown in FIG. 15, the outer wall section 3422 defines a distal opening 3486b and a proximal transverse opening 3494. The first intermediate wall section 3624a defines a distal opening 3486a and a proximal transverse opening 3488. The distal opening 3486a of the first intermediate wall section 3624a is in registry with the distal opening 3486b of the outer wall section 3422. The openings 3486a, 3486b cooperate to receive pins of the side pin wiper arm 64 to connect the side pin wiper arm 64 to the fourth adapter 3050. Further, the proximal transverse opening 3488 of the first intermediate wall section 3624a and the proximal transverse opening 3494 of the outer wall section 3422 are in registry to receive a pin of the side lock wiper arm 62.

The top wall section 3524 can define a first proximal end slot 3464 (FIG. 17) and a second proximal end slot 3466 that each extend from a proximal end 3470 longitudinally toward a distal end 3472 to define the upper proximal tab 3576. A barb 3468 (FIG. 17) extends downwardly from the upper proximal tab 3576 to engage in an opening provided in the push button 19 mm wiper arm 52, the push button 22 mm arm 60, or the fz wiper arm 69.

The top wall section 3524 can define a first distal slot 3474 and a second distal slot 3476 that cooperate to define an upper distal tab 3578. A projection 3478 (FIG. 17) extends downwardly from the upper distal tab 3578 to engage inside an opening provided in the pinch tab wiper arm 56.

As shown in FIG. 17, the first intermediate wall section 3624a defines a bifurcating slot 3430 so as to create a fixed portion 3432 and a finger portion 3434. As will be appreciated, the slot 3430 allows for the finger portion 3434 to be moveable with respect to the fixed portion 3432 of the outer wall section 3422 or the inner wall section 3420.

Thus, the finger portion 3434 can selectively flex away from the bottom wall section 3424 to allow for a momentary increase in the diameter of the proximal transverse opening 3488 to allow passage of a portion of the pin of the side lock wiper arm 62 that may have a slightly larger diameter than the proximal transverse opening 3488. Then, when the finger portion 3434 returns to the non-flexed position, there is a secure fit with the pin of the side lock wiper arm 62.

Further, the finger portion 3434 can selectively flex toward and away from the inner wall section 3420 to accommodate passage of a portion of the various wiper arms. Then, when the finger portion 3434 returns to the non-flexed position, there is a secure fit with the wiper arm and the fourth adapter 3050.

Figures 18, 19, 20:
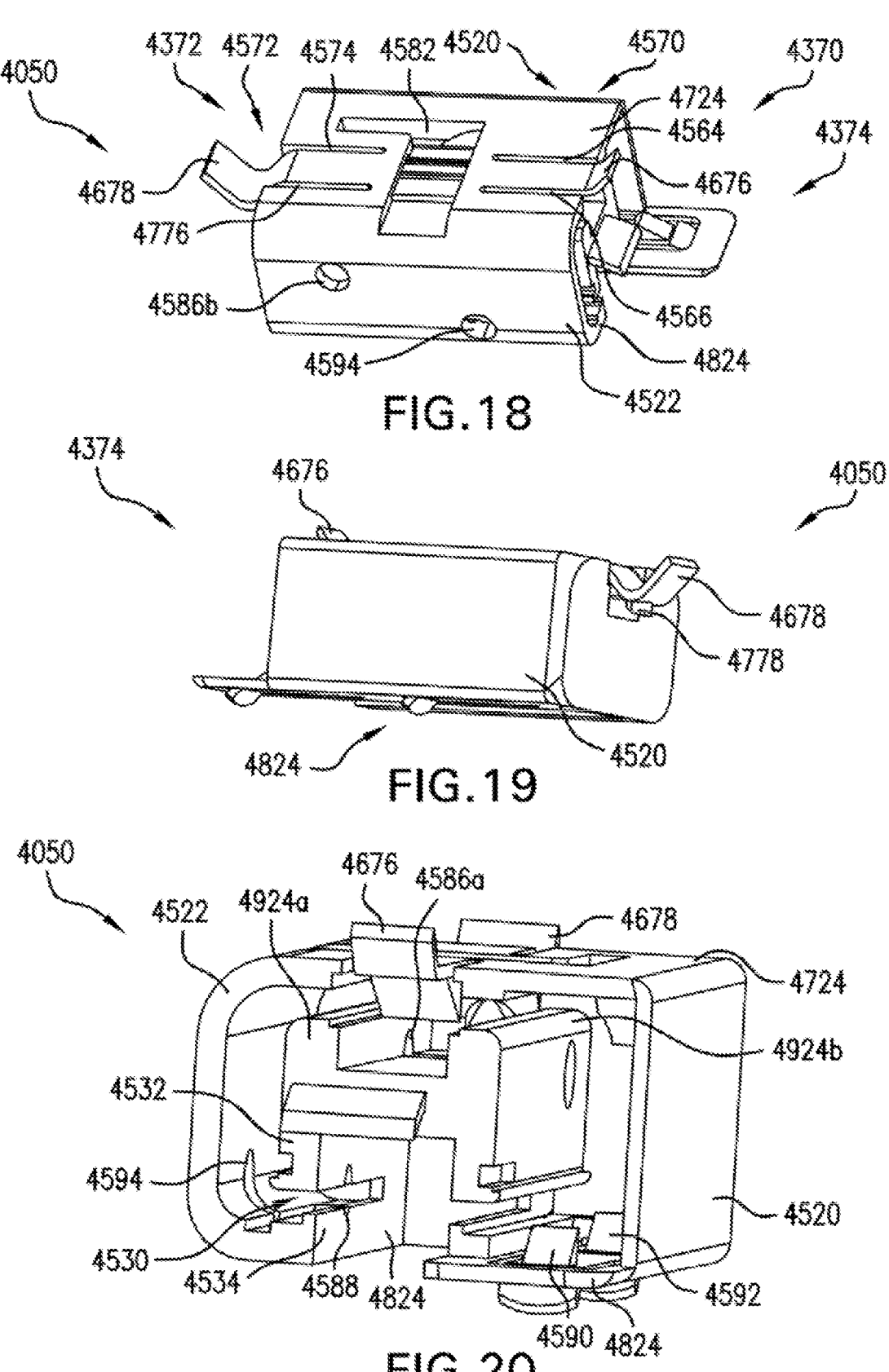
FIG. 18 is a front perspective view of an adapter.
FIG. 19 is a bottom front perspective view of the adapter of FIG. 18.
FIG. 20 is a bottom rear perspective view of the adapter of FIG. 18.
Figure 21A:
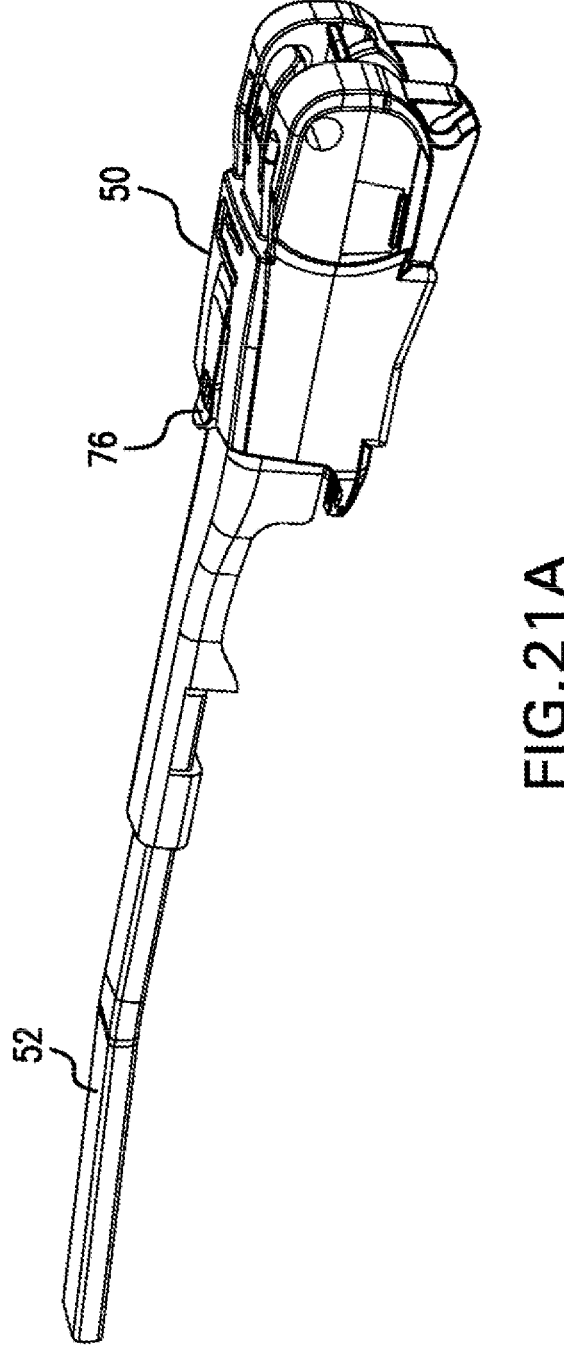
FIG. 21A is a perspective view illustrating a push button 19 mm wiper arm connected to an adapter.
Figure 21B:
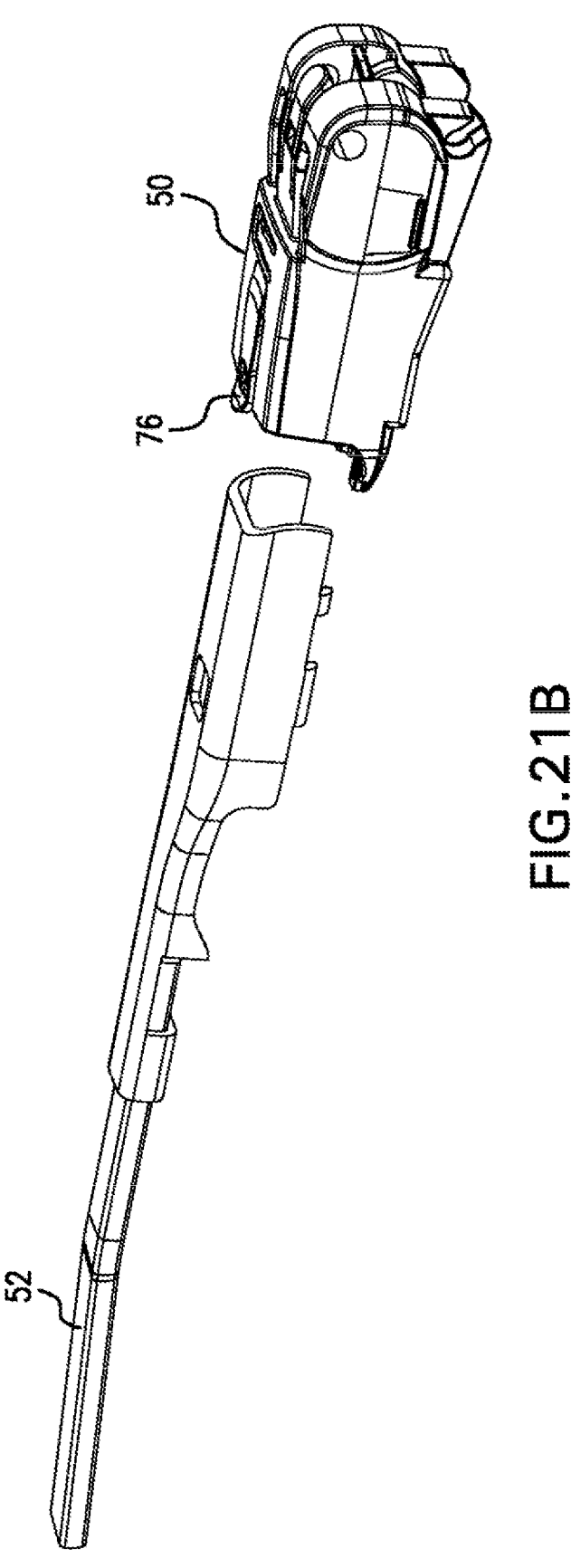
FIG. 21B is a perspective view illustrating how the push button 19 mm wiper arm of FIG. 21A is received by or removed from an adapter.
Figure 22A:
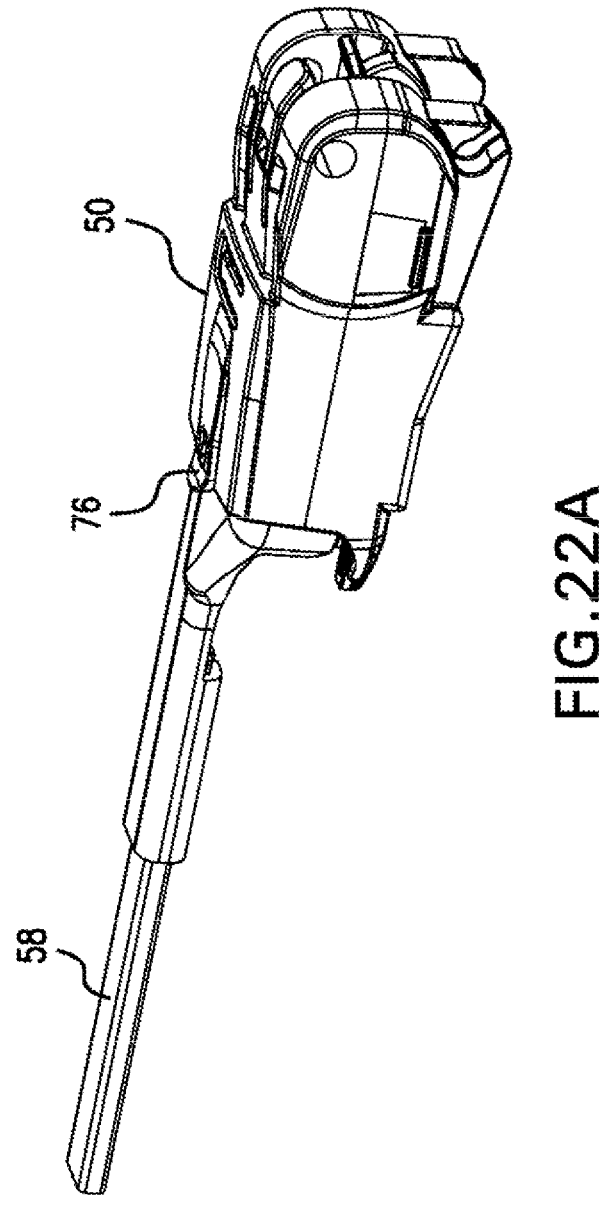
FIG. 22A is a perspective view illustrating a push button 22 mm short wiper arm connected to an adapter.
Figure 22B:
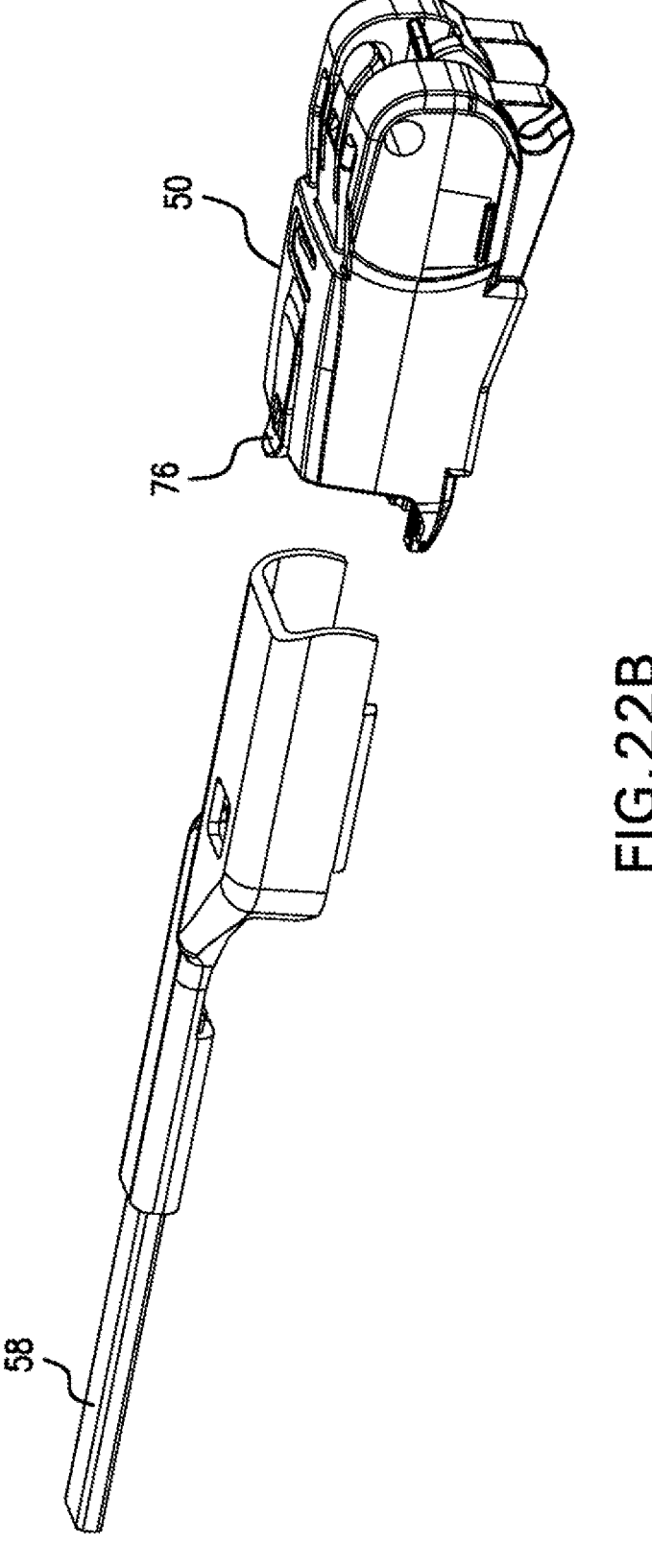
FIG. 22B is a perspective view illustrating how the push button 22 mm short wiper arm of FIG. 22A is received by or removed from an adapter.
Figure 23A:
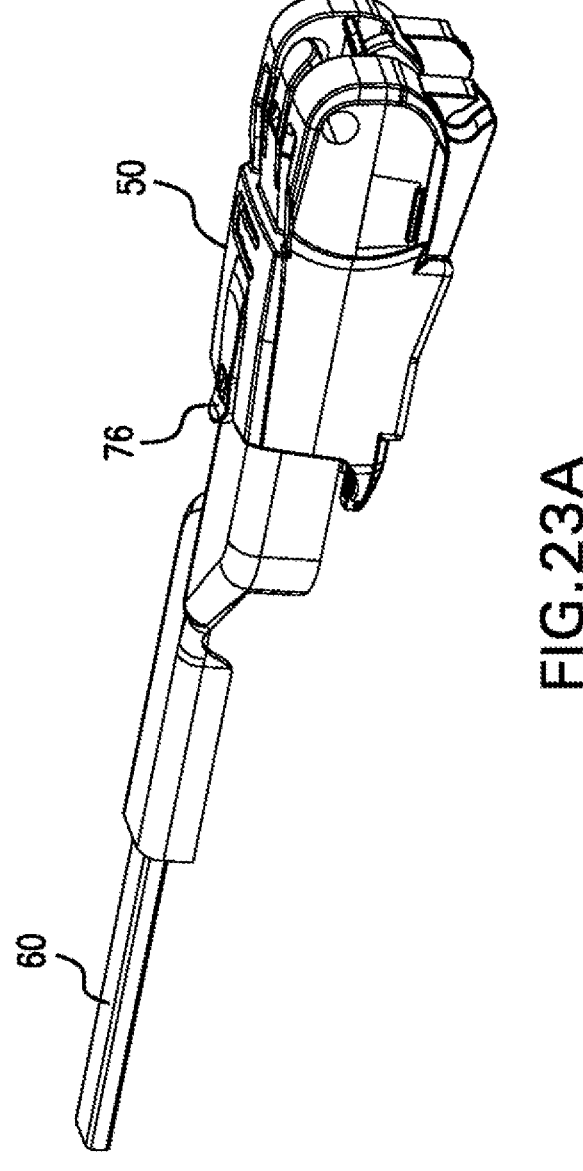
FIG. 23A is a perspective view illustrating a push button 22 mm wiper arm connected to an adapter.
Figure 23B:
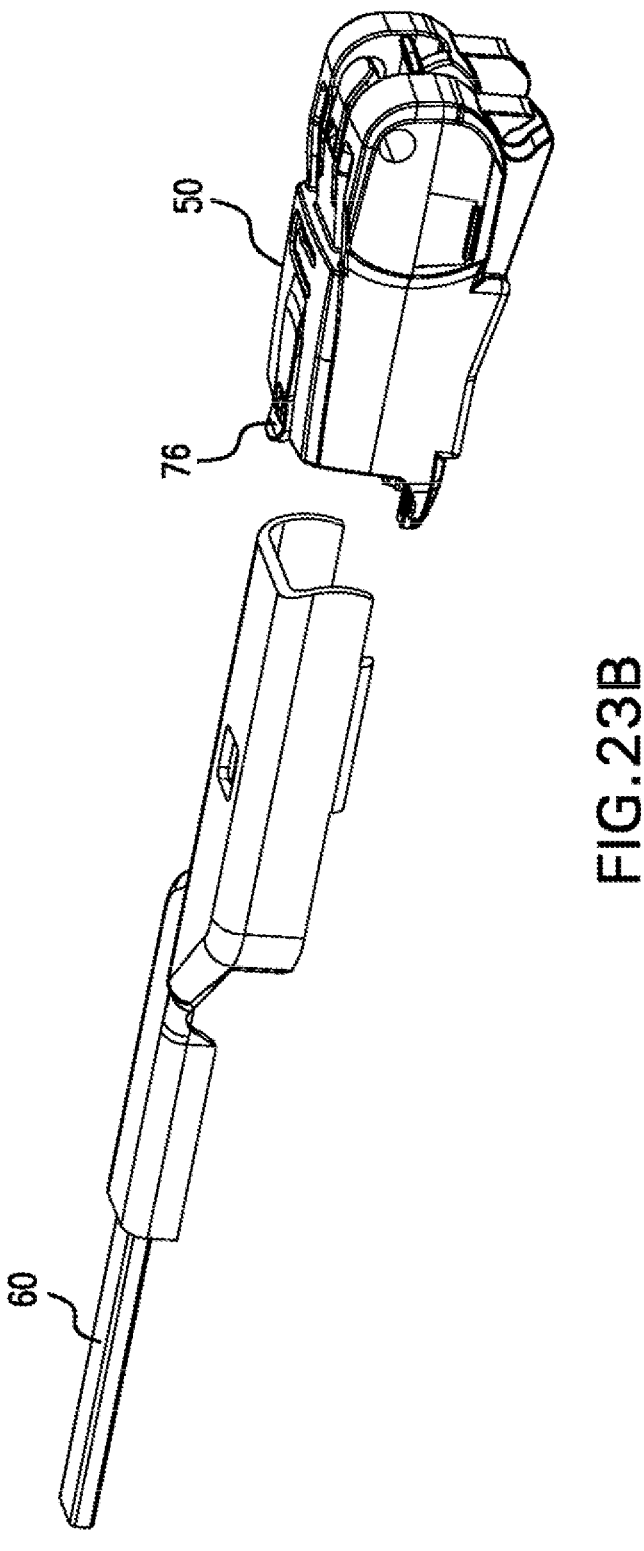
FIG. 23B is a perspective view illustrating how the push button 22 mm wiper arm of FIG. 23A is received by or removed from an adapter.
Figure 24A:
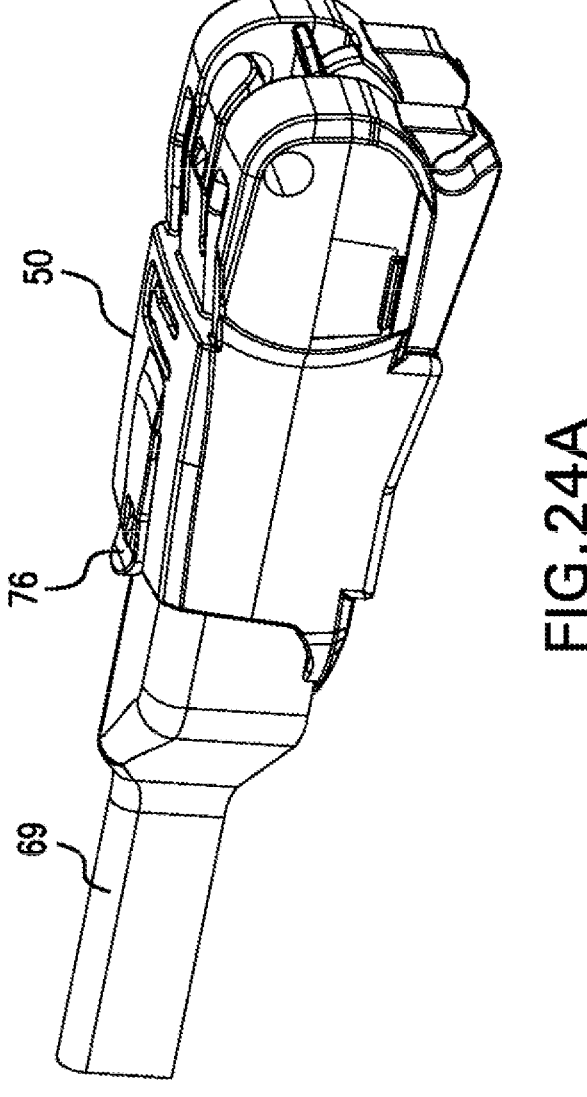
FIG. 24A is a perspective view illustrating a fitted zone wiper arm connected to an adapter.
Figure 24B:
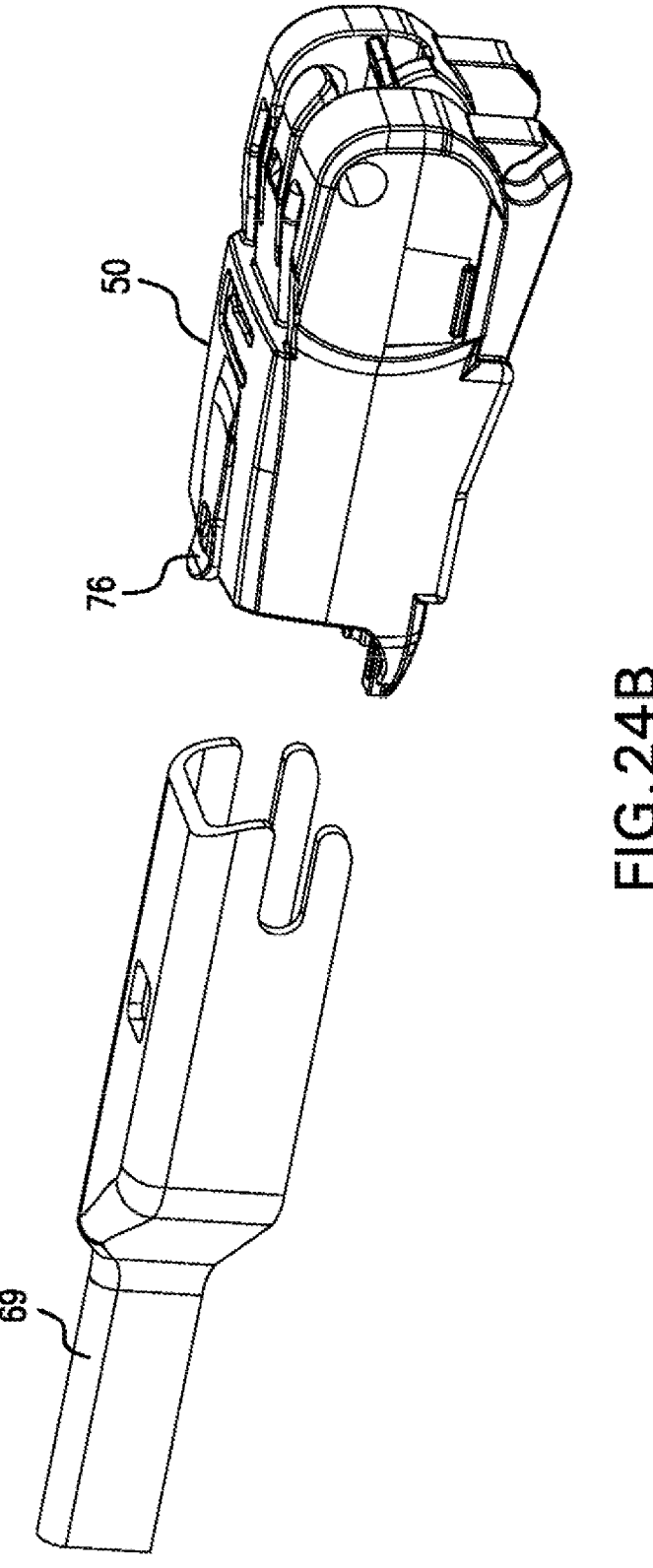
FIG. 24B is a perspective view illustrating how the fitted zone wiper arm of FIG. 24A is received by or removed from an adapter.

With reference to FIGS. 18-20, a fifth adapter 4050 is shown. The fifth adapter 4050 can be installed on and/or removed from various wiper arms in the same or similar manner discussed and depicted with respect to adapter 50. The fifth adapter 4050 can be a one-piece body having a proximal end 4370 and a distal end 4372. The proximal end 4370 of the fifth adapter 4050 is open to a cavity 4374. The fifth adapter 4050 includes a plurality of attachment elements, which will be later described, to allow each of the aforementioned wiper arms to connect with the fifth adapter 4050.

The fifth adapter 4050 includes an upper proximal tab 4676 that cooperates with the push button 19 mm wiper arm 52, the push button 22 mm wiper arm 60, and the fz wiper arm 69 to connect each of these wiper arms 52, 60, 69 to the fifth adapter 4050. The upper proximal tab 4676 can also be depressed, pushed away from the wiper arm, and/or manipulated to disengage the connections with these wiper arms.

Figure 52A:
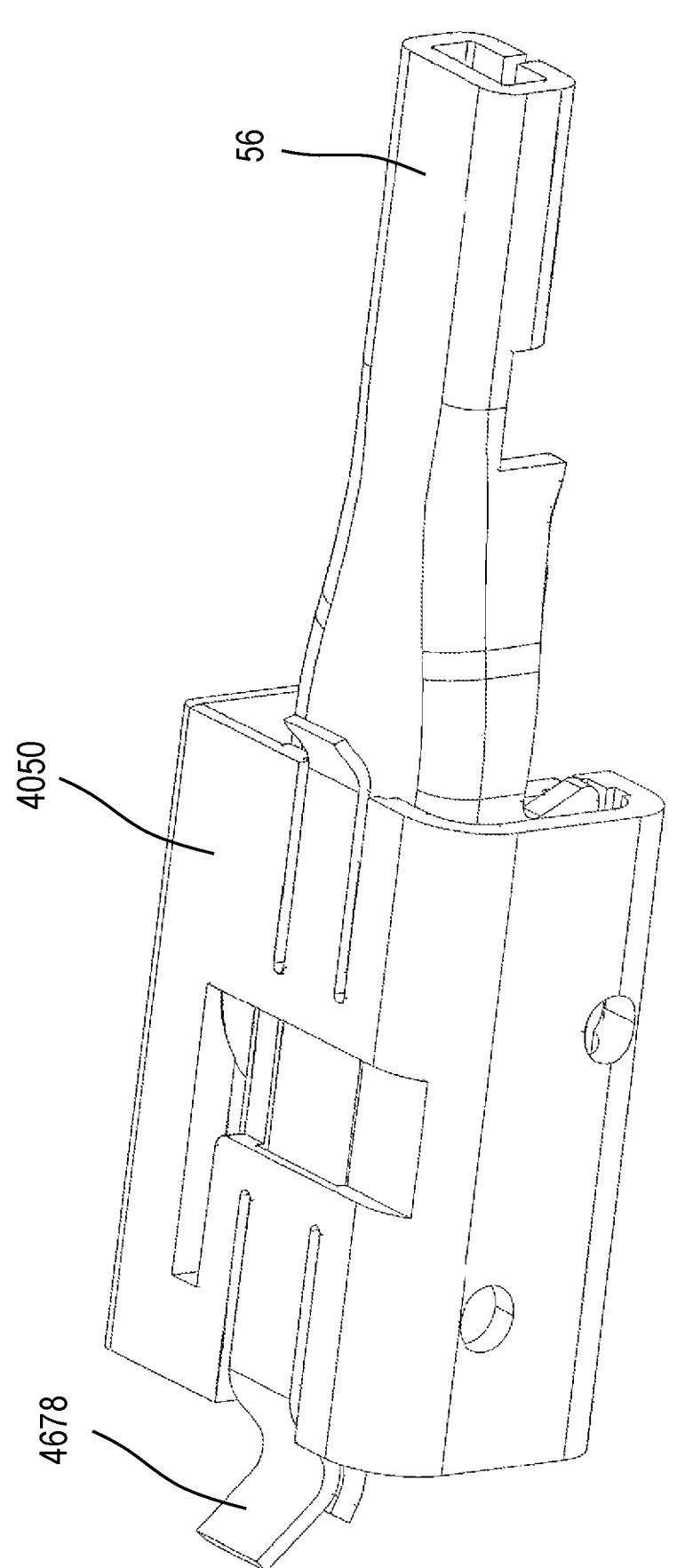
FIG. 52A is a perspective view illustrating a pinch tab wiper arm connected to a fifth adapter.
Figure 52B:
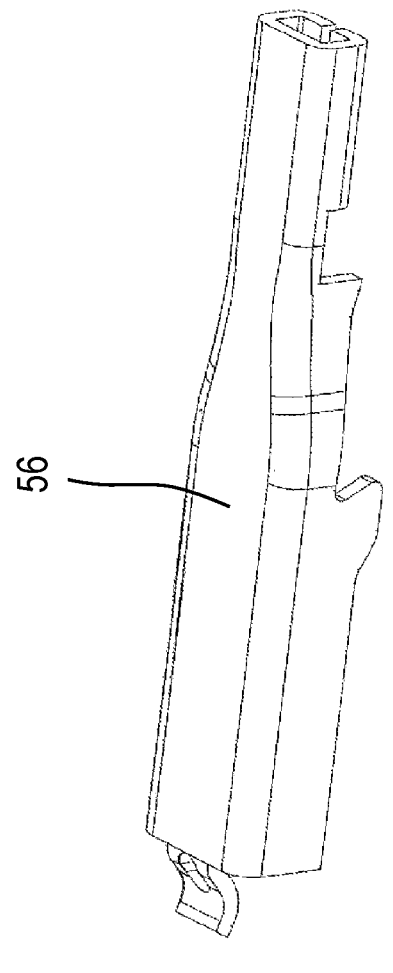
FIG. 52B is a perspective view illustrating how the pinch tab wiper arm of FIG. 52A is received by or removed from a fifth adapter.
Figure 52B:
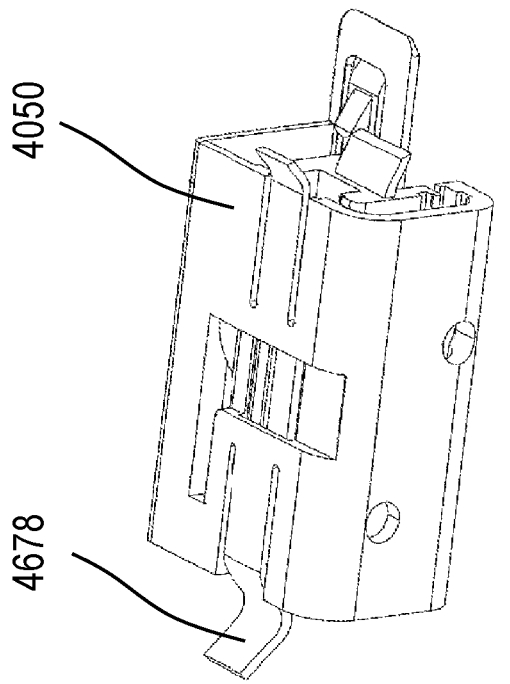

FIGS. 49A-49B, 50A-50B, and 51A-51B are functional drawings illustrating how these exemplary push button style wiper arms interact with the fifth adapter 4050 according to certain embodiments. The fifth adapter 4050 also includes an upper distal tab 4678 that cooperates with the pinch tab wiper arm 56 for connecting the pinch tab wiper arm 56 with the fifth adapter 4050 and a proximal transverse opening 4594 that receives the side lock wiper arm 62. The upper distal tab 4678 can also be depressed, pushed away from the wiper arm, and/or manipulated to disengage the connection with the pinch tab wiper arm 56. FIGS. 52A-52B are functional drawings illustrating how this exemplary pinch tab style wiper arm interacts with the fifth adapter 4050 according to certain embodiments.

Figure 53A:
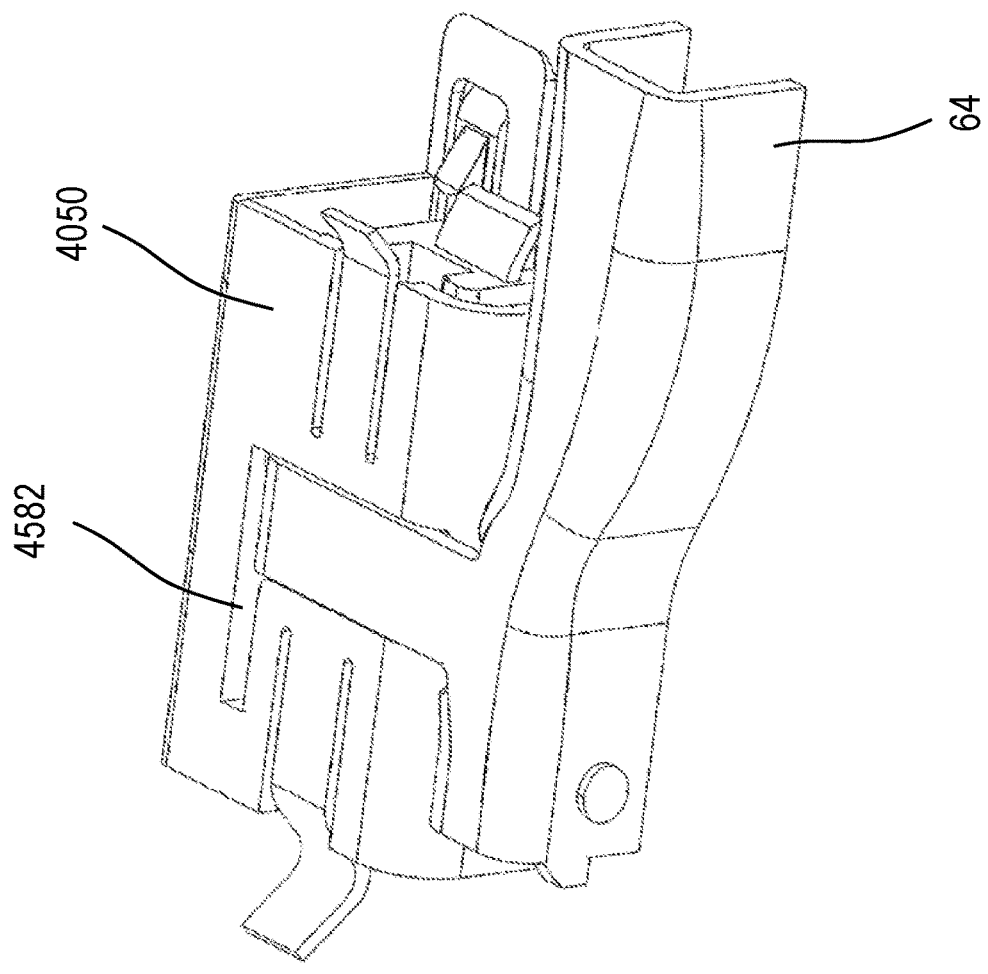
FIG. 53A is a perspective view illustrating a side pin wiper arm connected to a fifth adapter.
Figure 53B:
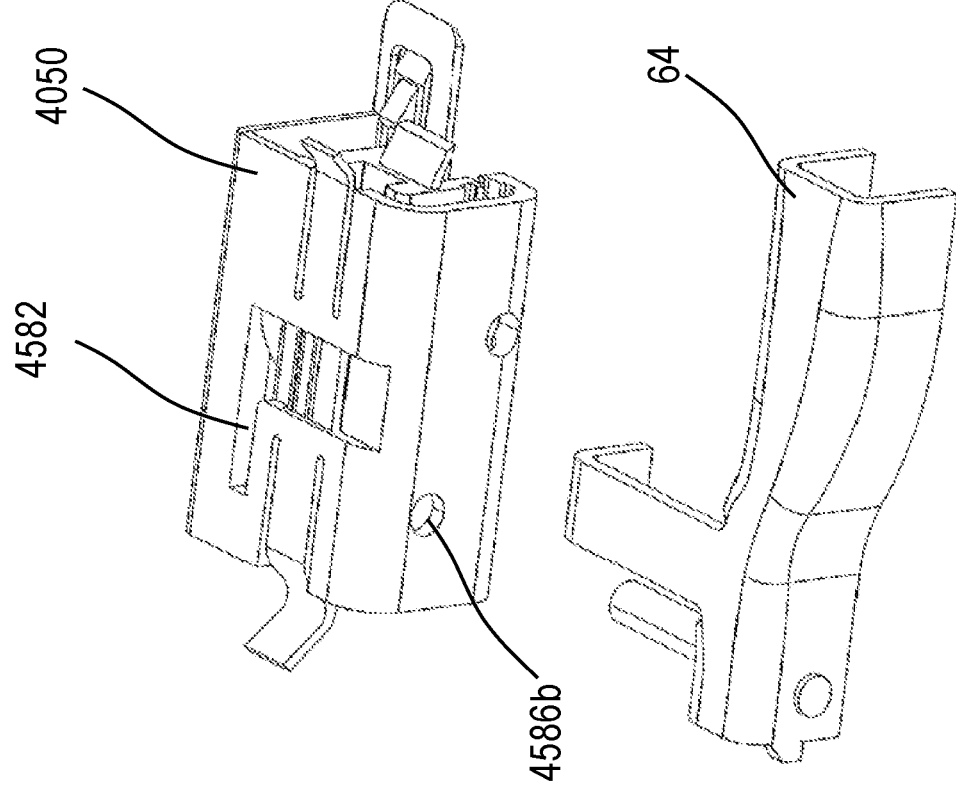
FIG. 53B is a perspective view illustrating how the side pin wiper arm of FIG. 53A is received by or removed from a fifth adapter.
Figure 54A:
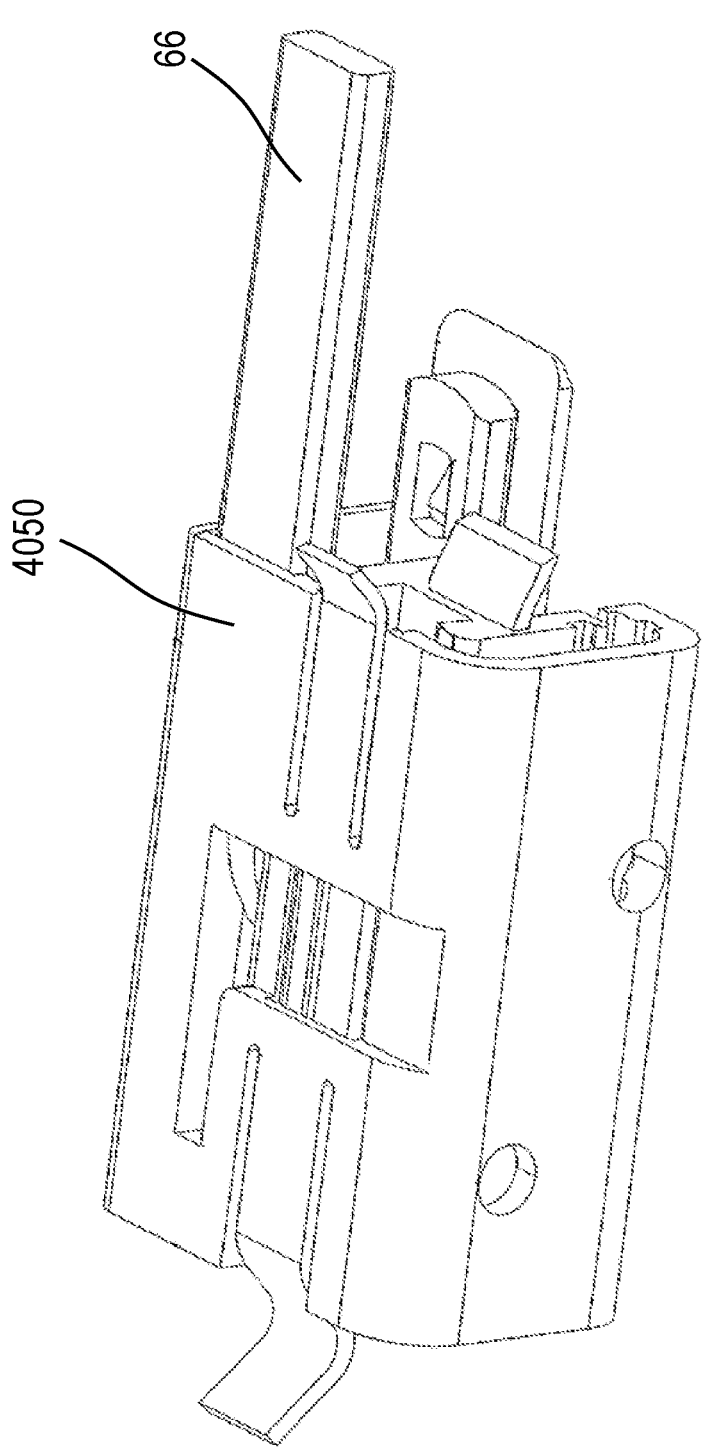
FIG. 54A is a perspective view illustrating a large hook wiper arm connected to a fifth adapter.
Figure 54B:
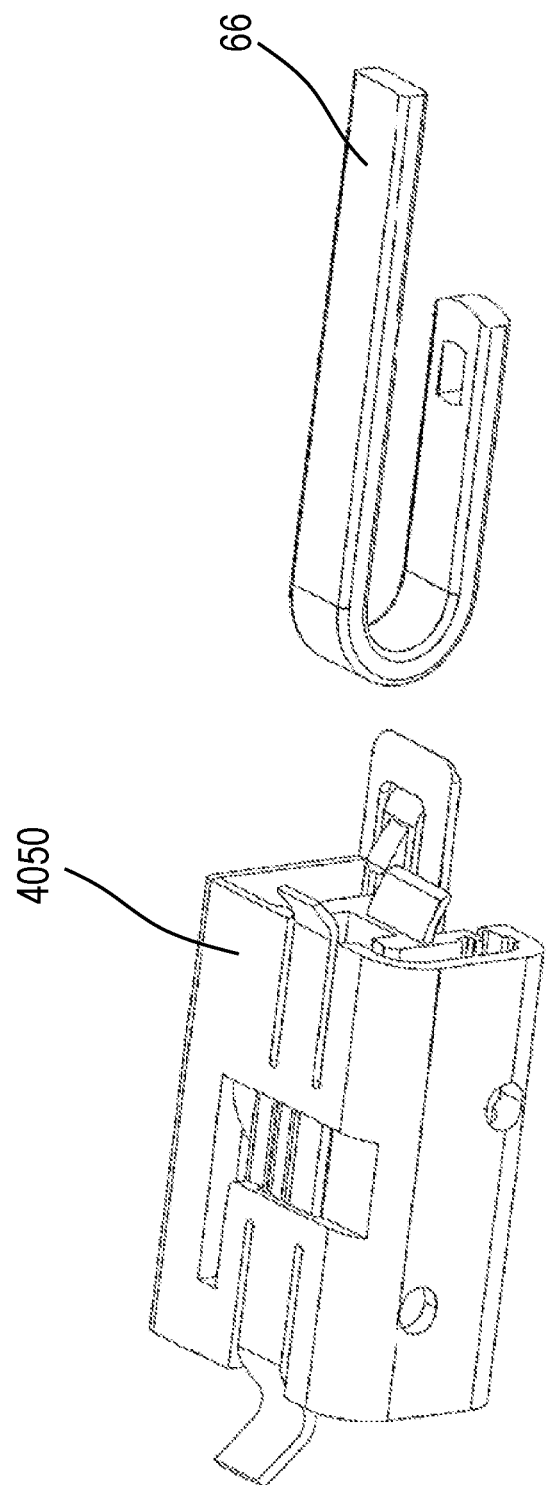
FIG. 54B is a perspective view illustrating how the large hook wiper arm of FIG. 54A is received by or removed from a fifth adapter.
Figure 55A:
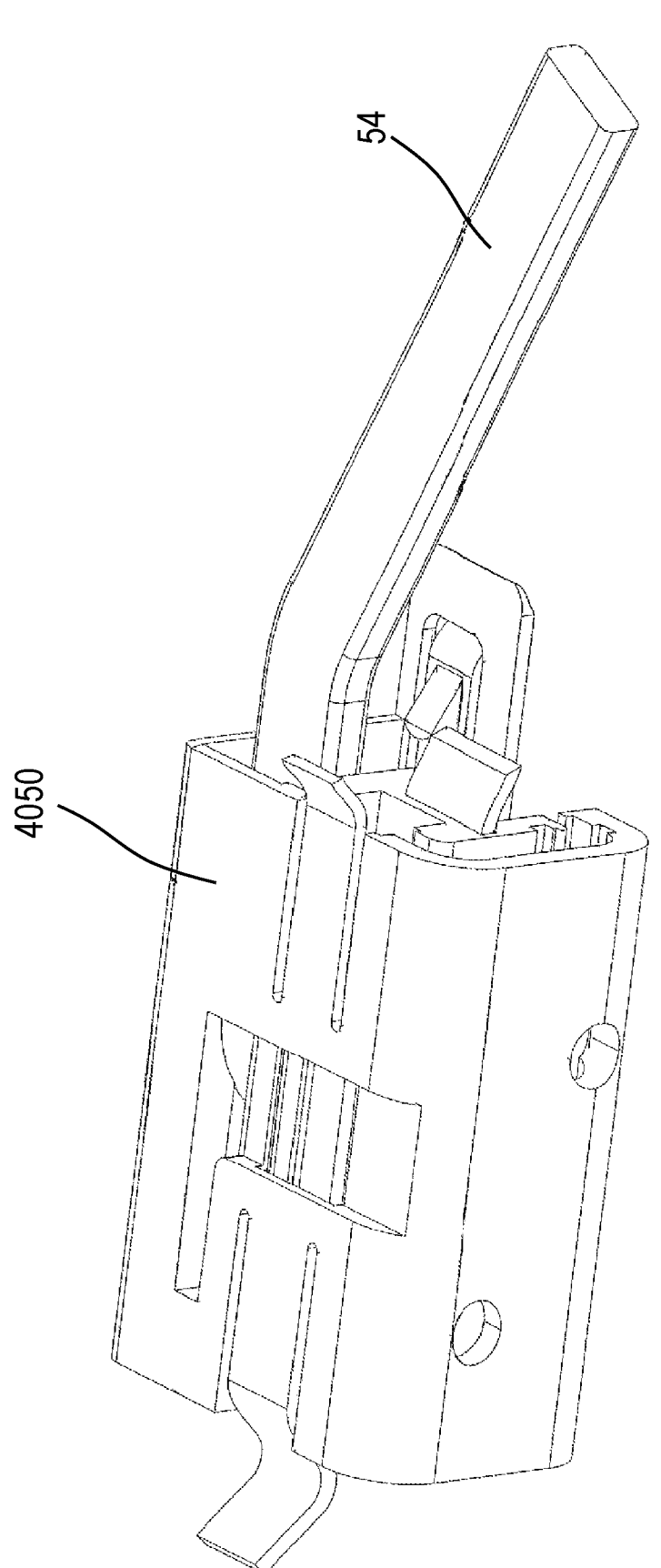
FIG. 55A is a perspective view illustrating a standard hook wiper arm connected to a fifth adapter.
Figure 55B:
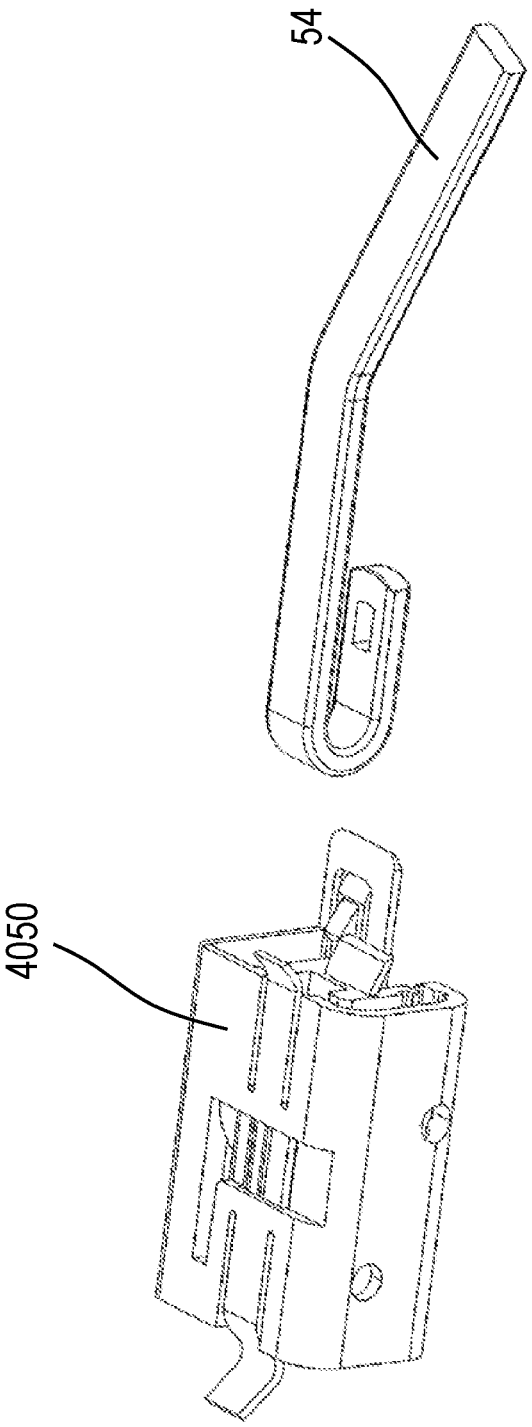
FIG. 55B is a perspective view illustrating how the standard hook wiper arm of FIG. 55A is received by or removed from a fifth adapter.

The fifth adapter 4050 also includes a cutout 4582 and a transverse distal opening 4586*b* that cooperate with the side pin wiper arm 64 for connecting the side pin wiper arm 64 to the fifth adapter 4050. The side pin wiper arm 64 can be detached from the fifth adapter 4050 by slidably removing the arm's pin from opening 4586*b* of the fifth adapter 4050. FIGS. 53A-53B are functional drawings illustrating how this exemplary pin style wiper arm interacts with the fifth adapter 4050 according to certain embodiments. As shown in FIG. 20, the fifth adapter 4050 further includes a first lower tab 4590 that cooperates with the large hook wiper arm 66 to connect the large hook wiper arm 66 with the fifth adapter 4050. The first lower tab 4590 can also be depressed, pushed away from the wiper arm, and/or manipulated to disengage the connection with the large hook wiper arm 66. The fifth adapter 4050 also includes a second lower tab 4592 that cooperates with the standard hook wiper arm 54 to connect the standard hook wiper arm 54 with the fifth adapter 4050. The second lower tab 4592 can also be depressed, pushed away from the wiper arm, and/or manipulated to disengage the connection with the standard hook wiper arm 54. FIGS. 54A-54B and 55A-55B are functional drawings illustrating how these exemplary hook style wiper arms interact with the fifth adapter 4050 according to certain embodiments.

As illustrated, the fifth adapter 4050 includes an inner wall section 4520 and an outer wall section 4522 that are spaced from one another. A bifurcated bottom wall section 4824 contacts the inner wall section 4520 and the outer wall section 4522 on a side of the fifth adapter 4050 and a top wall section 4724 connects the inner wall section 4520 and the outer wall section 4522 on an opposite side.

A first intermediate wall section 4924*a* and a second intermediate wall section 4924*b* are disposed between the outer wall section 4522 and the inner wall section 4520. The first intermediate wall section 4924*a* and the second intermediate wall section 4924*b* are spaced from one another and can be generally parallel to the inner wall section 4520 and the outer wall section 4522. The cavity 4374 is appropriately dimensioned to receive the push button 19 mm wiper arm 52, the standard hook wiper arm 54, the pinch tab wiper arm 56, the push button 22 mm wiper arm 60, the large hook wiper arm 66, and the fz wiper arm 69.

The top wall section 4724 is spaced from the bottom wall section 4824 and the second intermediate wall section 4924*b* is spaced from the inner wall section 4520 so as to define a hook opening 536 for receipt of at least part either the standard hook wiper arm 54 or the large hook wiper arm 66.

Figure 56A:
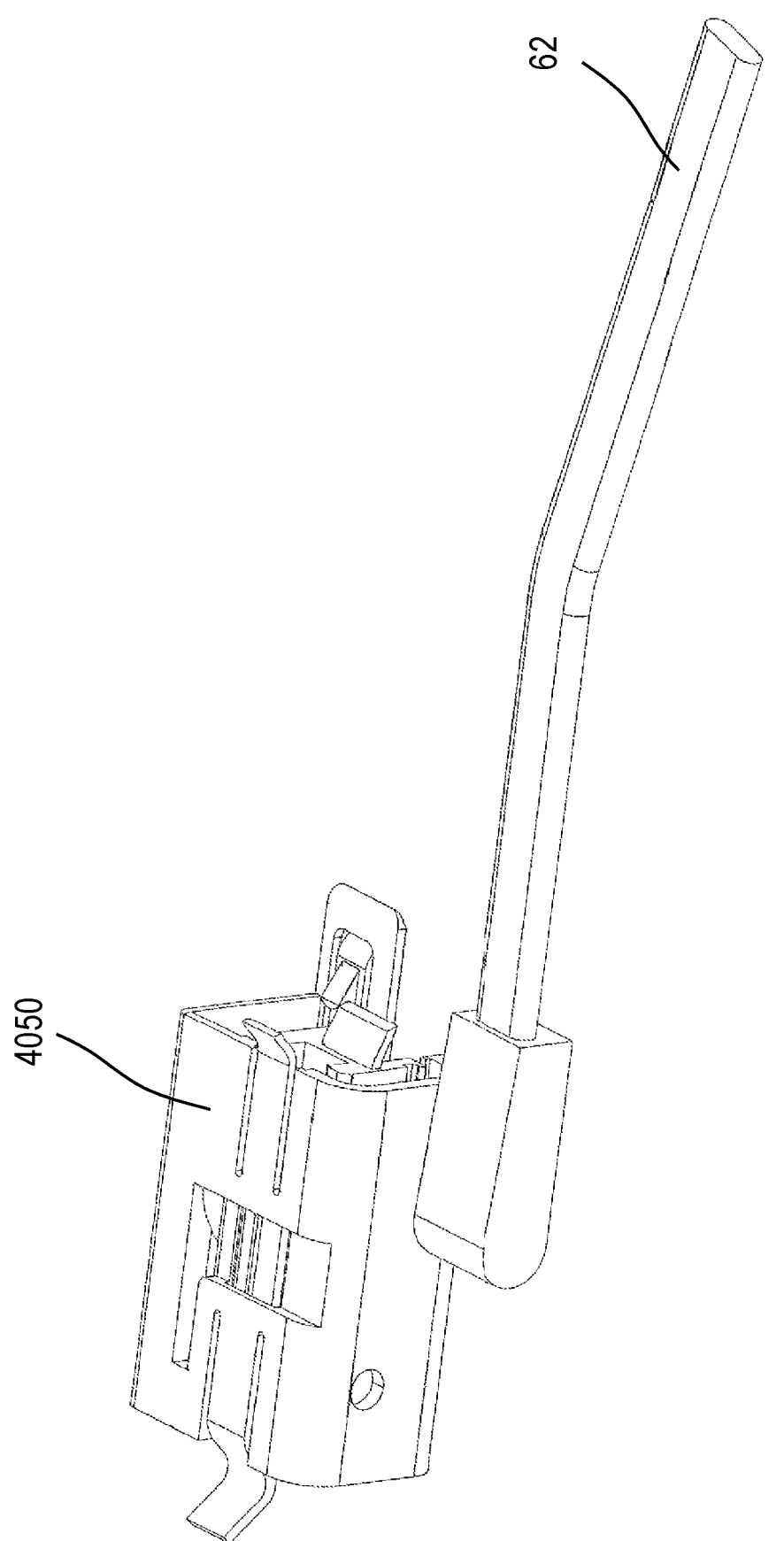
FIG. 56A is a perspective view illustrating a side lock wiper arm connected to a fifth adapter.
Figure 56B:
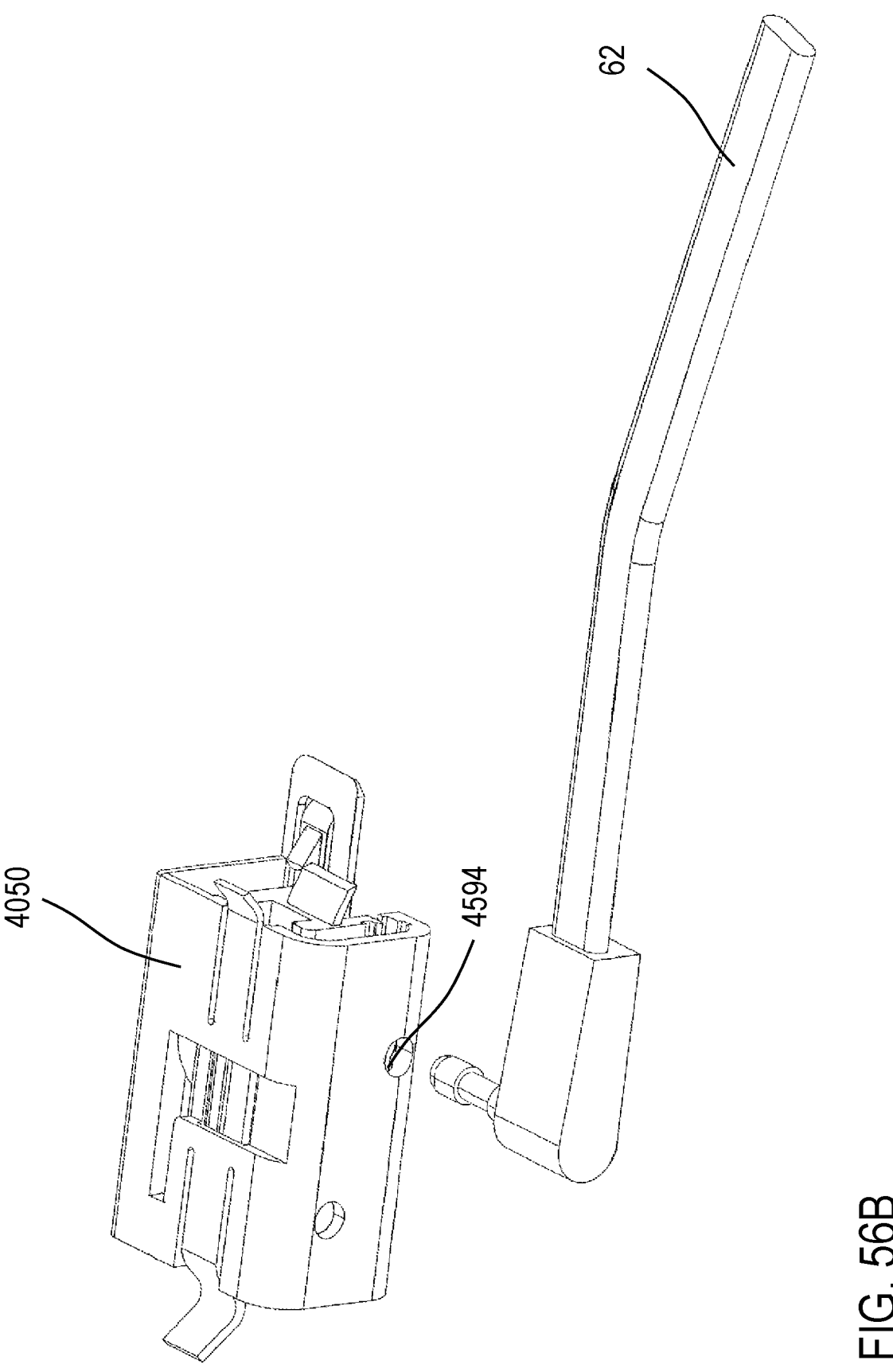
FIG. 56B is a perspective view illustrating how the side lock wiper arm of FIG. 56A is received by or removed from a fifth adapter.

The outer wall section 4522 defines the distal opening 4586*b* and the proximal transverse opening 4594. The first intermediate wall section 4924*a* defines a distal opening 4586*a* and a proximal transverse opening 4588. The distal opening 4586*a* of the first intermediate wall section 4924*a* is in registry with the distal opening 4586*b* of the outer wall section 4522. The openings 4586*a*, 4586*b* cooperate to receive pins of the side pin wiper arm 64 to connect the side pin wiper arm 64 to the fifth adapter 4050. Further, the proximal transverse opening 4588 of the first intermediate wall section 4924*a* and the proximal transverse opening 4594 of the outer wall section 4522 are in registry to receive a pin of the side lock wiper arm 62. FIGS. 56A-56B are functional drawings illustrating how this exemplary side lock arm interacts with the fifth adapter 4050 according to certain embodiments.

The top wall section 4724 can define a first proximal end slot 4564 and a second proximal end slot 4566 that each extend from a proximal end 4570 longitudinally toward a distal end 4572 to define the upper proximal tab 4676. A barb extends downwardly from the upper proximal tab 4676 to engage in an opening provided in the push button 19 mm wiper arm 52, the push button 22 mm arm 60, or the fz wiper arm 69.

The top wall section 4724 can define a first distal slot 4574 and a second distal slot 4776 that cooperate to define the upper distal tab 4678. A projection 4778 (FIG. 19) extends downwardly from the upper distal tab 4678 to engage inside an opening provided in the pinch tab wiper arm 56.

The first intermediate wall section 4924*a* can be at least partially continuous with a portion of the bottom wall section 4824. Further, the first intermediate wall section 4924*a* can define a bifurcating slot 4530 so as to create an upper portion 4532 and a lower portion 4534. As will be appreciated, the slot 4530 allows for selective flex of the first intermediate wall section 4924*a* to allow for a momentary increase in the diameter of the proximal transverse opening 4588 to allow passage of a portion of the pin of the side lock wiper arm 62 that may have a slightly larger diameter than the proximal transverse opening 4588. Then, when the first intermediate wall section 4924*a* returns to the non-flexed position, there is a secure fit with the pin of the side lock wiper arm 62.

A windshield wiper assembly and an adapter provided as part of the windshield wiper assembly to allow for the attachment of differently shaped wiper arms has been described above with particularity. Modifications and alterations will occur to those upon reading and understanding the preceding detailed description. The invention, however, is not limited to only the embodiments described above. Instead, the invention is broadly defined by the appended claim and the equivalents thereof.

The invention claimed is:

1. A wiper assembly comprising:
an adapter configured to selectively connect to wiper arms each having a different wiper arm style, the adapter comprising a cavity configured for receiving each of the wiper arms;
a wiper element; and
a coupler forming a base surface, the coupler configured to connect the wiper element with the adapter, the coupler comprising:
a cavity defining a first adapter-facing surface on a first end of the coupler, and a second adapter-facing surface on a second end of the coupler, the first adapter-facing surface positioned opposite the second adapter-facing surface;
a post configured for pivotally connecting the adapter facing surfaces of the coupler and the adapter together so as to define a pivot axis at the distal end of the adapter about which the adapter pivots, the post including a first post portion formed on the first adapter-facing surface extending to a first free terminal end and a second post portion formed on the second adapter-facing surface extending to a second free terminal end, the first post portion and the second post portion are laterally spaced from one another;

a limiter disposed between the first post portion and the second post portion and spaced from each of the first post portion and the second post portion, the limiter extending from a base wall of the coupler to a height below the pivot axis and configured to engage the adapter to limit transverse movement of the adapter relative to the coupler during operation; and a limit ledge configured for limiting a rotational motion of the adapter about the pivot axis, wherein:

in an operation mode, the adapter is limited to pivot or rotate along a first inclusive angle, between the base surface to the limit ledge to accommodate moving the wiper arms, and in an installation mode, the adapter is permitted to pivot or rotate beyond the first inclusive angle to a second inclusive angle, between the base surface and a line extending through, and orthogonal to, the pivot axis, enabling the adapter to slide engage with the coupler or slide disengage from the coupler.

2. A coupler that connects a wiper element with an adapter, the coupler comprising:

a first adapter-facing surface on a first end of the coupler, and a second adapter facing surface on a second end of the coupler;

a post pivotally connecting the adapter facing surfaces of the coupler and the adapter together so as to define a pivot axis at the distal end of the adapter about which the adapter pivots, wherein the post comprises a first post portion formed on the first adapter-facing surface extending to a first free terminal end and a second post portion formed on the second adapter-facing surface extending to a second free terminal end, the first post portion and the second post portion are laterally spaced from one another and each has an obround cross-section having a pair of curved surfaces separated by a pair of flat surfaces;

a back wall that includes the first adapter-facing surface and the second adapter facing surface, the first adapter-facing surface and the second adapter-facing surface are generally orthogonal to the pivot axis of the post; and a stop structure on the coupler positioned to cooperate with a complementary stop member of the adapter to prevent disengagement of the adapter from the coupler during operation and to permit disengagement only after the adapter is pivoted beyond a rotational stop defined by the stop structure, wherein:

the adapter is configured to pivot or rotate relative to the pair of curved surfaces of the first post portion and the second post portion to operate the wiper element, and the adapter is configured to slide relative to the pair of flat surfaces of the first post portion and the second post portion to disengage from the coupler.

3. The coupler of claim 2, wherein the first and second post portions are disposed on the pivot axis and are laterally spaced from one another, the first post portion and the second post portion being integrally formed with the back wall of the coupler and separated by an open region configured to receive a portion of the adapter.

4. The coupler of claim 2, wherein the adapter is configured to rotate about the pivot axis while locked into the coupler during operation of the wiper element.

5. The coupler of claim 2, wherein during installation of the adapter into the coupler, the post is configured to slidingly receive the adapter along a plane that is orthogonal to the pivot axis through the post, the plane being defined by cooperation between flat surfaces of the post portions and opposed sidewalls of an entry passage of the adapter.

6. The coupler of claim 2, further comprising a base wall with a base surface that is generally orthogonal to the back wall, and a limit ledge that extends from the first adapter facing surface of the coupler toward the adapter so as to limit a rotational motion of the adapter about the pivot axis, the limit ledge being positioned above the base surface and below the pivot axis.

7. The coupler of claim 6, wherein the coupler defines an inclusive angle that extends from the base surface to the limit ledge about the pivot axis.

8. The coupler of claim 7, wherein the inclusive angle is a first inclusive angle, and the coupler defines a second inclusive angle that extends from the base surface to a line that extends through the pivot axis and is parallel to the pair of flat surfaces of each of the post portions, the line intersecting the open region between the first post portion and the second post portion.

9. The coupler of claim 8, wherein the second inclusive angle is equal to 90 degrees.

10. The coupler of claim 8, wherein a portion of the second inclusive angle that exceeds the first inclusive angle as the adapter is allowed to pivot away from the coupler base defines a range in which the adapter may be installed or removed from the coupler by sliding through the pair of flat surfaces of each of the post portions, the sliding occurring without deformation of the coupler.

11. A wiper set comprising:

an adapter including an adapter attachment mount having an entry passage defined by generally parallel entry passage sidewalls; and a coupler that pivotally receives the adapter, the coupler including:

a first adapter-facing surface on a first end of the coupler, and a second adapter-facing surface on a second end of the coupler, the first adapter-facing surface positioned opposite the second adapter-facing surface;

a coupler cavity laterally separating the first adapter-facing surface and the second adapter-facing surface, the adapter being received within the coupler cavity between the first adapter-facing surface and the second adapter-facing surface; and a post that defines a pivot axis at a distal end of the adapter about which the adapter pivots, wherein the post comprises a first post portion formed on the first adapter-facing surface extending to a first free terminal end and a second post portion formed on the second adapter-facing surface extending to a second free terminal end, the first post portion and the second post portion are laterally spaced from one another, wherein:

the adapter pivots relative to the coupler for operating the adapter attachment by pivoting the adapter, via the entry passage, relative to first post portion and the second post portion, and the adapter is installed or uninstalled to the coupler by axially sliding the adapter, via the entry passage, relative to first post portion and the second post portion.

12. The wiper set of claim 11, wherein the entry passage is configured to slidingly receive the coupler between the first post portion and the second post portion.

13. The wiper set of claim 12, wherein the entry passage sidewalls further define a pivot passage that is configured to pivotally receive the coupler, the pivot passage being defined by a major arc that terminates into the entry passage sidewalls.

14. The wiper set of claim 13, wherein the wiper set defines an installation mode when the post is received in the entry passage and the adapter is not pivotable, and an operation mode when the post is received in the pivot passage and the adapter is pivotable, the adapter remaining laterally captured between the first adapter-facing surface and the second adapter-facing surface in both modes.

15. The wiper set of claim 14, further comprising a limit ledge that extends from the first adapter facing surface on the coupler toward the adapter for contact with a stop member of the adapter so as to divide the operation mode into a separable stage and a non-removable stage, the separable stage permitting removal of the adapter only by sliding the adapter relative to the post portions.

16. The wiper set of claim 11, wherein the adapter attachment mount is integral to a bottom coupler facing surface of the adapter.

17. The wiper set of claim 11, wherein the adapter further comprises an integral stop member configured to prevent the adapter from being further rotated to a larger angle that would allow disengagement of the adapter.

*    *    *    *    *